United States Patent [19]

Iwata

[11] Patent Number: 5,654,910

[45] Date of Patent: Aug. 5, 1997

[54] PROCESSING METHOD AND APPARATUS FOR PERFORMING 4 ×4 DISCRETE COSINE TRANSFORMATION OR INVERSE DISCRETE COSING TRANSFORMATION

[75] Inventor: Eiji Iwata, Chiba, Japan

[73] Assignee: Sony Corporation, Japan

[21] Appl. No.: 101,750

[22] Filed: Aug. 4, 1993

[30] Foreign Application Priority Data

Aug. 26, 1992 [JP] Japan ................... 4-250806

[51] Int. Cl.$^6$ ........................... G06F 17/14
[52] U.S. Cl. ........................... 364/725.03
[58] Field of Search ........................... 364/725, 726, 364/727

[56] References Cited

U.S. PATENT DOCUMENTS

| 4,791,598 | 12/1988 | Liou et al. | 364/725 |
| 4,841,464 | 6/1989 | Guichard et al. | 364/725 |
| 5,197,021 | 3/1993 | Cucchi et al. | 364/725 |
| 5,249,146 | 9/1993 | Uramoto et al. | 364/725 |

FOREIGN PATENT DOCUMENTS

| 0416311 | 3/1991 | European Pat. Off. . |
| 0468165 | 1/1992 | European Pat. Off. . |
| 0506111 | 9/1992 | European Pat. Off. . |
| 0557204 | 8/1993 | European Pat. Off. . |

Primary Examiner—Chuong D. Ngo
Attorney, Agent, or Firm—Ronald P. Kananen

[57] ABSTRACT

A two-dimensional 4×4 discrete cosine transformation (4×4 DCT) in which the number of multiplications is small and the calculation precision is not lowered can be defined by the relationship between input matrix data [X] and output matrix data [Y], by [Y]=¼·[W] [V] [R] [Q] [R] [Q] [X] as factorization equations. The matrices [R], [Q], and [V] are constant matrices including "0", "1", and "−1", and the matrix [W] is a matrix indicating irrational numbers defined by two-dimensional 4×4 DCT. The computation of the constant matrices [R], [Q], and [V] can be realized by addition-subtraction, and the multiplication is carried out only for the computation of matrix [W]. The first addition-subtraction circuit (2) performs the first computation between [X] and [RQ] and the first computation between this result with [RQ] by time division, the second addition-subtraction circuit (2) performs the remaining second computation between [RQ] and [S] and a third computation between this result and [V] by time division, and the multiplication-addition circuit (6) performs the computation between [U] and [W]. The intermediate value holding circuits (3 and 5) hold the intermediate calculation values in the time division computation.

54 Claims, 10 Drawing Sheets

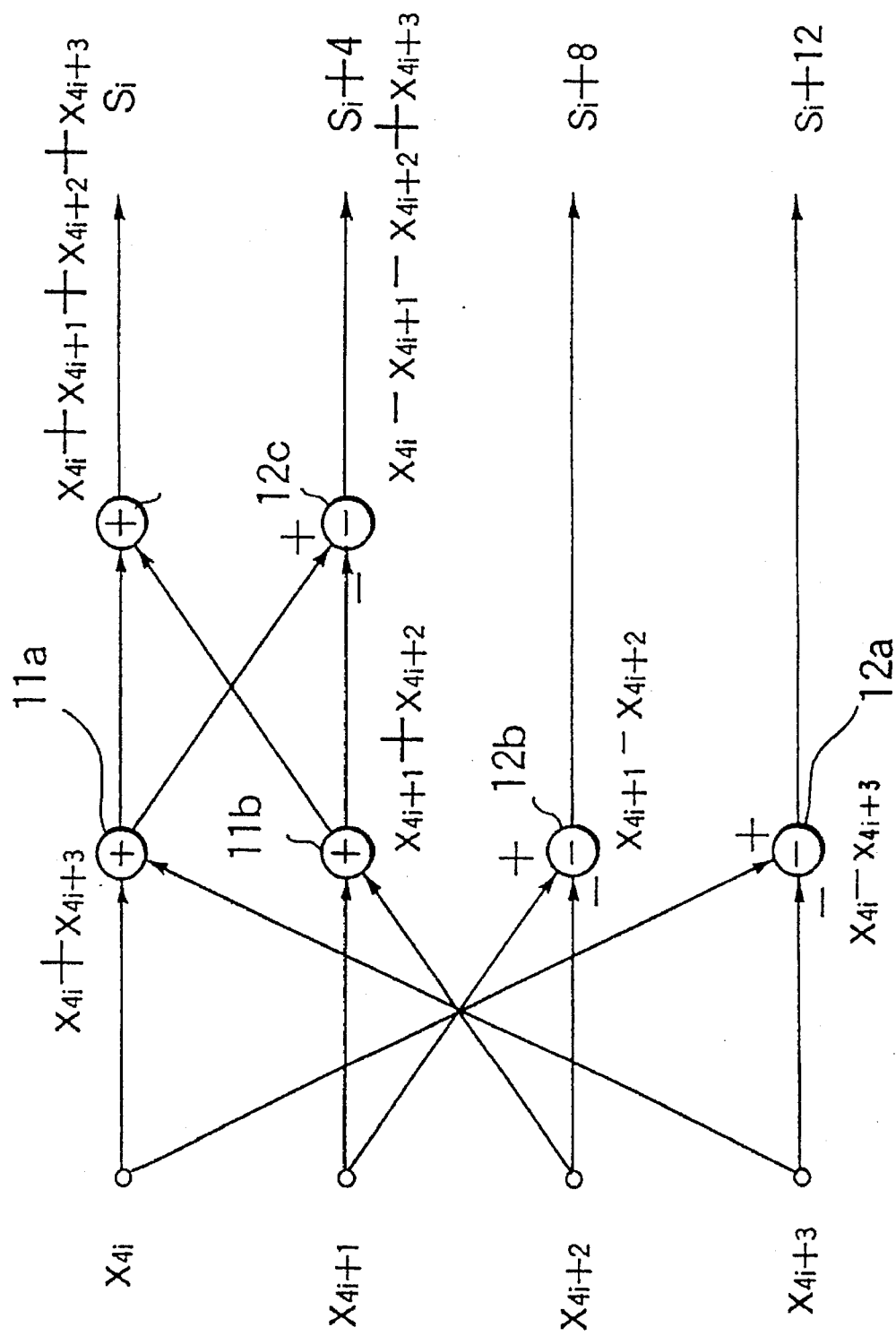

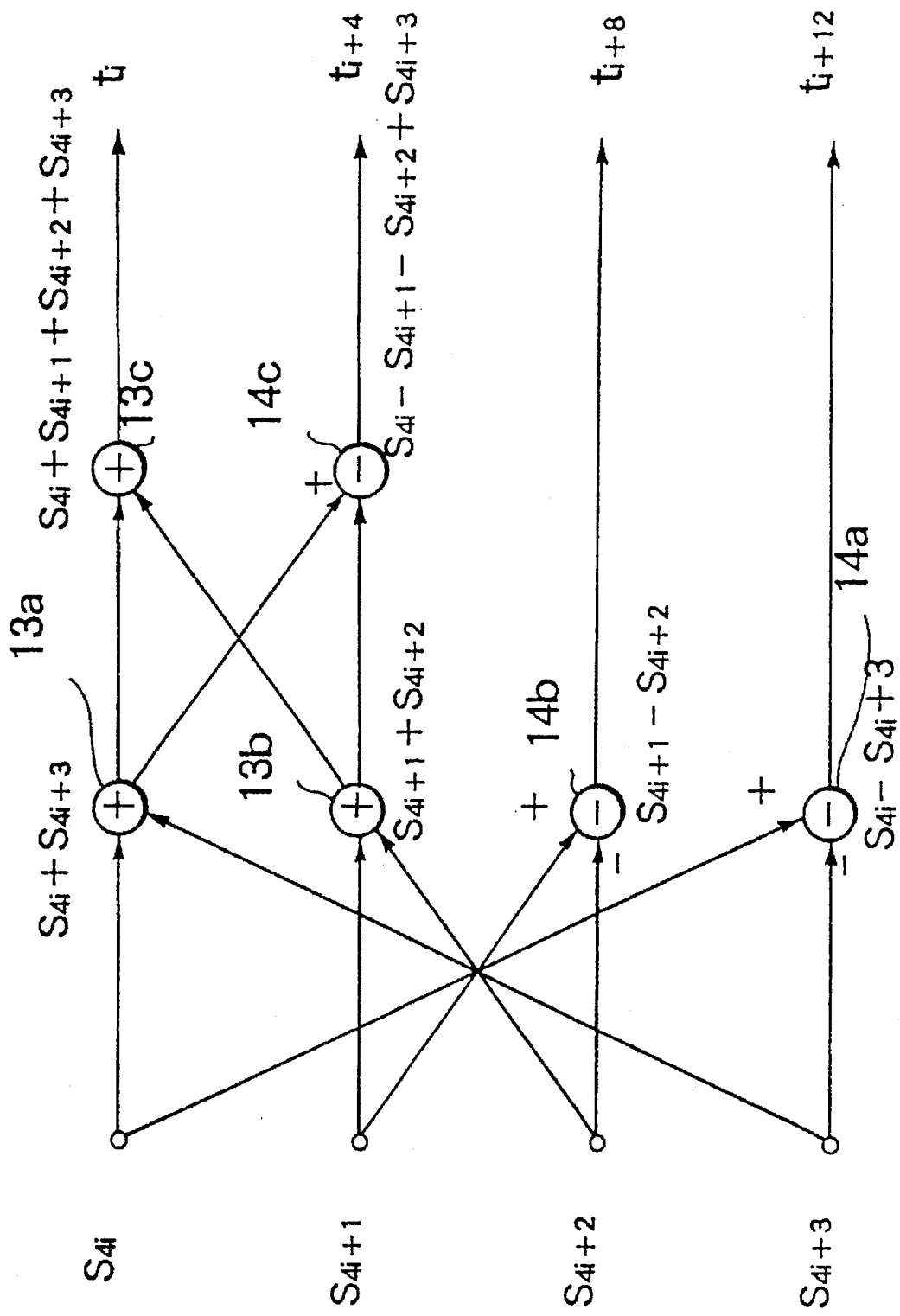

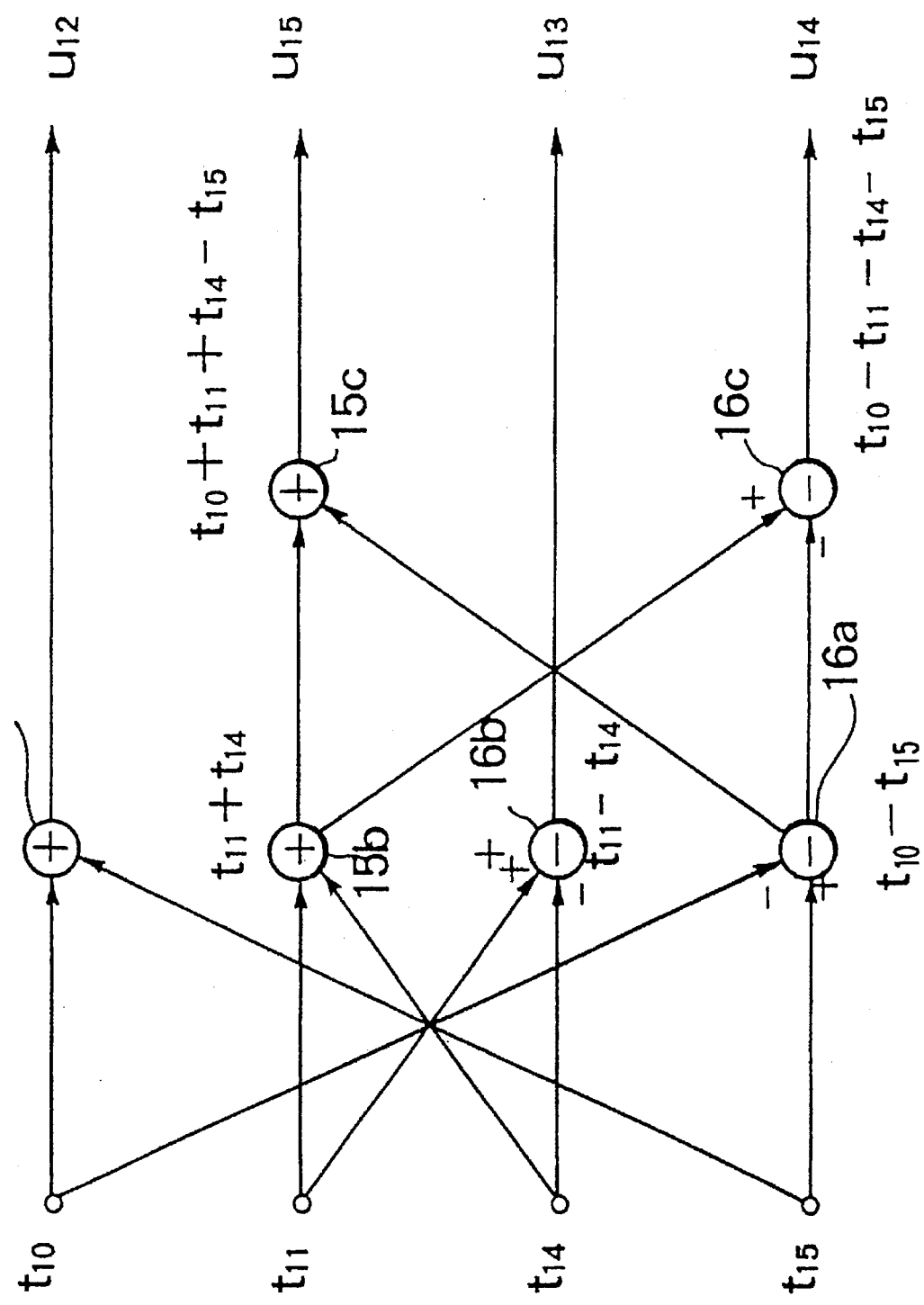

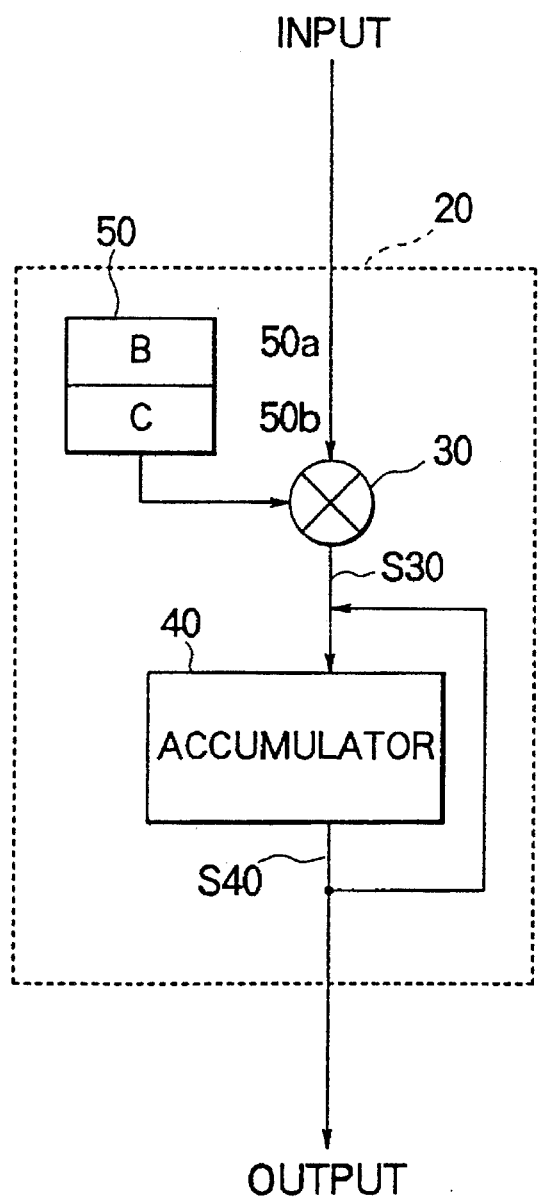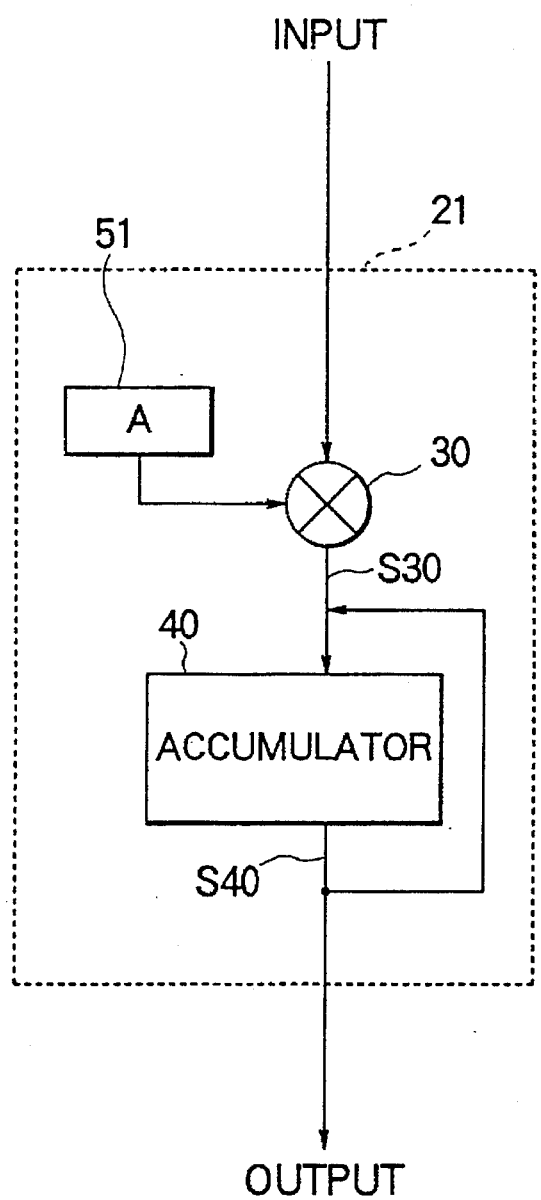

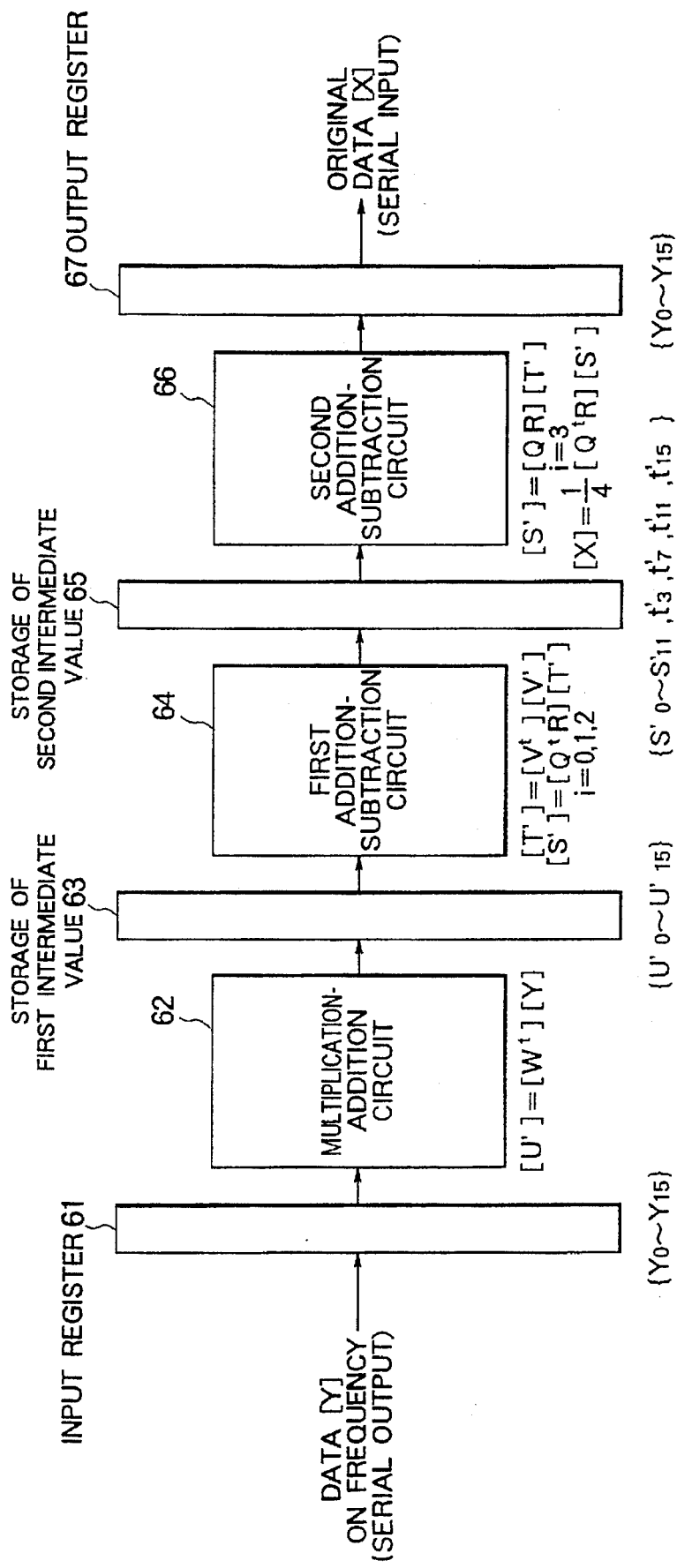

PROCESSING METHOD AND APPARATUS FOR PERFORMING 4 ×4 DISCRETE COSINE TRANSFORMATION OR INVERSE DISCRETE COSING TRANSFORMATION

BACKGROUND OF THE INVENTION

1. Field of Invention

The present invention relates to a discrete cosine transformation (DCT) method and system and a discrete cosine inverse transformation (inverse DCT: IDCT) method and system used for digital image processing etc. More particularly, it relates to a two-dimensional 4-row×4-column discrete cosine transformation (4×4 DCT) method and system and a two-dimensional 4×4 discrete cosine inverse transformation (4×4 IDCT) method and system.

2. Description of the Related Art

Discrete cosine transformation (DCT) and inverse discrete cosine transformation (or discrete cosine inverse transformation: IDCT) are types of orthogonal transformations which perform transformations from a real domain (space) to a frequency domain (space) and inverse transformations thereof and are used in, for example, image signal processing.

A two-dimensional 4×4 DCT, which is one type of DCT, and a two-dimensional 4×4 IDCT, which is the inverse transformation of the 4×4 DCT, in general can be expressed by the following equations 1 and 2.

$$DCT: [Y] = \frac{1}{2} [P] [X] [P^t] \quad (1)$$

$$IDCT: [X] = \frac{1}{2} [P^t] [Y] [P] \quad (2)$$

Here, the matrix [X] denotes original data in a real domain consisting of four rows and four columns, and the matrix [Y] denotes matrix data in a frequency domain consisting of four rows and four columns. The matrix [P] denotes a constant matrix consisting of 4 rows and 4 columns for the DCT, and the matrix [$P^t$] indicates a transposition matrix of the matrix [P]. Below, suffixes t on the top right indicate transposition matrices.

The matrix [P] is defined by the equation 3.

$$[P] = \begin{bmatrix} A & A & A & A \\ B & C & -C & -B \\ A & -A & -A & A \\ C & -B & B & -C \end{bmatrix} \quad (3)$$

The coefficients (factors) A, B, and C in the matrix [P] are defined by Table 1.

TABLE 1

$$A = \cos\left[\frac{\pi}{4}\right]$$

$$B = \cos\left[\frac{\pi}{8}\right]$$

$$C = \cos\left[\frac{3\pi}{8}\right]$$

Conventionally, the computation processing of the two-dimensional 4×4 DCT represented by the above-mentioned equations is realized by repeating a one-dimensional DCT two times. Namely, first, the inner product computation (multiplication): [P·X] of four dimensions between the matrix [P] and matrix [X] (or the inner product computation: [X·$P^t$] of the matrix [X] and the matrix [$P^t$]) is carried out 16 times using four multipliers, and further the inner product computation: [P·X·$P^t$] of four dimensions between the matrix [P·X] obtained by the above-described computation and the matrix [$P^t$] (or the inner product computation: [P·X·$P^t$] of the matrix [P] and the matrix [X·$P^t$]) is carried out 16 times using another four multipliers, to obtain the matrix [Y]. For this computation, eight in total multipliers become necessary, and the number of times of multiplication needed for finding respective components (16 components) of the matrix [Y] becomes 128 times.

Moreover, also the two-dimensional 4×4 IDCT system has been realized by similarly repeating the one-dimensional IDCT two times. Namely, first the 4-dimensional inner product computation: [Y·P] between the matrix [Y] and the matrix [P] (or the inner product computation: [$P^t$·Y] of the matrix [$P^t$] and the matrix [Y]) is carried out 16 times using four multipliers, and further the 4-dimensional inner product computation: [$P^t$·Y·P] between the matrix [$P^t$] and the matrix [Y·P] obtained by the computation (or the inner product computation: [$P^t$·Y·P] between the matrix [$P^t$·Y] obtained by the computation and the matrix [P]) is carried out 16 times using another four multipliers, to obtain the matrix [X]. Also in this computation, eight in total multipliers become necessary, and the number of times of multiplication necessary for finding the respective components (16 components) of the matrix [X] becomes 128 times.

In the conventional system for executing the two-dimensional 4×4 DCT and two-dimensional 4×4 IDCT mentioned above, the one-dimensional DCT and one-dimensional IDCT are each repeated two times, whereby two multiplications are included in the data path. Therefore, it suffers from a disadvantage of a reduction of the precision due to the accumulation of error caused by omitting the figures below the decimal places, for example, and due to the accumulation of the computation error by the approximation of the irrational numbers.

Moreover, it suffers from another disadvantage in that due to the one-dimensional DCT and one-dimensional IDCT being performed two times, the number of times of the multiplication is increased, and consequently, a longer operation time is taken.

Further, it suffers from another disadvantage in that since many multiplication circuits are needed, the circuit structure per se of the two-dimensional 4×4 DCT system and two-dimensional 4×4 IDCT system becomes very complex due to a large number of multiplication circuits each having a complex circuit structure compared with an addition circuit or a subtraction circuit.

SUMMARY OF THE INVENTION

An object of the present invention is to provide a two-dimensional 4-row×4-column discrete cosine transformation (4×4 DCT) method which can reduce the number of times of multiplication to shorten the operation speed, without lowering of the precision.

Another object of the present invention is to provide a two-dimensional 4×4 DCT system which can reduce the number of times of multiplication to simplify the circuit structure and to shorten the operation speed, without lowering the precision.

Still another object of the present invention is to provide a two-dimensional 4-row×4-column discrete cosine inverse transformation (4×4 IDCT) method which can reduce the number of times of multiplication to shorten the operation speed, without lowering the precision.

Yet another object of the present invention is to provide a two-dimensional 4×4 IDCT system which can reduce the number of times of multiplication to simplify the circuit structure and shorten the operation speed, without lowering the precision.

The principle of the present invention to achieve the above objects will be described.

From equation 1 and equation 2, linear one-dimensional transformation relationships as shown in the following equation 4 and equation 5 stand between the components $y_{ij}$ (i=0, 1, 2, 3: j=0, 1, 2, 3) of the matrix data [Y] on the frequency domain and the components $x_{ij}$ (i=0, 1, 2, 3: j=0, 1, 2, 3) of the input (original) matrix data [X] on the real domain.

$$DCT: [Y] = \tfrac{1}{2} [M] [X] \quad (4)$$

$$IDCT: [X] = \tfrac{1}{2} [M^t] [Y] \quad (5)$$

The matrix [Y], matrix [X], and matrix [M] in equation 4 and equation 5 are expressed by the following equation 6, equation 7, and equation 8, respectively. The matrix $[M^t]$ is a transposition matrix of the matrix [M].

$$[Y] = \begin{bmatrix} y_{00} \\ y_{01} \\ y_{02} \\ y_{03} \\ y_{10} \\ y_{11} \\ y_{12} \\ y_{13} \\ \vdots \\ y_{33} \end{bmatrix} \quad (6)$$

$$[X] = \begin{bmatrix} x_{00} \\ x_{01} \\ x_{02} \\ x_{03} \\ x_{10} \\ x_{11} \\ x_{12} \\ x_{13} \\ \vdots \\ x_{33} \end{bmatrix} \quad (7)$$

$$[M] = \begin{pmatrix}
A^2 & A^2 & A^2 & A^2 & A^2 & A^2 & A^2 & A^2 & A^2 & A^2 & A^2 & A^2 & A^2 & A^2 & A^2 & A^2 \\
AB & AC & -AC & -AB & AB & AC & -AC & -AB & AB & AC & -AC & -AB & AB & AC & -AC & -AB \\
A^2 & -A^2 & -A^2 & A^2 & A^2 & -A^2 & -A^2 & A^2 & A^2 & -A^2 & -A^2 & A^2 & A^2 & -A^2 & -A^2 & A^2 \\
AC & -AB & AB & -AC & AC & -AB & AB & -AC & AC & -AB & AB & -AC & AC & -AB & AB & -AC \\
AB & AB & AB & AB & AC & AC & AC & AC & -AC & -AC & -AC & -AC & -AB & -AB & -AB & -AB \\
B^2 & BC & -BC & -B^2 & BC & C^2 & -C^2 & -BC & -BC & -C^2 & C^2 & BC & -B^2 & -BC & BC & B^2 \\
AB & -AB & -AB & AB & AC & -AC & -AC & AC & AC & -AC & -AC & AC & -AB & AB & AB & -AB \\
BC & -B^2 & B^2 & -BC & C^2 & -BC & BC & -C^2 & -C^2 & BC & -BC & C^2 & -BC & B^2 & -B^2 & BC \\
A^2 & A^2 & A^2 & A^2 & -A^2 & -A^2 & -A^2 & -A^2 & -A^2 & -A^2 & -A^2 & -A^2 & A^2 & A^2 & A^2 & A^2 \\
AB & AC & -AC & -AB & -AB & -AC & AC & AB & -AB & -AC & AC & AB & AB & AC & -AC & -AB \\
A^2 & -A^2 & -A^2 & A^2 & -A^2 & A^2 & A^2 & -A^2 & -A^2 & A^2 & A^2 & -A^2 & A^2 & -A^2 & -A^2 & A^2 \\
AC & -AB & AB & -AC & -AC & AB & -AB & AC & -AC & AB & -AB & AC & AC & -AB & AB & -AC \\
AC & AC & AC & AC & -AB & -AB & -AB & -AB & AB & AB & AB & AB & -AC & -AC & -AC & -AC \\
BC & C^2 & -C^2 & -BC & -B^2 & -BC & BC & B^2 & B^2 & BC & -BC & -B^2 & -BC & -C^2 & C^2 & BC \\
AC & -AC & -AC & AC & -AB & AB & AB & -AB & AB & -AB & -AB & AB & -AC & AC & AC & -AC \\
C^2 & -BC & BC & -C^2 & -BC & B^2 & -B^2 & BC & BC & -B^2 & B^2 & -BC & -C^2 & BC & -BC & C^2
\end{pmatrix} \quad (8)$$

The results of multiplication of the coefficients in the equation 8 are shown in Table 2.

TABLE 2

| — | A $\left(=\cos\frac{\pi}{4}\right)$ | B $\left(=\cos\frac{\pi}{8}\right)$ | C $\left(=\cos\frac{3}{8}\pi\right)$ |
|---|---|---|---|
| A $\left(=\cos\frac{\pi}{4}\right)$ | $A^2 = \frac{1}{2}$ | $AB = \frac{1}{2}(B+C)$ | $AC = \frac{1}{2}(B-C)$ |
| B $\left(=\cos\frac{\pi}{8}\right)$ | — | $B^2 = \frac{1}{2}(1+A)$ | $BC = \frac{1}{2}A$ |
| C $\left(=\cos\frac{3}{8}\pi\right)$ | — | — | $C^2 = \frac{1}{2}(1-A)$ |

The matrix [M] in the equation 4 and the transposition matrix [M$^t$] in the equation 5 can be subjected to matrix dissolution (factorization), and the equation 4 and the equation 5 can be rewritten to the forms shown in the following equation 9 and equation 10, respectively:

$$[Y] = \frac{1}{4} [W] [V] [R] [Q] [R] [Q] [X] \tag{9}$$

$$[X] = \frac{1}{4} [Q^t] [R] [Q^t] [R] [V^t] [W^t] [T] \tag{10}$$

The matrix [Q], the matrix [R], the matrix [V], and the matrix [W] in equation 9 and equation 10 are expressed as constant 16-row×16-column matrices shown in the following equation 11, equation 12, and equation 13, respectively:

$$[Q] = \begin{bmatrix}
1 & 1 & 1 & 1 & 0 & 0 & 0 & 0 & 0 & 0 & 0 & 0 & 0 & 0 & 0 & 0 \\
1 & -1 & -1 & 1 & 0 & 0 & 0 & 0 & 0 & 0 & 0 & 0 & 0 & 0 & 0 & 0 \\
0 & 1 & -1 & 0 & 0 & 0 & 0 & 0 & 0 & 0 & 0 & 0 & 0 & 0 & 0 & 0 \\
1 & 0 & 0 & -1 & 0 & 0 & 0 & 0 & 0 & 0 & 0 & 0 & 0 & 0 & 0 & 0 \\
0 & 0 & 0 & 0 & 1 & 1 & 1 & 1 & 0 & 0 & 0 & 0 & 0 & 0 & 0 & 0 \\
0 & 0 & 0 & 0 & 1 & -1 & -1 & 1 & 0 & 0 & 0 & 0 & 0 & 0 & 0 & 0 \\
0 & 0 & 0 & 0 & 0 & 1 & -1 & 0 & 0 & 0 & 0 & 0 & 0 & 0 & 0 & 0 \\
0 & 0 & 0 & 0 & 1 & 0 & 0 & -1 & 0 & 0 & 0 & 0 & 0 & 0 & 0 & 0 \\
0 & 0 & 0 & 0 & 0 & 0 & 0 & 0 & 1 & 1 & 1 & 1 & 0 & 0 & 0 & 0 \\
0 & 0 & 0 & 0 & 0 & 0 & 0 & 0 & 1 & -1 & -1 & 1 & 0 & 0 & 0 & 0 \\
0 & 0 & 0 & 0 & 0 & 0 & 0 & 0 & 0 & 1 & -1 & 0 & 0 & 0 & 0 & 0 \\
0 & 0 & 0 & 0 & 0 & 0 & 0 & 0 & 1 & 0 & 0 & -1 & 0 & 0 & 0 & 0 \\
0 & 0 & 0 & 0 & 0 & 0 & 0 & 0 & 0 & 0 & 0 & 0 & 1 & 1 & 1 & 1 \\
0 & 0 & 0 & 0 & 0 & 0 & 0 & 0 & 0 & 0 & 0 & 0 & 1 & -1 & -1 & 1 \\
0 & 0 & 0 & 0 & 0 & 0 & 0 & 0 & 0 & 0 & 0 & 0 & 0 & 1 & -1 & 0 \\
0 & 0 & 0 & 0 & 0 & 0 & 0 & 0 & 0 & 0 & 0 & 0 & 1 & 0 & 0 & -1
\end{bmatrix} = \begin{bmatrix} Q1 & & & 0 \\ & Q1 & & \\ & & Q1 & \\ 0 & & & Q1 \end{bmatrix} \tag{11}$$

$$[R] = \begin{bmatrix}
1 & 0 & 0 & 0 & 0 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 0 & 1 & 0 & 0 & 0 & 0 \\
0 & 1 & 0 & 0 & 0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 \\
0 & 0 & 1 & 0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 1 & 0 & 0 \\
0 & 0 & 0 & 1 & 0 & 0 & 0 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 1
\end{bmatrix} \tag{12}$$

-continued $$[V] = \begin{bmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & 0 & 0 & 0 & 1 & 0 & 0 & 0 \\ 0 & 0 & 0 & 0 & 0 & 0 & 0 & 0 & 1 & 0 & 0 & 0 & -1 & 0 & 0 & 0 \\ 0 & 0 & 0 & 0 & 0 & 0 & 0 & 0 & 0 & 1 & 0 & 0 & 0 & 1 & 0 & 0 \\ 0 & 0 & 0 & 0 & 0 & 0 & 0 & 0 & 0 & 1 & 0 & 0 & 0 & -1 & 0 & 0 \\ 0 & 0 & 0 & 0 & 0 & 0 & 0 & 0 & 0 & 0 & 1 & 0 & 0 & 0 & 0 & 1 \\ 0 & 0 & 0 & 0 & 0 & 0 & 0 & 0 & 0 & 0 & 0 & 1 & 0 & 0 & -1 & 0 \\ 0 & 0 & 0 & 0 & 0 & 0 & 0 & 0 & 0 & 0 & 1 & -1 & 0 & 0 & -1 & -1 \\ 0 & 0 & 0 & 0 & 0 & 0 & 0 & 0 & 0 & 0 & 1 & 1 & 0 & 0 & 1 & -1 \end{bmatrix} = \begin{bmatrix} V1 & 0 & 0 & 0 \\ 0 & V2 & 0 & 0 \\ 0 & 0 & V3 & V4 \\ 0 & 0 & V5 & V6 \end{bmatrix}$$

(13)

"−" in these matrices indicates "−1", and a blank portion indicates "0" (true for the following as well).

The matrix [Q] is expressed as a constant matrix in which sub-matrices [Q1] are constituted as in the following way:

| 1 | 1 | 1 | 1 |
| 1 | −1 | −1 | 1 |
| 0 | 1 | −1 | 0 |
| 1 | 0 | 0 | −1 |

These sub-matrices $[Q_1]$ become diagonal elements, and the non-diagonal elements-are all "0".

The matrix [R] is expressed as a 16×16 constant matrix in which the elements of the first to fourth columns are:

| 1000 | 0000 | 0000 | 0000 |
| 0000 | 1000 | 0000 | 0000 |
| 0000 | 0000 | 1000 | 0000 |
| 0000 | 0000 | 0000 | 1000 | the elements of the fifth to eighth columns are:

| 0100 | 0000 | 0000 | 0000 |
| 0000 | 0100 | 0000 | 0000 |
| 0000 | 0000 | 0100 | 0000 |
| 0000 | 0000 | 0000 | 0100 | the elements of the ninth to 12-th columns are:

| 0010 | 0000 | 0000 | 0000 |
| 0000 | 0010 | 0000 | 0000 |
| 0000 | 0000 | 0010 | 0000 |
| 0000 | 0000 | 0000 | 0010 | and the elements of the 13-th to 16-th columns are:

| 0001 | 0000 | 0000 | 0000 |
| 0000 | 0001 | 0000 | 0000 |
| 0000 | 0000 | 0001 | 0000 |
| 0000 | 0000 | 0000 | 0001 |

That is, the matrix [R] is expressed as a constant matrix having one "1" for each column, wherein the positions at which that "1" exists are different for each column. Note, there is regularity in the different positions as mentioned above.

The matrix [V] is expressed as a constant matrix having sub-matrices [V1], [V2], [V3], [V4], [V5], and [V6] each constituted by "0", "1", and "−1".

The matrix [W] is expressed by the following equation 14:

$$[W] = \begin{bmatrix} 1 & 0 & 0 & 0 & 0 & 0 & 0 & 0 & 0 & 0 & 0 & 0 & 0 & 0 & 0 & 0 \\ 0 & 0 & B & -C & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & -C & -B & 0 & 0 & 0 & 0 & 0 & 0 & 0 & 0 & 0 & 0 & 0 & 0 \\ 0 & 0 & 0 & 0 & 0 & 0 & 0 & 0 & B & -C & 0 & 0 & 0 & 0 & 0 & 0 \\ 0 & 0 & 0 & 0 & 0 & 0 & 0 & 0 & 0 & 0 & 0 & 0 & 1 & 0 & -A & 0 \\ 0 & 0 & 0 & 0 & 0 & 0 & 0 & 0 & 0 & 0 & B & -C & 0 & 0 & 0 & 0 \\ 0 & 0 & 0 & 0 & 0 & 0 & 0 & 0 & 0 & 0 & 0 & 0 & 1 & 0 & -A \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & B & -C & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & -C & -B & 0 & 0 & 0 & 0 & 0 & 0 & 0 & 0 \\ 0 & 0 & 0 & 0 & 0 & 0 & 0 & 0 & 0 & 0 & 0 & 0 & 0 & -1 & 0 & -A \\ 0 & 0 & 0 & 0 & 0 & 0 & 0 & 0 & 0 & 0 & -C & -B & 0 & 0 & 0 & 0 \\ 0 & 0 & 0 & 0 & 0 & 0 & 0 & 0 & 0 & 0 & 0 & 0 & 1 & 0 & A & 0 \end{bmatrix} \quad (14)$$

In this way, the matrix [W] is a 16-row×16-column matrix, including irrational numbers A, B, and C as shown in Table 1 and defined by the cosine function in the two-dimensional 4×4 DCT, negative irrational numbers −A, −B, and −C of them, "0" and "1".

The transposition matrices $[Q^t]$, $[V^t]$, and $[W^t]$ of the matrices [Q], [V], and [W] are expressed by the following equations 15 to 17:

$$[Q^t] = \begin{bmatrix} 1 & 1 & 0 & 1 & 0 & 0 & 0 & 0 & 0 & 0 & 0 & 0 & 0 & 0 & 0 & 0 \\ 1 & -1 & 1 & 0 & 0 & 0 & 0 & 0 & 0 & 0 & 0 & 0 & 0 & 0 & 0 & 0 \\ 1 & -1 & -1 & 0 & 0 & 0 & 0 & 0 & 0 & 0 & 0 & 0 & 0 & 0 & 0 & 0 \\ 1 & 1 & 0 & -1 & 0 & 0 & 0 & 0 & 0 & 0 & 0 & 0 & 0 & 0 & 0 & 0 \\ 0 & 0 & 0 & 0 & 1 & 1 & 0 & 1 & 0 & 0 & 0 & 0 & 0 & 0 & 0 & 0 \\ 0 & 0 & 0 & 0 & 1 & -1 & 1 & 0 & 0 & 0 & 0 & 0 & 0 & 0 & 0 & 0 \\ 0 & 0 & 0 & 0 & 1 & -1 & -1 & 0 & 0 & 0 & 0 & 0 & 0 & 0 & 0 & 0 \\ 0 & 0 & 0 & 0 & 1 & 1 & 0 & -1 & 0 & 0 & 0 & 0 & 0 & 0 & 0 & 0 \\ 0 & 0 & 0 & 0 & 0 & 0 & 0 & 0 & 1 & 1 & 0 & 1 & 0 & 0 & 0 & 0 \\ 0 & 0 & 0 & 0 & 0 & 0 & 0 & 0 & 1 & -1 & 1 & 0 & 0 & 0 & 0 & 0 \\ 0 & 0 & 0 & 0 & 0 & 0 & 0 & 0 & 1 & -1 & -1 & 0 & 0 & 0 & 0 & 0 \\ 0 & 0 & 0 & 0 & 0 & 0 & 0 & 0 & 1 & 1 & 0 & -1 & 0 & 0 & 0 & 0 \\ 0 & 0 & 0 & 0 & 0 & 0 & 0 & 0 & 0 & 0 & 0 & 0 & 1 & 1 & 0 & 1 \\ 0 & 0 & 0 & 0 & 0 & 0 & 0 & 0 & 0 & 0 & 0 & 0 & 1 & -1 & 1 & 0 \\ 0 & 0 & 0 & 0 & 0 & 0 & 0 & 0 & 0 & 0 & 0 & 0 & 1 & -1 & -1 & 0 \\ 0 & 0 & 0 & 0 & 0 & 0 & 0 & 0 & 0 & 0 & 0 & 0 & 1 & 1 & 0 & -1 \end{bmatrix} \quad (15)$$

$$= \begin{bmatrix} Q1^t & & & 0 \\ & Q1^t & & \\ & & Q1^t & \\ 0 & & & Q1^t \end{bmatrix}$$

$$[V^r] = \begin{bmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 0 & 1 & 1 \\ 0 & 0 & 0 & 0 & 0 & 0 & 0 & 0 & 0 & 0 & 0 & 0 & 0 & 1 & -1 & 1 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 0 & -1 & -1 & 1 \\ 0 & 0 & 0 & 0 & 0 & 0 & 0 & 0 & 0 & 0 & 0 & 0 & 1 & 0 & -1 & -1 \end{bmatrix} \quad (16)$$

$$= \begin{bmatrix} V1 & 0 & 0 & 0 \\ 0 & V2 & 0 & 0 \\ 0 & 0 & V3' & V4' \\ 0 & 0 & V5' & V6' \end{bmatrix}$$

$$[W^r] = \begin{bmatrix} 1 & 0 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & B & 0 & -C & 0 & 0 & 0 & 0 & 0 & 0 & 0 & 0 & 0 & 0 & 0 & 0 \\ 0 & -C & 0 & -B & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & B & 0 & -C & 0 & 0 & 0 & 0 & 0 \\ 0 & 0 & 0 & 0 & 0 & 0 & 0 & 0 & -C & 0 & -B & 0 & 0 & 0 & 0 & 0 \\ 0 & 0 & 0 & 0 & B & 0 & 0 & 0 & 0 & 0 & 0 & -C & 0 & 0 & 0 & 0 \\ 0 & 0 & 0 & 0 & -C & 0 & 0 & 0 & 0 & 0 & 0 & -B & 0 & 0 & 0 & 0 \\ 0 & 0 & 0 & 0 & 0 & 0 & B & 0 & 0 & 0 & 0 & 0 & 0 & 0 & -C & 0 \\ 0 & 0 & 0 & 0 & 0 & 0 & -C & 0 & 0 & 0 & 0 & 0 & 0 & 0 & B & 0 \\ 0 & 0 & 0 & 0 & 0 & 1 & 0 & 0 & 0 & 0 & 0 & 0 & 0 & 0 & 0 & 1 \\ 0 & 0 & 0 & 0 & 0 & 0 & 0 & 1 & 0 & 0 & 0 & 0 & 0 & -1 & 0 & 0 \\ 0 & 0 & 0 & 0 & 0 & -A & 0 & 0 & 0 & 0 & 0 & 0 & 0 & 0 & 0 & A \\ 0 & 0 & 0 & 0 & 0 & 0 & 0 & -A & 0 & 0 & 0 & 0 & 0 & -A & 0 & 0 \end{bmatrix} \quad (17)$$

The transposition matrix $[Q^r]$ is expressed as a 16×16 constant matrix in which transposition sub-matrices $[Q1^r]$ consisting of the following 4×4 sub-matrices are arranged in a diagonal manner.

```
 1  1  0  1
 1 -1 -1  0
 0 -1 -1  0
 1  1  0 -1
```

The transposition matrix $[V^r]$ is expressed as a 16×16 constant matrix having sub-matrices [V1], [V2], [V3'], [V4'], [V5'], and [V6'] comprising "0", "1", and "−1". The sub-matrices [V1] and [V2] are the same as the sub-matrices [V1] and [V2] indicated in the equation 13.

Basically rearrangement of the data in the rows and data in columns is sufficient for the computation of the matrix in which factors are constituted by "0" and "1" (or "−1"). It is also sufficient for the rearrangement of the data if for example a memory is used to once store the data in the memory and if the data is taken out while changing the method of taking out that data from the method of storage. Accordingly, a multiplication circuit is not needed for computation on a matrix constituted by "0" and "1". Further, it is sufficient for the computation of a matrix having factors constituted by "0", "1", and "−1" if addition processing is carried out for the factor "1" and subtraction processing is carried out for the factor "−1", and therefore it can be processed by an addition-subtraction circuit. Here too, a multiplication circuit is not needed.

Accordingly, in the computation indicated in the above-mentioned equation 9 and equation 10, it is sufficient if the multiplication is carried out only for the matrix [W] including the irrational numbers of A, B, and C and the inverted irrational numbers of −A, −B, and −C, and the transposition matrix $[W^r]$ thereof. In addition, these multiplication computations may be carried out two times.

The computations indicated in the equation 9 and the equation 10 include computations between constant matrices. The results of the computations between these constant matrices become also constant matrices. Accordingly, when a computation between the constant matrices is previously calculated, it is not necessary to subsequently perform a matrix computation in the order indicated in the equation 9 and the equation 10.

Basically, addition and subtraction computations with respect to the inner products between the above constant matrices and minimum multiplications with respect to the irrational numbers of A, B, and C and −A, −B, and −C are carried out in accordance with the equation 9, to obtain the desired two-dimensional 4×4 DCT result. Accordingly, a two-dimensional 4×4 DCT method in accordance with the present invention is realized by this fundamental method. Also, a two-dimensional 4×4 DCT system in accordance with the present invention has a circuit construction performing the fundamental two-dimensional 4×4 DCT method.

Similarly, addition and subtraction computations with respect to the inner products between the above constant matrices and minimum multiplications with respect to the irrational numbers of A, B, and C and −A, −B, and −C are carried out in accordance with the equation 10, to obtain the desired two-dimensional 4×4 IDCT result. Accordingly, a two-dimensional 4×4 IDCT method in accordance with the present invention is realized by this fundamental method. Also, a two-dimensional 4×4 IDCT system in accordance with the present invention has a circuit construction performing the fundamental two-dimensional 4×4 IDCT method.

More preferable methods in place of the above fundamental methods will be described.

The matrix [RQ], which is the inner product between the constant matrix [R] and constant matrix [Q] in the equation 9, will be shown in the following equation 18:

$$[RQ] = \begin{bmatrix} 1\,1\,1\,1 & 0\,0\,0\,0 & 0\,0\,0\,0 & 0\,0\,0\,0 \\ 0\,0\,0\,0 & 1\,1\,1\,1 & 0\,0\,0\,0 & 0\,0\,0\,0 \\ 0\,0\,0\,0 & 0\,0\,0\,0 & 1\,1\,1\,1 & 0\,0\,0\,0 \\ 0\,0\,0\,0 & 0\,0\,0\,0 & 0\,0\,0\,0 & 1\,1\,1\,1 \\ 1\,\text{-}1\,\text{-}1\,1 & 0\,0\,0\,0 & 0\,0\,0\,0 & 0\,0\,0\,0 \\ 0\,0\,0\,0 & 1\,\text{-}1\,\text{-}1\,1 & 0\,0\,0\,0 & 0\,0\,0\,0 \\ 0\,0\,0\,0 & 0\,0\,0\,0 & 1\,\text{-}1\,\text{-}1\,1 & 0\,0\,0\,0 \\ 0\,0\,0\,0 & 0\,0\,0\,0 & 0\,0\,0\,0 & 1\,\text{-}1\,\text{-}1\,1 \\ 0\,1\,\text{-}1\,0 & 0\,0\,0\,0 & 0\,0\,0\,0 & 0\,0\,0\,0 \\ 0\,0\,0\,0 & 0\,1\,\text{-}1\,0 & 0\,0\,0\,0 & 0\,0\,0\,0 \\ 0\,0\,0\,0 & 0\,0\,0\,0 & 0\,1\,\text{-}1\,0 & 0\,0\,0\,0 \\ 0\,0\,0\,0 & 0\,0\,0\,0 & 0\,0\,0\,0 & 0\,1\,\text{-}1\,0 \\ 1\,0\,0\,\text{-}1 & 0\,0\,0\,0 & 0\,0\,0\,0 & 0\,0\,0\,0 \\ 0\,0\,0\,0 & 1\,0\,0\,\text{-}1 & 0\,0\,0\,0 & 0\,0\,0\,0 \\ 0\,0\,0\,0 & 0\,0\,0\,0 & 1\,0\,0\,\text{-}1 & 0\,0\,0\,0 \\ 0\,0\,0\,0 & 0\,0\,0\,0 & 0\,0\,0\,0 & 1\,0\,0\,\text{-}1 \end{bmatrix} \quad (18)$$

Also, the matrix [RQ] is a 16×16 constant matrix having regularity wherein "0", "1", and "−1" are factors. Therefore, according to this method, it is possible to realize two matrix computations (addition-subtraction) in the equation 9 by one addition-subtraction.

Further, when the matrix computation [R] [Q] [R] [Q] is expressed as the matrix [RQRQ] considering the matrix computation in the equation 9, it can be defined in the equation 19 as the inner product with the matrix [RQ] in the equation 18:

$$[RQRQ] = \begin{bmatrix} 1\,1\,1\,1 & 1\,1\,1\,1 & 1\,1\,1\,1 & 1\,1\,1\,1 \\ 1\,\text{-}1\,\text{-}1\,1 & 1\,\text{-}1\,\text{-}1\,1 & 1\,\text{-}1\,\text{-}1\,1 & 1\,\text{-}1\,\text{-}1\,1 \\ 0\,1\,\text{-}1\,0 & 0\,1\,\text{-}1\,0 & 0\,1\,\text{-}1\,0 & 0\,1\,\text{-}1\,0 \\ 1\,0\,0\,\text{-}1 & 1\,0\,0\,\text{-}1 & 1\,0\,0\,\text{-}1 & 1\,0\,0\,\text{-}1 \\ 1\,1\,1\,1 & \text{-}1\text{-}1\text{-}1\text{-}1 & \text{-}1\text{-}1\text{-}1\text{-}1 & 1\,1\,1\,1 \\ 1\,\text{-}1\,\text{-}1\,1 & \text{-}1\,1\,1\,\text{-}1 & \text{-}1\,1\,1\,\text{-}1 & 1\,\text{-}1\,\text{-}1\,1 \\ 0\,1\,\text{-}1\,0 & 0\,\text{-}1\,1\,0 & 0\,\text{-}1\,1\,0 & 0\,1\,\text{-}1\,1 \\ 1\,0\,0\,\text{-}1 & \text{-}1\,0\,0\,1 & \text{-}1\,0\,0\,1 & 1\,0\,0\,\text{-}1 \\ 0\,0\,0\,0 & 1\,1\,1\,1 & \text{-}1\text{-}1\text{-}1\text{-}1 & 0\,0\,0\,0 \\ 0\,0\,0\,0 & 1\,\text{-}1\,\text{-}1\,1 & 1\,\text{-}1\,\text{-}1\,1 & 0\,0\,0\,0 \\ 0\,0\,0\,0 & 0\,1\,\text{-}1\,0 & 0\,\text{-}1\,1\,0 & 0\,0\,0\,0 \\ 0\,0\,0\,0 & 1\,0\,0\,0 & \text{-}1\,0\,0\,1 & 0\,0\,0\,0 \\ 1\,1\,1\,1 & 0\,0\,0\,0 & 0\,0\,0\,0 & \text{-}1\text{-}1\text{-}1\text{-}1 \\ 1\,\text{-}1\,\text{-}1\,1 & 0\,0\,0\,0 & 0\,0\,0\,0 & \text{-}1\,1\,1\,\text{-}1 \\ 0\,1\,\text{-}1\,0 & 0\,0\,0\,0 & 0\,0\,0\,0 & 0\,\text{-}1\,1\,0 \\ 1\,0\,0\,\text{-}1 & 0\,0\,0\,0 & 0\,0\,0\,0 & \text{-}1\,0\,0\,1 \end{bmatrix} \quad (19)$$

Also the matrix [RQ] [RQ] is a 16×16 constant matrix having factors constituted by "0", "1", and "−1". Therefore, according to this method, four matrix computations (addition-subtraction) in the equation 9 can be realized by one addition-subtraction.

Similarly, if the matrix [Q'R] obtained by the matrix computation between the constant matrix [Q'] and the constant matrix [R] in the equation 10 is found, the following equation 20 is obtained:

$$[Q^{t}R] = \begin{bmatrix} 1\,0\,0\,0 & 1\,0\,0\,0 & 0\,0\,0\,0 & 1\,0\,0\,0 \\ 1\,0\,0\,0 & \text{-}1\,0\,0\,0 & 1\,0\,0\,0 & 0\,0\,0\,0 \\ 1\,0\,0\,0 & \text{-}1\,0\,0\,0 & \text{-}1\,0\,0\,0 & 0\,0\,0\,0 \\ 1\,0\,0\,0 & 1\,0\,0\,0 & 0\,0\,0\,0 & \text{-}1\,0\,0\,0 \\ 0\,1\,0\,0 & 0\,1\,0\,0 & 0\,0\,0\,0 & 0\,1\,0\,0 \\ 0\,1\,0\,0 & 0\,\text{-}1\,0\,0 & 0\,1\,0\,0 & 0\,0\,0\,0 \\ 0\,1\,0\,0 & 0\,\text{-}1\,0\,0 & 0\,\text{-}1\,0\,0 & 0\,0\,0\,0 \\ 0\,1\,0\,0 & 0\,1\,0\,0 & 0\,0\,0\,0 & 0\,\text{-}1\,0\,0 \\ 0\,0\,1\,0 & 0\,0\,1\,0 & 0\,0\,0\,0 & 1\,0\,0\,0 \\ 0\,0\,1\,0 & 0\,0\,\text{-}1\,0 & 0\,1\,0\,0 & 0\,0\,0\,0 \\ 0\,0\,1\,0 & 0\,0\,\text{-}1\,0 & 0\,\text{-}1\,0\,0 & 0\,0\,0\,0 \\ 0\,0\,1\,0 & 0\,0\,1\,0 & 0\,0\,0\,0 & \text{-}1\,0\,0\,0 \\ 0\,0\,0\,1 & 0\,0\,0\,1 & 0\,0\,0\,0 & 0\,0\,0\,1 \\ 0\,0\,0\,1 & 0\,0\,0\,\text{-}1 & 0\,0\,0\,1 & 0\,0\,0\,0 \\ 0\,0\,0\,1 & 0\,0\,0\,\text{-}1 & 0\,0\,0\,\text{-}1 & 0\,0\,0\,0 \\ 0\,0\,0\,1 & 0\,0\,0\,1 & 0\,0\,0\,0 & 0\,0\,0\,\text{-}1 \end{bmatrix} \quad (20)$$

Also the matrix [Q'R] is a 16×16 constant matrix having factors constituted by "0", "1", and "−1". Therefore, according to this method, two matrix computations (addition-subtraction) in the equation 10 can be realized by one addition-subtraction.

Further, when the matrix [Q'RQ'R] of the result of the matrix computation between the matrix [Q'R] and the matrix [Q'R] is found, it is expressed by the following equation 21:

$$[Q^rRQ^rR] = \begin{bmatrix} 1101 & 1101 & 0000 & 1101 \\ 1\text{-}110 & 1\text{-}110 & 0000 & 1\text{-}110 \\ 1\text{-}1\text{-}10 & 1\text{-}1\text{-}10 & 0000 & 1\text{-}1\text{-}10 \\ 110\text{-}1 & 110\text{-}1 & 110\text{-}1 & 110\text{-}1 \\ 1101 & \text{-}1\text{-}10\text{-}1 & 1101 & 0000 \\ 1\text{-}110 & \text{-}11\text{-}10 & 1101 & 0000 \\ 1\text{-}1\text{-}10 & \text{-}1110 & 1\text{-}1\text{-}10 & 0000 \\ 110\text{-}1 & \text{-}110\text{-}1 & 110\text{-}1 & 0000 \\ 1101 & \text{-}1\text{-}10\text{-}1 & \text{-}1\text{-}10\text{-}1 & 0000 \\ 1\text{-}110 & \text{-}11\text{-}10 & \text{-}11\text{-}10 & 0000 \\ 1\text{-}1\text{-}10 & \text{-}1110 & \text{-}1111 & 0000 \\ 110\text{-}1 & \text{-}110\text{-}1 & \text{-}110\text{-}1 & 0000 \\ 1101 & 1101 & 0000 & 1101 \\ 1\text{-}110 & 1\text{-}11\text{-}0 & 0000 & 1\text{-}110 \\ 1\text{-}1\text{-}10 & 1\text{-}1\text{-}1\text{-}0 & 0000 & 1\text{-}1\text{-}10 \\ 110\text{-}1 & 110\text{-}1 & 110\text{-}1 & 110\text{-}1 \end{bmatrix} \quad (21)$$

Also, the matrix $[Q^rRQ^rR]$ is a 16×16 constant matrix having factors constituted by "0", "1", and "−1". Therefore, according to this method, four matrix computations (addition-subtraction) in the equation 10 can be realized by one addition-subtraction.

A description will be made first of the method of computation to which the above-mentioned matrix [RQ] is applied.

A 4×4 DCT fundamental computation can be calculated by the following four steps:

Step 1: Calculation of [S]=[RQ] [X]
Step 2: Calculation of [T]=[RQ] [S]
Step 3: Calculation of [U]=[V] [T]
Step 4: Calculation of [Y]=¼×[W] [U]

This computation means that three addition-subtractions are carried out in step 1 to step 3 and one multiplication is carried out in step 4. Note that, it is sufficient if the computation of multiplying a coefficient ¼ in step 4 (or computation of dividing by 4) is performed by the processing of shifting a binary data by 2 bits, and therefore multiplication or division is not needed.

Accordingly, the computation of the above-mentioned 4×4 DCT can be realized by three addition-subtraction circuits and one multiplication circuit. That is, a hardware circuit for calculating the 4×4 DCT by the above-mentioned four steps with the use of three addition-subtraction circuits and a multiplication-addition and subtraction circuit may be realized by sequentially series-connecting (a) An addition-subtraction circuit performing the processing of step 1;
(b) An addition-subtraction circuit performing the processing of step 2;
(c) An addition-subtraction circuit performing the processing of step 3; and
(d) A multiplication-addition and subtraction circuit performing the processing of step 4.

The computations at step 1 and step 2 are the addition-subtraction corresponding to the inner product with respect to the same matrix [RQ], and therefore they can be realized by the same addition-subtraction circuit.

From the viewpoint of such a circuit structure and input timing of the input data, the first addition-subtraction circuit and the second addition-subtraction circuit are shared and provision is made of a circuit for primarily holding the result of the intermediate computation processing with the computation circuit, whereby time division processing can be carried out.

That is, the above-described step 1, step 2, and step 3 are the addition-subtraction processing, and therefore the addition-subtraction of step 1 to step 3 is performed using two addition-subtraction circuits.

The hardware for calculating the 4×4 DCT by the above-mentioned four steps using two addition-subtraction circuits is realized by sequentially series-connecting the following:

(a) An addition-subtraction circuit performing the processing of step 1 and a part of the processing of step
(b) An intermediate value holding circuit holding the result of processing at step 1 and the result of processing at step 2 which is not used when a part of the processing of step 2 is carried out in (a);
(c) An addition-subtraction circuit performing the remainder of the processing of step 2 and the processing of step 3;
(d) An intermediate value holding circuit holding the result of the processing of step 3; and
(e) A multiplication-addition and subtraction circuit performing the processing of step 4.

Moreover, the matrix [RQRQ], which is the result of computation between the matrix [RQ] and the matrix [RQ], is also a constant matrix, and therefore can be subjected to the addition-subtraction processing.

That is, in the computations at the above-described step 1 and step 2, the number of times of processing of the addition-subtraction corresponding to a direct multiplication of the matrix [RQRQ] with the input data [X] is reduced to one time, so that one addition-subtraction circuit can be deleted. As a result, the following processing is to be carried out:

Step 1: Calculation of [T]=[RQRQ] [X]
Step 2: Calculation of [U]=[V] [T]
Step 3: Calculation of [Y]=¼[W] [U]

The above-mentioned addition-subtraction circuit can be basically realized by adding two data on one hand and by combining a circuit comprising a subtracting circuit as the basic unit on the other hand.

Also, similarly, the computation of the first aspect of the two-dimensional 4×4 IDCT system is performed by the following four steps:

Step 1: [U']=[W$^r$] [Y]
Step 2: [T']=[V$^r$] [U']
Step 3: [S']=[Q$^r$] [R] [T']
Step 4: [X]=¼×[Q$^r$] [R] [S']

The two-dimensional 4×4 IDCT system performing this computation uses, as the first aspect, three addition-subtraction circuits and a multiplication-addition and subtraction circuit and sequentially series-connects the following:

(a) A multiplication-addition and subtraction circuit performing the processing of step 1;
(b) An addition-subtraction circuit performing the processing of step 2;
(c) An addition-subtraction circuit performing the processing of step 3; and
(d) An addition-subtraction circuit performing the 1processing of step 4.

Also, here, it is sufficient if the coefficient: ¼ is merely shifted by 2 bits in the binary computation. No multiplication or division has to be carried out. Accordingly, this computation is removed in the construction.

Also, similar to the second aspect of the above-described two-dimensional 4×4 DCT system, the same addition-subtraction processing can be performed by time division also for the two-dimensional 4×4 IDCT system. In this case, the structure consists of a sequential series connection of the following:

(a) A multiplication-addition and subtraction circuit performing the processing of step 1.
(b) An intermediate value holding circuit holding the result of the processing of step 1;
(c) An addition-subtraction circuit performing the processing of step 2 and a part of the processing of step 3.
(d) An intermediate value holding circuit holding the result of the processing of step 2 and the result of the processing of step 3 not used when a part of the processing of step 2 is carried out in (c); and
(e) An addition-subtraction circuit performing the remainder of the processing of step 2 and the processing of step 5.

Also, the 4×4 IDCT in the equation 20 can be calculated by the following three steps:

Step 1: $[U']=[W^t][Y]$
Step 2: $[T']=[V^t][U']$
Step 3: $[X]=¼×[Q^t RQ^t R][T']$ The hardware circuit for performing the computation of this 4×4 IDCT by the above-mentioned three steps is constituted by:

(a) A multiplication-addition and subtraction circuit performing the processing of step 1.
(b) An addition-subtraction circuit performing the processing of step 2; and
(c) An addition-subtraction circuit performing the processing of step 3.

According to the present invention, there is provided a two-dimensional 4×4 discrete cosine transform (DCT) system sequentially performing a matrix computation for transforming input data [X] of a matrix form, including:

a first constant matrix [R] having one "1" at different positions in each of the rows and each of the columns;
a second constant matrix [Q] having a plurality of sub-matrices along a diagonal line, each sub-matrix being constituted by a combination of "+1", "−1", and "0", and the non-diagonal elements being "0";
a third constant matrix the same as the above-described first matrix [R];
a fourth constant matrix the same as the above-described second matrix [Q];
a fifth constant matrix ([V]) having factors being "+1", "−1", or "0"; and
a sixth matrix ([W]) including an irrational number defined by the two-dimensional 4×4 discrete cosine transformation.

The two-dimensional 4×4 DCT system includes:

a first addition-subtraction circuit which performs an addition-subtraction computation corresponding to the inner product of a seventh constant matrix [RQ] defined by the inner product of the first constant matrix [R] and the second constant matrix [Q], with the input data [X] of the matrix form;
a second addition-subtraction circuit which performs the addition-subtraction computation corresponding to the inner product of an eighth constant matrix [RQ] defined by the inner product of the third constant matrix [R] and the fourth constant matrix [Q], with the result of computation in the first addition-subtraction circuit;
a third addition-subtraction circuit which performs the addition-subtraction computation corresponding to the inner product of the fifth constant matrix [V] with the result of computation in the second addition-subtraction circuit; and a multiplication-addition and subtraction circuit which includes two multipliers and performs the matrix computation of the sixth matrix [W] and the result of computation in the third addition-subtraction circuit.

The first addition-subtraction circuit and the second addition-subtraction circuit may have the same circuit structure.

According to the present invention, there is also provided a two-dimensional 4×4 DCT system including:

a first addition-subtraction circuit which performs the addition-subtraction computation corresponding to an inner product of a seventh constant matrix [RQRQ] defined by the inner product of the first constant matrix [R], the second constant matrix [Q], the third constant matrix [R], and the fourth constant matrix [Q] with the input data [X] of the matrix form;
a second addition-subtraction circuit which performs the addition-subtraction computation corresponding to the inner product of the fifth constant matrix [V] with the result of computation in the first addition-subtraction circuit; and
a multiplication-addition and subtraction circuit which includes two multipliers and performs the matrix computation of the sixth matrix [W] and the result of computation in the third addition-subtraction circuit.

According to the present invention, there is further provided a two-dimensional 4×4 DCT system including:

a first addition-subtraction circuit;
a first intermediate value holding circuit;
a second addition-subtraction circuit;
a second intermediate value holding circuit; and
a multiplication-addition subtraction circuit including two multipliers, wherein the first addition-subtraction circuit performs a first addition-subtraction of the input data [X] of the matrix form and the seventh constant matrix ([RQ]) and a part of the second addition-subtraction of the result of this first addition-subtraction and the third constant matrix ([RQ]);

the first intermediate value holding circuit holds the result of computation of the first addition-subtraction circuit;

the second addition-subtraction circuit receives as its input the result of the computation of the first addition-subtraction circuit held in the first intermediate value holding circuit and performs a second addition-subtraction which has not been carried out in the first addition-subtraction circuit, in the second multiplication, and a third addition-subtraction of the result of the second addition-subtraction and the fifth constant matrix ([V]);

the second intermediate value holding circuit holds the result of computation of the second addition-subtraction circuit; and the multiplication-addition subtraction circuit receives as its input the result of the computation of the second addition-subtraction circuit held in the second intermediate value holding circuit and performs the computation of multiplying the result of the third addition-subtraction by the sixth matrix ([W]) including the irrational numbers defined by the two-dimensional 4×4 discrete cosine transformation.

Each of the addition-subtraction circuits may include a unit circuit comprising an adder performing the addition of the first input and the second input and a subtracter subtracting the second input from the first input, and by being constituted so as to perform the computation by one or a combination of a plurality of the unit circuits.

According to the present invention, there is provided a two-dimensional 4×4 discrete cosine inverse transformation (IDCT) system which sequentially performs a matrix computation for transforming data to input data [X] of a matrix form, including:

a first matrix [$W^t$] which is a transposition matrix of a matrix ([W]) including the irrational numbers defined by the two-dimensional 4×4 discrete cosine transformation;

a second matrix [$V^t$] which is the transposition matrix of the constant matrix ([V]) having factors of "+1", "−1", or "0";

a third matrix ([R]) which is a constant matrix having one "1" at different positions in each of the rows and each of the columns;

a fourth matrix [Q=] which is the transposition matrix of the constant matrix ([Q]) having a plurality of sub-matrices along a diagonal line, each sub-matrix being constituted by a combination of "+1", "−1", and "0", and the non-diagonal elements being "0";

a fifth matrix [R] which is the same constant matrix as said third matrix; and a sixth matrix [$Q^t$] which is the same as said fourth matrix.

The two-dimensional 4×4 IDCT system includes:

a multiplication-addition and subtraction circuit having two multipliers multiplying the input data by the first matrix [$W^t$];

a first addition-subtraction circuit which performs an addition-subtraction corresponding to an inner product between the result of multiplication-addition in the multiplication-addition subtraction circuit and the second matrix [$V^t$];

a second addition-subtraction circuit which performs a second addition-subtraction computation corresponding to the inner product between the result of said first addition-subtraction and a seventh matrix [$Q^tR$], which is the constant matrix, by the result of the computation of the third matrix [R] with the fourth matrix [$Q^t$]; and a third addition-subtraction circuit which performs a third addition-subtraction computation corresponding to the inner product between the result of the second addition-subtraction and an eighth matrix [$Q^tR$], which is a constant matrix, by the result of the computation of the fifth matrix [R] with the sixth matrix [$Q^t$].

The second addition-subtraction circuit and the third addition-subtraction circuit may have the same circuit structure.

According to the present invention, there is also provided a two-dimensional 4×4 IDCT system including:

a multiplication-addition subtraction circuit having two multipliers multiplying the input data by the first matrix [$W^t$];

a first addition-subtraction circuit which performs an addition-subtraction corresponding to the inner product between the result of multiplication-addition in the multiplication-addition subtraction circuit and the second matrix [$V^t$]; and a second addition-subtraction circuit which performs a second addition-subtraction computation corresponding to the inner product between the result of the first addition-subtraction and a seventh matrix [$Q^tRQ^tR$], which is a constant matrix, by the result of the computation of the third matrix [R], fourth matrix [$Q^t$], fifth matrix [R], and sixth matrix [$Q^t$].

According to the present invention, there is further provided a two-dimensional 4×4 IDCT system including:

a multiplication-addition and subtraction circuit;

a first intermediate value holding circuit;

a first addition-subtraction circuit;

a second intermediate value holding circuit; and a second addition-subtraction circuit, the multiplication-addition and subtraction circuit performs the multiplication of the input data of the matrix form by the first matrix [$W^t$];

the first intermediate value holding circuit holds the result of the computation in the multiplication-addition circuit;

the first addition-subtraction circuit receives the result of the computation at the multiplication-addition and subtraction circuit which is held in the first intermediate value holding circuit and performs the first addition-subtraction of the received result and the second constant matrix ([$V^t$]) and a part of the second addition-subtraction of the first addition-subtraction result and a seventh constant matrix ([$Q^tR$]);

the second intermediate value holding circuit holds the result of computation of the first addition-subtraction circuit; and the second addition-subtraction circuit receives the result of the computation at the first addition-subtraction circuit which is held in the second intermediate value holding circuit and performs a remaining second addition-subtraction having not yet been carried in the first addition-subtraction circuit and a third addition-subtraction of the result of the remaining second addition-subtraction and the eighth constant matrix ([$Q^tR$]).

Each addition-subtraction circuit may include a unit circuit comprising an adder performing the addition of the first input and the second input and a subtracter subtracting the second input from the first input and may be constituted so as to perform the computation by one or a combination of a plurality of the unit circuits.

BRIEF DESCRIPTION OF THE DRAWINGS

The objects and features and other objects and features of the present invention will be described in more detail with reference to the accompanying drawings, in which;

FIG. 3 is a view indicating a first signal processing flow of the addition-subtraction circuit shown in FIG. 1;

FIG. 4 is a view indicating a second signal processing flow of the addition-subtraction circuit shown in FIG. 1;

FIG. 5 is a view indicating a third signal processing flow of the addition-subtraction circuit shown in FIG. 1;

FIG. 6 is a view indicating a circuit structure of a multiplier-adder and subtracter shown in FIG. 1;

FIG. 7 is a view indicating the circuit structure of a two-dimensional 4×4 IDCT system according to the first embodiment of the present invention;

DESCRIPTION OF THE PREFERRED EMBODIMENTS

As the first embodiment of the present invention, a description will be made of a two-dimensional 4×4 discrete cosine transformation (two-dimensional 4×4 DCT) system and a two-dimensional 4×4 discrete cosine inverse transformation (two-dimensional 4×4 IDCT) system which are constituted by two addition-subtraction circuits and one multiplication-addition and subtraction circuit and perform time division processing.

Figure 1:
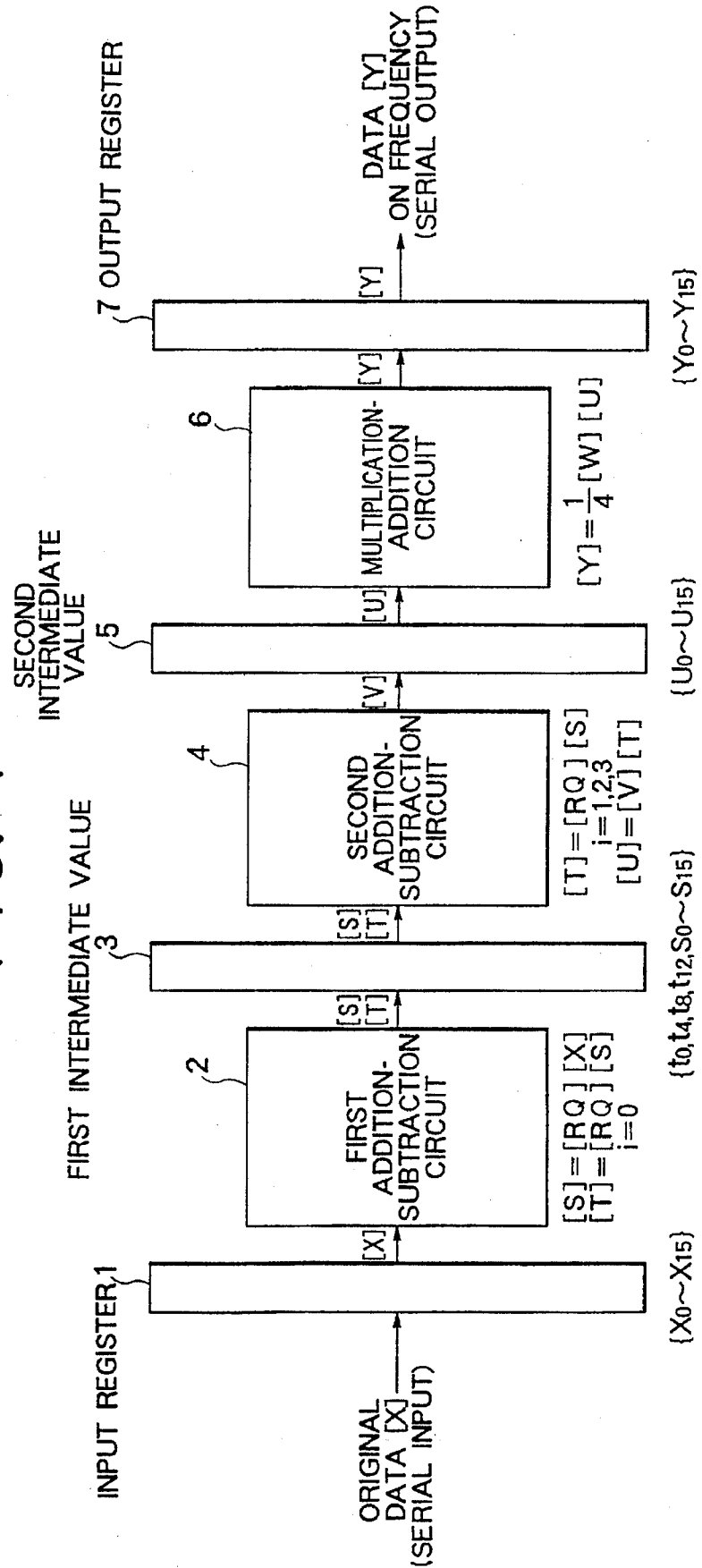
FIG. 1 is a view indicating a circuit structure of a two-dimensional 4×4 DCT system according to the first embodiment of the present invention.

FIG. 1 is a circuit view of an embodiment of the two-dimensional 4×4 DCT system.

As shown in FIG. 1, the two-dimensional 4×4 DCT system is constituted by an input register 1 which receives the input (original) data [X] in the matrix form as a serial input, a first addition-subtraction circuit 2, a first intermediate value holding circuit 3, a second addition-subtraction circuit 4, a second intermediate value holding circuit 5, a multiplication-addition and subtraction circuit 6, and an output register 7.

This two-dimensional 4×4 DCT system has a three-stage pipeline structure comprising the first addition-subtraction circuit 2 as the first stage, the second addition-subtraction circuit 4 as the second stage via the first intermediate value holding circuit 3, and the multiplication-addition and subtraction circuit 6 as the third stage via the second intermediate value holding circuit 5.

The two-dimensional 4×4 DCT circuit shown in FIG. 1 performs the computations defined in the equation 9 by the following four steps using the two addition-subtraction circuits and one multiplication-addition and multiplication circuit:

Step 1: Calculation of [S]=[RQ] [X]
Step 2: Calculation of [T]=[RQ] [S]
Step 3: Calculation of [U]=[V] [T]
Step 4: Calculation of [Y]=¼×[W] [U]

The matrices [RQ], [V], and [W] in the equation 9 are defined in the above-mentioned equations 18, 13, and 14, respectively.

The input register 1 receives as its input the original data [X] defined in the equation 7 at a word serial at each one clock cycle. The original input matrix data [X] consists of 16 elements, and therefore 16 cycles are required for alignment of all data of original data [X] in the input register 1.

The first addition-subtraction circuit 2 performs the calculation of step 1 and a part of the calculation of step 2.

The first intermediate value holding circuit 3 holds the result of calculation of the first addition-subtraction circuit 2. That is, the first intermediate value holding circuit 3 holds the result of calculation in step 1 which is not used in the calculation of step 2 and the part of the result of calculation of step 2.

The second addition-subtraction circuit 4 performs a part of the calculation of step 2 and the calculation of step 3.

The third intermediate value holding circuit 5 holds the result of the second addition-subtraction circuit 4. That is, the third intermediate value holding circuit 5 holds the result of calculation of step 3.

The multiplication-addition and subtraction circuit 6 performs the calculation of step 4.

The output register 7 outputs the data [Y] on the frequency defined in equation 6 to the word serial at each 1 clock cycle.

Below, for simplification, it is assumed that one addition, subtraction, and multiplication-addition and subtraction are completed in one clock cycle, and the first addition-subtraction circuit 2, the second addition-subtraction circuit 4, and the multiplication-addition and subtraction circuit 6 complete the predetermined addition-subtraction and multiplication-addition during 16 cycles, respectively.

Explanation of computation at step 1

At step 1, multiplication with the constant matrix [RQ] indicated in the equation 19, in which the coefficients are "1", "−1", or "0" and in which at most four factors of "1" and "−1" exist in each column, is performed.

The output matrix (vector) [S] and the input matrix (vector) [X] of a calculation equation of step 1:

$$[S]=[R][Q][X]$$

are defined as indicated in the following equation 22 and equation 23:

$$[S] = \begin{bmatrix} s_0 \\ s_1 \\ s_2 \\ s_3 \\ s_4 \\ \cdot \\ \cdot \\ \cdot \\ s_{15} \end{bmatrix} \quad (22)$$

$$[X] = \begin{bmatrix} x_0(=x_{00}) \\ x_1(=x_{01}) \\ x_2(=x_{02}) \\ x_3(=x_{03}) \\ x_4(=x_{10}) \\ \cdot \\ \cdot \\ x_{15}(=x_{33}) \end{bmatrix} \quad (23)$$

When the definition is made in this way, the calculation equation of step 1, [S]=[R] [Q] [x], can be expressed by the following equation 24.

$$\begin{aligned} s_i &= x_{4i} + x_{4i+1} + x_{4i+2} + x_{4i+3} \\ s_{i+4} &= x_{4i} - x_{4i+1} - x_{4i+2} + x_{4i+3} \\ s_{i+8} &= x_{4i+1} - x_{4i+2} \\ s_{i+12} &= x_{4i} - x_{4i+3} \\ &\text{wherein } i = 0, 1, 2, 3 \end{aligned} \quad (24)$$

The computation of the equation 24 is carried out using the first addition-subtraction circuit 2.

Figure 2:
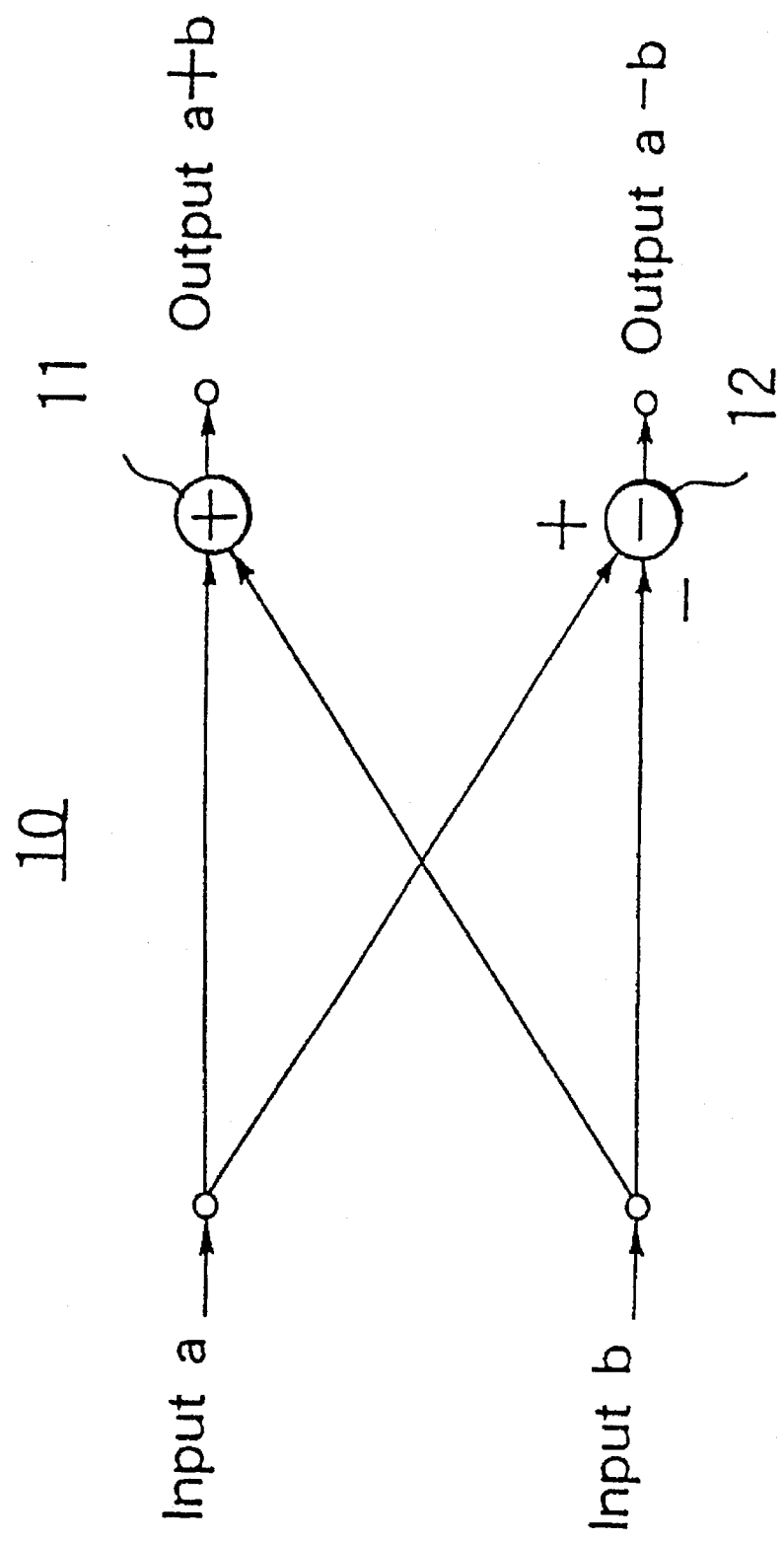
FIG. 2 is a view indicating a fundamental structure of an addition-subtraction circuit for calculation of step 2 of the two-dimensional 4×4 DCT system according to the first embodiment of the present invention.

FIG. 2 is a fundamental structural view of the first addition-subtraction circuit 2, and FIG. 3 is a conceptual view of the signal processing of the addition-subtraction circuit 2 performing the processing by combining the basic circuits shown in FIG. 2.

As shown in FIG. 2, the basic circuit of the first addition-subtraction circuit 2 is constituted by a pair of an adder 11 and a subtracter 12. The input data a and b are applied to both of the adder 11 and the subtracter 12, the adder 11 outputs the result of addition of a and b(a+b), and the subtracter 12 outputs the result of subtraction between a and b(a−b).

FIG. 3 is a signal flow (graph) where the calculation indicated in the equation 24 is carried out by the time division manner using this first addition-subtraction circuit 2.

Four elements of the vector [S] ($s_i$, $s_{i+1}$, $s_{i+8}$, $s_{i+12}$) are found by using the first addition-subtraction circuit 2 three times. That is, the first addition-subtraction circuit 2

(1) Calculates $$(x_{4i}+x_{4i+3})$$

and $$(x_{4i}-x_{4i+3}=s_{i+12})$$

by using the pair of the first stage adder 11a and subtracter 12a the first time;

(2) Calculates $$(x_{4i+1}+x_{4i+2})$$

and $$(x_{4i+1}-x_{4i+2}=s_{i+8})$$

by using the pair of the second stage adder 11b and subtracter 12b the second time; and (3) Calculates $$(x_{4i}+x_{4i+1}+x_{4i+2}+x_{4i+3}=s_i)$$

and $$(x_{4i}-x_{4i+1}-x_{4i+2}+x_{4i+3}=s_{i+4})$$

by using the pair of the third stage adder 11c and subtracter 12c the third time based on the result of calculation of the adders 11a and 11b.

All 16 elements ($s_0$ to $s_{15}$) of the vector [S] are obtained using the first addition-subtraction circuit 2 3×4=12 times, and the calculation of step 1 is executed in 12 clock cycles using the first addition-subtraction circuit 2.

In this way, the number of the clock cycles required for the calculation of step 1 by the first addition-subtraction circuit 2 is smaller by 16−12=4 clock cycles than the 16 clock cycles of the allowable time in which an computation can be performed without disturbance of the pipelines.

Therefore, the first addition-subtraction circuit 2 performs a part of the calculation of step 2 mentioned later by this remaining four clock cycles.

Explanation of computation of step 2

In step 2, in place of the multiplication with the constant matrix [RQ] and the matrix [S], the addition-subtraction is carried out similar to step 1, and the output vector [T] expressed as the equation [T]=[RQ] [S] in step 2 and the input vector [S] in this case are defined as indicated in the following equation 25 and equation 26:

$$[T] = \begin{bmatrix} t_0 \\ t_1 \\ t_2 \\ t_3 \\ t_4 \\ \cdot \\ \cdot \\ \cdot \\ t_{15} \end{bmatrix} \quad (25)$$

$$[S] = \begin{bmatrix} s_0 \\ s_1 \\ s_2 \\ s_3 \\ s_4 \\ \cdot \\ \cdot \\ \cdot \\ s_{15} \end{bmatrix} \quad (26)$$

Accordingly, the equation [T]=[RQ] [S] of step 2 can be expressed as the following equation 27.

$$\begin{aligned} t_i &= s_{4i} + s_{4i+1} + s_{4i+2} + s_{4i+3} \\ t_{i+4} &= s_{4i} - s_{4i+1} - s_{4i+2} + s_{4i+3} \\ t_{i+8} &= s_{4i+1} - s_{4i+2} \\ t_{i+12} &= s_{4i} - s_{4i+3} \\ &\text{wherein } i = 0, 1, 2, 3 \end{aligned} \quad (27)$$

The calculation of the equation 27 is carried out by using the first addition-subtraction circuit 2 and the second addition-subtraction circuit 4.

The structure of the second addition-subtraction circuit 4 is the same as the first addition-subtraction circuit 2.

The signal flow graph where the calculation of the equation 27 is carried out by the time division manner using the first addition-subtraction circuit 2 and the second addition-subtraction circuit 4 is shown in FIG. 4.

The signal flow (graph) in FIG. 4 shows the same computation as the signal flow (graph) in FIG. 3 mentioned in relation to step 1.

As shown in FIG. 4, four elements ($t_i$, $t_{i+1}$, $t_{i+8}$, and $t_{i+12}$) of the vector [T] are found by using the first addition-subtraction circuit 2 and the second addition-subtraction circuit 4 three times.

That is, (1) The first time, using the adder 13a and subtracter 14a, $$(s_{4i}+s_{4i+3})$$

and $$(s_{4i}-s_{4i+3}=t_{i+12})$$

are calculated;

(2) The second time, using the adder 13b and subtracter 14b, $$(s_{4i+1}+s_{4i+2})$$

and $$(s_{4i+1}-s_{4i+2}=t_{i+8})$$

are calculated; and (3) The third time, using the adder 13c and subtracter 14c, $$(s_{4i}+s_{4i+3}+s_{4i+1}+s_{4i+2}=t_i)$$

and $$(s_{4i}+s_{4i+3}-s_{4i+1}-s_{4i+2}=t_{i+4})$$

are calculated.

Accordingly, all 16 elements ($t_0$ to $t_{15}$) of the vector [T] are calculated by using the first addition-subtraction circuit 2 and the second addition-subtraction circuit 4 (3×4)=12 times.

As mentioned above, the first addition-subtraction circuit 2 performs the calculation of step 1 in 12 clock cycles, and therefore there is a margin of 4 clock cycles. For this reason, among the 12 addition-subtractions carried out at step 2, for example, three addition-subtractions in the case where i=0 indicated in equation 28 are carried out by the first addition-subtraction circuit 2 over 3 clock cycles.

That is, the first addition-subtraction circuit 2 calculates the result of calculation of step 2 ($t_0$, $t_4$, $t_8$, $t_{12}$) using the calculation result ($s_0$ to $s_3$) of step 1 over three clock cycles.

Accordingly, after 16 clock cycles at which the calculation in the first addition-subtraction circuit 2 is completed, among the calculation results of step 1, the calculation result ($s_4$ to $s_{15}$) not used in the calculation at step 2 and the calculation result of step 2 ($t_0$, $t_4$, $t_8$, $t_{12}$) are output to the first intermediate value holding circuit 3.

In the first intermediate value holding circuit 3, 16 intermediate values of:

($t_0$, $t_4$, $t_8$, $t_{12}$, $s_4$, $s_5$, $s_6$, $s_7$, $s_8$, $s_9$, $s_{10}$, $s_{11}$, $s_{12}$, $s_{13}$, $s_{14}$, $s_{15}$)

are held.

Further, the calculation in the case where i=1, 2, 3 in the equation 27 of step 2 (calculation for finding $t_1$, $t_2$, $t_3$, $t_5$, $t_6$, $t_7$, $t_9$, $t_{10}$, $t_{11}$, $t_{13}$, $t_{14}$, $t_{15}$) is carried out by using the second addition-subtraction circuit 4 over 3×3=9 clock cycles.

Accordingly, the number of clock cycles required in the calculation of step 2 by the second addition-subtraction circuit 4 is smaller by (16–9)=7 clock cycles than the 16 clock cycles, which is the allowable time in which the computation can be performed without disturbance of the pipelines.

Therefore, the second addition-subtraction circuit 4 performs the calculation of step 3 mentioned later by the remaining 7 clock cycles.

Explanation of computation of step 3

At step 3, the calculation with the matrix [V] indicated in the equation 14 wherein the coefficients are "+1", "−1", or "0" and the four factors of "1" and "−1" exist in each column, and the output vector [U] of the calculation equation [U]=[V] [T] of step 3 and input vector [T] are defined as indicated in the following equation 28 and equation 29:

$$[U] = \begin{bmatrix} u_0 \\ u_1 \\ u_2 \\ u_3 \\ u_4 \\ \cdot \\ \cdot \\ \cdot \\ u_{15} \end{bmatrix} \quad (28)$$

$$[T] = \begin{bmatrix} t_0 \\ t_1 \\ t_2 \\ t_3 \\ t_4 \\ \cdot \\ \cdot \\ \cdot \\ t_{15} \end{bmatrix} \quad (29)$$

The calculation equation [U]=[V] [T] of step 3 can be expressed by the following equation 30:

$$\begin{aligned}
u_0 &= t_0 \\
u_1 &= t_1 \\
u_2 &= t_2 + t_3 \\
u_3 &= t_2 - t_3 \\
u_4 &= t_4 \\
u_5 &= t_5 \\
u_6 &= t_6 + t_7 \\
u_7 &= t_6 - t_7 \\
u_8 &= t_8 + t_{12} \\
u_9 &= t_8 - t_{12} \\
u_{10} &= t_9 + t_{13} \\
u_{11} &= t_9 - t_{13} \\
u_{12} &= t_{10} + t_{15} \\
u_{13} &= t_{11} - t_{14} \\
u_{14} &= t_{10} - t_{11} - t_{14} - t_{15} = (t_{10} - t_{15}) - (t_{11} + t_{14}) \\
u_{15} &= t_{10} + t_{11} + t_{14} - t_{15} = (t_{10} - t_{15}) + (t_{11} + t_{14})
\end{aligned} \quad (30)$$

The calculation of the equation 30 is carried out by time division manner using the second addition-subtraction circuit 4.

In the calculation of the equation 30, the calculations of u2:u3, u6:u7, u8:u12 and u10:u11 for performing a pair of addition-subtraction processings are carried out using the second addition-subtraction circuit 4 one time each. Also, the calculations of u12 to u15 are carried out according to the signal flow graph indicated in FIG. 5 using the second addition-subtraction circuit 4 three times.

That is, (1) The first time, by using the adder 15a and the subtracter 16a, a pair of calculations:

$$(t_{10}+t_{15}=u_{12})$$

and $$(t_{10}-t_{15})$$

are carried out;

(2) The second time, by using the adder 15b and the subtracter 16b, a pair of calculations:

$$(t_{11}+t_{14})$$

and $$(t_{11}-t_{14}=u_{13})$$

are carried out; and (3) The third time, by using the adder 15c and the subtracter 16c, a pair of calculations:

$$(t_{11}+t_{14}-t_{10}+t_{15}=u_{15})$$

and $$(t_{11}+t_{14}+t_{10}-t_{15}=u_{14})$$

are carried out.

The vectors u0, u1, u4, and u5 do not need calculation.

Accordingly, all 16 elements ($u_0$ to $u_{15}$) of the vector [U] are calculated in 7 clock cycles using the addition-subtraction circuit (1×4+3)=7 times.

The second addition-subtraction circuit 4 performs the calculation of step 2 in 7 clock cycles, and thus there is a margin of 9 clock cycles. For this reason, using the second addition-subtraction circuit 4, the calculation of this step 3 is carried out over 7 clock cycles, to obtain the calculation result ($u_0$ to $u_{15}$) of step 3.

After 16 clock cycles, in which all calculations in the second addition-subtraction circuit 4 are completed, in the second intermediate value holding circuit 5, 16 intermediate values of ($u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$)

are stored.

Explanation of computation of step 4

At step 4, a calculation for multiplying the matrix [w], indicated in the equation 14 having at most two irrational number factors in each column, and the above result is carried out, and the vectors [Y] and [U] in the calculation equation of step 4:

$$[Y] = \tfrac{1}{4} \times [W][U]$$

can be expressed by the following equation 31 and equation 32:

$$[Y] = \begin{bmatrix} y_0 (=y_{00}) \\ y_1 (=y_{01}) \\ y_2 (=y_{02}) \\ y_3 (=y_{03}) \\ y_4 (=y_{10}) \\ \vdots \\ y_{15} (=y_{33}) \end{bmatrix} \quad (31)$$

$$[U] = \begin{bmatrix} u_0 \\ u_1 \\ u_2 \\ u_3 \\ u_4 \\ \vdots \\ u_{15} \end{bmatrix} \quad (32)$$

The result of computation is indicated by the following 16 equations 33. Note, in the calculation equation of step 4, although the calculation result of [W][U] is finally multiplied by ¼, it is sufficient if the output of [W][U] is shifted to the right by 2 bits, and therefore a calculation circuit is not particularly necessary in terms of the circuit. In this equation, the computation of ¼ can be omitted.

$$\begin{aligned}
y_0 &= u_0 \\
y_1 &= B \cdot u_2 - C \cdot u_3 \\
y_2 &= u_1 \\
y_3 &= -C \cdot u_2 - B \cdot u_3 \\
y_4 &= B \cdot u_8 - C \cdot u_9 \\
y_5 &= u_{12} - A \cdot u_{14} \\
y_6 &= B \cdot u_{10} - C \cdot u_{11} \\
y_7 &= u_{13} - A \cdot u_{15}
\end{aligned} \quad (33)$$

-continued $$\begin{aligned}
y_8 &= u_4 \\
y_9 &= B \cdot u_6 - B \cdot u_7 \\
y_{10} &= u_5 \\
y_{11} &= -C \cdot u_6 - B \cdot u_7 \\
y_{12} &= -C \cdot u_8 - B \cdot u_9 \\
y_{13} &= -u_{13} - A \cdot u_{15} \\
y_{14} &= -C \cdot u_{10} - B \cdot u_{11} \\
y_{15} &= u_{12} + A \cdot u_{14}
\end{aligned}$$

This calculation of the equation 33 is carried out using the multiplication-addition and subtraction circuit 6.

FIG. 6 is a structural view of the multiplication-addition and subtraction circuit 6. The multiplication-addition and subtraction circuit 6 is constituted by two multiplier-adders, i.e., a multiplier-adder 20 and a multiplier-adder 21. As shown in FIG. 6, the multiplier-adder 20 is constituted by a multiplier 30, an accumulator 40, and a coefficient storage memory 50.

The multiplier-adder 20 inputs the input data to the multiplier 30 in a certain clock cycle k. The multiplier 30 performs the multiplication of this input data with the coefficient B stored in the coefficient storage region 50a of the coefficient storage memory 50 or the coefficient C stored in the coefficient storage region 50b and outputs the multiplication result to the accumulator 40. The accumulator 40 performs the addition or subtraction of the multiplication result input from the multiplier 30 and the multiplication result input from the multiplier 30 in the preceding clock cycle (k–1). Accordingly, the n-th order of inner product computation can be executed in n clock cycles.

A case where the computation of $y_1$ is performed will be exemplified. In the clock cycle (k–1), the input data u2 is input from the second intermediate value holding circuit 5 to the multiplier 30. The multiplier 30 performs the multiplication of u2 with the coefficient B stored in the coefficient storage region 50a of the coefficient storage memory 50 and outputs the multiplication result: B·u2 as the signal S30 to the accumulator 40. The accumulator 40 stores the multiplication result: B·u2. Thereafter, in the clock cycle k, the input data u3 is applied from the second intermediate value holding circuit 5 to the multiplier 30. The multiplier 30 performs the multiplication of u3 with the coefficient C stored in the coefficient storage region 50b of the coefficient storage memory 50 and outputs the multiplication result: C·u3 as the signal S30 to the accumulator 40. The accumulator 40 performs the subtraction between the multiplication result: B·u2 and the multiplication result: C·u3 and outputs the subtraction result: (B·u2-C·u3) as the signal S40. The multiplier-adder 21 has the same structure as that of the above-mentioned multiplier-adder 20 except that the coefficient A is stored in the coefficient storage memory 51. In the calculations of step 4, $y_1$, $y_3$, $y_6$, $y_9$, $y_{11}$, $y_{12}$, and $y_{14}$ are two-dimensional inner product computations and are therefore performed over 2×8=16 clock cycles using the multiplier-adder 20. In parallel to this, the calculations of $y_5$, $y_7$, $y_{13}$, and $y_{15}$ are carried out over 8 clock cycles using the multiplier-adder 21. Also, $y_0$, $y_2$, $y_8$, and $y_{10}$ do not need calculation. As a result, all 16 elements ($y_0$ to $y_{15}$) of the vector [Y] are written in the output register 7 over 16 clock cycles.

In this way, in the two-dimensional 4×4 DCT circuit of the present invention, only one multiplication is included in the data computation path. Accordingly, the lowering of the precision due to the accumulation of error caused by omitting the figures below the decimal point and due to accumulation of the computation error by the approximation of irrational numbers does not occur. Also, it is not necessary to use 8 multipliers as in the conventional two-dimensional 4×4 DCT circuit. It is sufficient if the number of the multipliers is, as shown in FIG. 6, two, i.e., the first multiplier 30 in the multiplier-adder 20 and the second multiplier 30 in the multiplier-adder 21, and thus the circuit structure becomes simple.

As the hardware circuit realizing the two-dimensional 4×4 DCT system of the present invention, an electronic circuit performing the above-described computation processing, a circuit based on a DSP (digital signal processor), and a semiconductor device, etc. can be employed. Such a realized circuit structure can be applied also to the following two-dimensional 4×4 DCT system and two-dimensional 4×4 IDCT system.

Further, in a conventional two-dimensional 4×4 DCT system, 128 multiplications were carried out when the vector data [Y] ($y_0$ to $y_{15}$) on the frequency domain were found, but in the two-dimensional 4×4 DCT circuit of the present invention, the vector data [Y] on the frequency domain can be found by 20 multiplications, and the number of multiplications can be reduced by as much as 108.

A description will be made next of the two-dimensional 4×4 IDCT system of the present invention performing the inverse computation of the above-described two-dimensional 4×4 DCT system.

The two-dimensional 4×4 IDCT system performs the computation defined in the equation 10 by the following four steps using the two addition-subtraction circuits and one multiplication-addition circuit:

Step 1: $[U']=[W^t][Y]$

Step 2: $[T']=[V^t][U']$

Step 3: $[S']=[Q^t][R][T']$

Step 4: $[X]=\frac{1}{4}+[Q^t][R][S']$

FIG. 7 is a structural view of the two-dimensional 4×4 IDCT system of the present invention. This two-dimensional 4×4 IDCT system is constituted by an input register 61, a multiplication-addition and subtraction circuit 62, a first intermediate value holding circuit 63, a first addition-subtraction circuit 64, a second intermediate value holding circuit 65, a second addition-subtraction circuit 66, and an output register 67.

A three-stage pipeline structure is formed by the multiplication-addition and subtraction circuit 62 as the first stage, the first addition-subtraction circuit 64 as the second stage via the first intermediate value holding circuit 63, and the second addition-subtraction circuit 66 as the third stage via the second intermediate value holding circuit 65.

The input register 61 receives as its input the data [Y] transformed to the frequency domain at the word serial at each one clock cycle. The matrix data [Y] consists of 16 elements, and therefore alignment of all data of the vector [Y] in the input register 61 takes 16 clock cycles.

The multiplication-addition and subtraction circuit 62 performs the calculation of step 1.

The first intermediate value holding circuit 63 holds the result of calculation of step 1.

The addition-subtraction circuit 64 performs the calculation of step 2 and a part of the calculation of step 3.

The second intermediate value holding circuit 65 holds the calculation result of the first addition-subtraction circuit 64. That is, the second intermediate value holding circuit 65 holds the calculation results of step 2 which is not used for the calculation of step 3 and the part of the calculation result of step 3.

The addition-subtraction circuit 66 performs a part of the calculation of step 3 and the calculation of step 4.

The output register 67 outputs the data corresponding to the data [X] at the word serial at each one clock cycle.

Similar to the above-mentioned two-dimensional 4×4 DCT circuit, also in this two-dimensional 4×4 IDCT system, it is assumed that one addition, subtraction, and multiplication-addition and subtraction are completed in one clock cycle, and the multiplication-addition and subtraction circuit 62 and the first addition-subtraction circuits 64 and 66 complete the predetermined multiplication-addition and addition-subtraction in a term of 16 clock cycles.

Explanation of calculation of step 1

At step 1, calculation for multiplying the input vector [X] by the transposition matrix [$W^t$] indicated in the equation 17 having at most two irrational number factors in each column is carried out. The vector [U3'] and the input vector [Y] in the calculation equation of step 1:

$[U']=[W^t][Y]$ are defined by the following equations 34 and 35:

$$[U'] = \begin{bmatrix} u_0' \\ u_1' \\ u_2' \\ u_3' \\ u_4' \\ \cdot \\ \cdot \\ \cdot \\ u_{15}' \end{bmatrix} \quad (34)$$

$$[Y] = \begin{bmatrix} y_0\,(=y_{00}) \\ y_1\,(=y_{01}) \\ y_2\,(=y_{02}) \\ y_3\,(=y_{03}) \\ y_4\,(=y_{10}) \\ \cdot \\ \cdot \\ \cdot \\ y_{15}\,(=y_{33}) \end{bmatrix} \quad (35)$$

The result of that computation is indicated in the following equation 36:

$$\begin{aligned}
u_0' &= y_0 \\
u_1' &= y_2 \\
u_2' &= B \cdot y_1 - C \cdot y_3 \\
u_3' &= -C \cdot y_1 - B \cdot y_3 \\
u_4' &= y_8 \\
u_5' &= y_{10} \\
u_6' &= B \cdot y_9 - C \cdot y_{11} \\
u_7' &= -C \cdot y_9 - B \cdot y_{11} \\
u_8' &= B \cdot y_4 - C \cdot y_{12} \\
u_9' &= -C \cdot y_4 - B \cdot y_{12} \\
u_{10}' &= B \cdot y_6 - C \cdot y_{15} \\
u_{11}' &= -C \cdot y_6 + B \cdot y_{15} \\
u_{12}' &= y_5 + y_{15} \\
u_{13}' &= y_5 - y_{13} \\
u_{14}' &= -A \cdot y_5 + A \cdot y_{15} \\
u_{15}' &= -A \cdot y_7 + A \cdot y_{13}
\end{aligned} \quad (36)$$

The calculation of the equation 36 is carried out using the multiplication-addition and subtraction circuit 62.

The multiplication-addition and subtraction circuit 62 has the same structure as that of the multiplication-addition and subtraction circuit 6 in the two-dimensional 4×4 DCT system.

In the calculations of step 1, the calculations of $u_2'$, $u_3'$, $u_6'$, $u_7'$, $u_8'$, $u_9'$, $u_{10}'$ and $u_{11}'$ are carried out over 2 (clock cycles)×8=16 clock cycles using the multiplier-adder 20 shown in FIG. 6 mentioned above. In parallel to this, the calculations of $u_{12}'$, $u_{13}'$, $u_{14}'$ and $u_{15}'$ are carried out over 2 (clock cycles)×4=8 clock cycles using the multiplier-adder 21. Also, $u_0'$, $u_1'$, $u_4'$ and $u_5'$ do not need calculation.

Accordingly, all 16 elements ($u_0'$ to $u_{15}'$) of the vector data [U'] are written in the output register 67 over 16 clock cycles. That is, after 16 clock cycles at which the calculation in the multiplication-addition circuit 62 is completed, 16 intermediate values of:

($u_0'$, $u_1'$, $u_2'$, $u_3'$, $u_4'$, $u_5'$, $u_6'$, $u_7'$, $u_8'$, $u_9'$, $u_{10}'$, $u_{11}'$, $u_{12}'$, $u_{13}'$, $u_{14}'$, $u_{15}'$)

are stored in the first intermediate value holding circuit 63.

Explanation of computation of step 2

In step 2, the multiplication with the constant matrix [V'] is carried out with respect to the vector [U'], and the output vector [T'] and the vector data [U'] in the calculation equation of step 2:

$$[T']=[V'][U']$$

are expressed by the following equation 37 and equation 38:

$$[T'] = \begin{bmatrix} t_0' \\ t_1' \\ t_2' \\ t_3' \\ t_4' \\ \cdot \\ \cdot \\ \cdot \\ t_{15}' \end{bmatrix} \quad (37)$$

$$[U'] = \begin{bmatrix} u_0' \\ u_1' \\ u_2' \\ u_3' \\ u_4' \\ \cdot \\ \cdot \\ \cdot \\ u_{15}' \end{bmatrix} \quad (38)$$

The calculation equation [T']=[V'] [U'] at step 2 can be expressed by the following equation 39:

$$\begin{aligned}
t_0' &= u_0' \\
t_1' &= u_1' \\
t_2' &= u_2' + u_3' \\
t_3' &= u_2' - u_3' \\
t_4' &= u_4' \\
t_5' &= u_5' \\
t_6' &= u_6' + u_7' \\
t_7' &= u_6' - u_7' \\
t_8' &= u_8' + u_9' \\
t_9' &= u_{10}' + u_{11}' \\
t_{10}' &= u_{12}' + u_{14}' + u_{15}' = u_{12}' + (u_{15}' + u_{14}') \\
t_{11}' &= u_{13}' - u_{14}' + u_{15} = (u_{15}' - u_{14}') + u_{13}' \\
t_{12}' &= u_8' - u_9' \\
t_{13}' &= u_{10}' - u_{11}' \\
t_{14}' &= -u_{13}' - u_{14}' + u_{15}' = (u_{15}' - u_{14}') - u_{13}' \\
t_{15}' &= u_{12}' - u_{14}' - u_{15}' = u_{12}' - (u_{15}' + u_{14}')
\end{aligned} \quad (39)$$

The first addition-subtraction circuit 64 receives as its input 16 elements ($u_0'$ to $u_{15}'$) of the matrix data [U'] held in the first intermediate value holding circuit 63 and performs the calculation of the equation 39.

Figure 8:
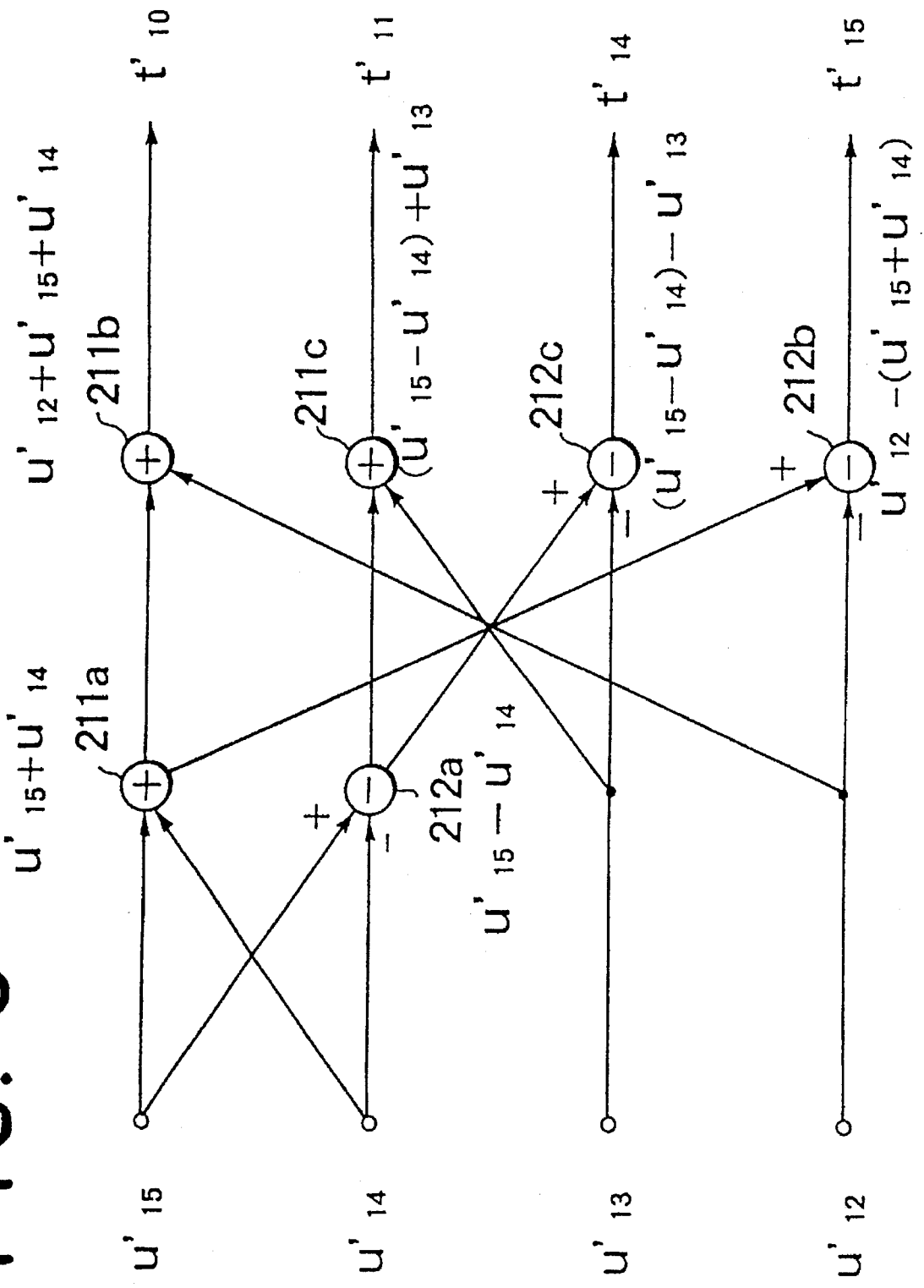
FIG. 8 is a view indicating the first signal processing flow of the addition-subtraction circuit shown in FIG. 7.

$t_2':t_3'$, $t_6':t_7'$, $t_8':t_{12}'$ and $t_9':t_{13}'$ obtained by performing the addition-subtraction for a pair of input data are carried out using the first addition-subtraction circuit 64 one time each. Also, the calculations of $t_{10}':t_{11}'$ and $t_{14}':t_{15}'$ are carried out according to the signal flow shown in FIG. 8 using the first addition-subtraction circuit 64 three times.

That is, (1) The first time, by using the adder 211a and the subtracter 212a, $$(u_{15}'+u_{14}')$$

and $$(u_{15}'-u_{14}')$$

are calculated;

(2) The second time, by using the adder 211b and the subtracter 212b, $$(u_{12}'+u_{15}'+u_{14}'=t_{10}')$$

and $$(u_{12}'-u_{15}'-u_{14}'=t_{15}')$$

are calculated; and (3) The third time, by using the adder 211c and the subtracter 212c, $$(u_{15}'-u_{14}'+u_{13}'=t_{11}')$$

and $$(u_{15}'-u_{14}'-u_{13}'=t_{14}')$$

are calculated.

Also, it is not necessary to calculate $t_0'$, $t_1'$, $t_4'$ and $t_5'$.

Accordingly, all 16 elements ($t_0'$ to $t_{15}'$) of the vector [T'] are calculated in 7 clock cycles using the first addition-subtraction circuit 64 1×4+3=7 times.

The number of clock cycles required for the calculation of step 2 by the first addition-subtraction circuit 64 is smaller by (16−7)=9 clock cycles than the 16 clock cycles, which is the allowable time in which computation is performed without disturbance of the pipelines.

Therefore, the first addition-subtraction circuit 64 performs a part of the calculation of the step 3 mentioned later by this remaining 9 clock cycles.

Explanation of computation of step 3

At step 3, the multiplication with the constant matrix [Q'R] is carried out with respect to the matrix data [T'], and the output vector [S'] and the vector [T'] in the calculation equation of step 3:

$$[S']=[Q'R][T']$$

are expressed as the following equation 40 and equation 41:

$$[S'] = \begin{bmatrix} s_0' \\ s_1' \\ s_2' \\ s_3' \\ s_4' \\ \cdot \\ \cdot \\ \cdot \\ s_{15}' \end{bmatrix} \quad (40)$$

-continued $$[T] = \begin{bmatrix} t_0' \\ t_1' \\ t_2' \\ t_3' \\ t_4' \\ \cdot \\ \cdot \\ \cdot \\ t_{15}' \end{bmatrix} \quad (41)$$

Accordingly, the calculation of step 3 is expressed by the following equation 42:

$$\begin{aligned} s_{4i}' &= t_i' + t_{i+4}' + t_{i+12}' = (t_i' + t_{i+4}') + t_{i+12}' \\ s_{4i+1}' &= t_i' - t_{i+4}' + t_{i+8}' = (t_i' - t_{i+4}') + t_{i+8}' \\ s_{4i+2}' &= t_i' - t_{i+4}' - t_{i+8}' = (t_i' - t_{i+4}') - t_{i+8}' \\ s_{4i+3}' &= t_i' + t_{i+4}' - t_{i+12}' = (t_i' + t_{i+4}') - t_{i+12}' \\ \text{wherein } i &= 0, 1, 2, 3 \end{aligned} \quad (42)$$

The calculations of the equations 42 are carried out using the addition-subtraction circuit 64 and the addition-subtraction circuit 66. The structure of the addition-subtraction circuit 66 is the same as that of the addition-subtraction circuit 2 similar to the addition-subtraction circuit 64.

Figure 9:
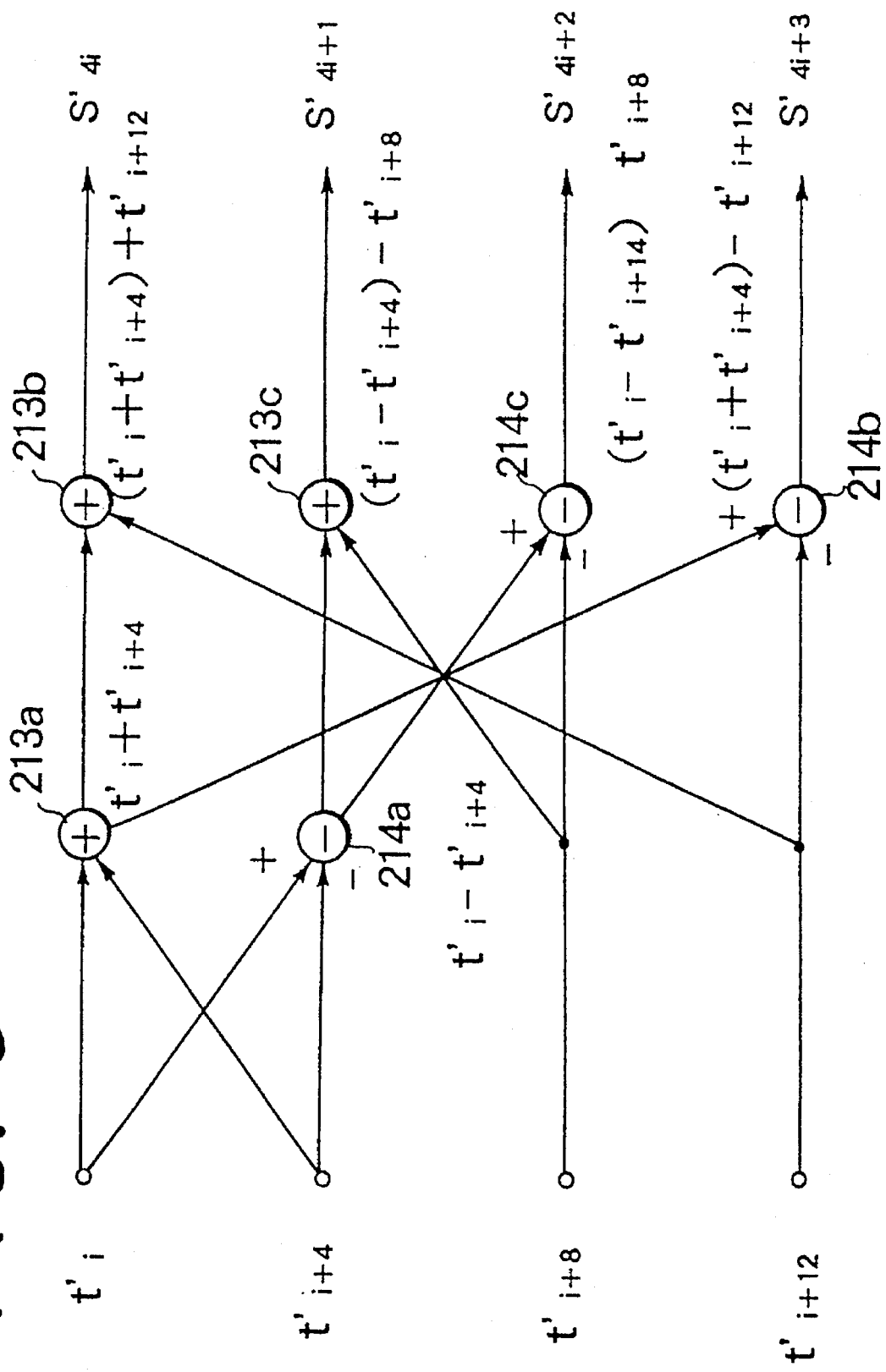
FIG. 9 is a view indicating the second signal processing flow of the addition-subtraction circuit shown in FIG. 7.

A signal flow graph where the calculations of the equation 42 are carried out by the time division system using the addition-subtraction circuit 64 and the addition-subtraction circuit 66 is shown in FIG. 9.

As shown in FIG. 9, four elements ($s_{4i}$, $s_{4i+1}$, $s_{4i+2}$, $s_{4i+3}$) of the vector [S'] are found using the addition-subtraction circuit 64 and the addition-subtraction circuit 66 three times. That is, (1) The first time, by using the adder 213a and the subtracter 214a, $(t_i' + t_{i+4}')$ and $(t_i' - t_{i+4}')$ are calculated;

(2) The second time, by using the adder 213b and the subtracter 214b, $(t_i' + t_{i+4}' + t_{i+12}' = s_{4i}')$ and $(t_i' + t_{i+4}' - t_{i+12}' = s_{4i+3}')$ are calculated; and (3) The third time, by using the adder 213c and the subtracter 214c, $(t_i' - t_{i+4}' + t_{i+8}' = s_{4i+1}')$ and $(t_i' - t_{i+4}' - t_{i+8}' = s_{4i+2}')$ are calculated.

Accordingly, all 16 elements ($s_0'$ to $s_{15}'$) of the vector [S'] are calculated using the first addition-subtraction circuit 64 and second addition-subtraction circuit 66 (3×4)=12 times.

As mentioned above, since there is a margin of 9 clock cycles in the addition-subtraction circuit 64 at step 2, in the 12 addition-subtractions of step 3, for example, nine addition-subtractions where i=0, 1, 2 in equation 42 are carried out over 9 clock cycles by the addition-subtraction circuit 64.

That is, the first addition-subtraction circuit 64 calculates ($s_0'$ to $s_{11}'$) using the calculation result ($t_0'$, $t_1'$, $t_2'$, $t_4'$, $t_5'$, $t_6'$, $t_8'$, $t_9'$, $t_{12}'$, $t_{13}'$, $t_{14}'$) of step 2.

Accordingly, after 16 clock cycles at which the calculation in the addition-subtraction circuit 64 is completed, in the second intermediate value holding circuit 65, 16 intermediate values of ($s_0'$, $s_1'$, $s_2'$, $s_3'$, $s_4'$, $s_5'$, $s_6'$, $s_7'$, $s_8'$, $s_9'$, $s_{10}'$, $s_{11}'$, $t_3'$, $t_7'$, $t_{11}'$, $t_{15}'$)

are held.

Further, the calculation in the case where i=3 in the equation 42 is carried out over 3 clock cycles by the second addition-subtraction circuit 66. That is, the second addition-subtraction circuit 66 calculates the calculation result of step 3 ($s_{12}'$, $s_{13}'$, $s_{14}'$, $s_{15}'$) using the calculation result of step 2 ($t_3'$, $t_7'$, $t_{11}'$, $t_{15}'$) held in the second intermediate value holding circuit 65. Accordingly, the number of clock cycles required for the calculation of step 3 by the addition-subtraction circuit 66 is smaller by (16–3)=13 clock cycles than the 16 clock cycles which is the allowable time in that the computation is performed without disturbance of the pipelines.

Then the addition-subtraction circuit 66 performs the calculation of step 4 mentioned later by this remaining 13 clock cycles.

Explanation of computation of step 4

At step 4, the multiplication of the matrix [S'] and the constant matrix data [Q'R] is carried out, and the matrices [X] and [S'] in the calculation equation of step 4:

$$[X] = \tfrac{1}{4} \times [Q'R] \, [S']$$

are expressed as the following equation 43 and equation 44:

$$[X] = \begin{bmatrix} X_0 \, (= X_{00}) \\ X_1 \, (= X_{01}) \\ X_2 \, (= X_{02}) \\ X_3 \, (= X_{03}) \\ X_4 \, (= X_{10}) \\ \cdot \\ \cdot \\ \cdot \\ X_{15} \, (= X_{33}) \end{bmatrix} \quad (43)$$

$$[S'] = \begin{bmatrix} S_0' \\ S_1' \\ S_2' \\ S_3' \\ S_4' \\ \cdot \\ \cdot \\ \cdot \\ S_{15}' \end{bmatrix} \quad (44)$$

As a result, the following equation 45 is obtained:

$$x_{4i}' = s_i' + s_{i+4}' + s_{i+12}' = (s_i' + s_{i+4}') + s_{i+12}' \quad (45)$$

-continued
$$x_{4i+1}' = s_i' - s_{i+4}' + s_{i+8}' = (s_i' - s_{i+4}') + s_{i+8}'$$
$$x_{4i+2}' = s_i' - s_{i+4}' - s_{i+8}' = (s_i' - s_{i+4}') - s_{i+8}'$$
$$x_{4i+3}' = s_i' + s_{i+4}' - s_{i+12}' = (s_i' + s_{i+4}') - s_{i+12}'$$
wherein $i = 0, 1, 2, 3$ In the above-described calculation equation $[X]=\frac{1}{4}\times[Q^rR]$ $[S']$, the calculation result of the matrix data: $[Q^r]$ $[R]$ $[S']$ is finally multiplied by $\frac{1}{4}$, but it is sufficient for this if the output of the matrix data: $[Q^r]$ $[R]$ $[S']$ is shifted to the right by 2 bits, and therefore particularly nothing is needed in terms of the circuit. In the above-mentioned equation 45, $\frac{1}{4}$ calculation is omitted.

The calculation of the equation 45 is carried out using the second addition-subtraction circuit 66. The calculation of the equation 45 is carried out using the second addition-subtraction circuit 66 according to the signal flow performed by the time division processing system shown in FIG. 10.

Figure 10:
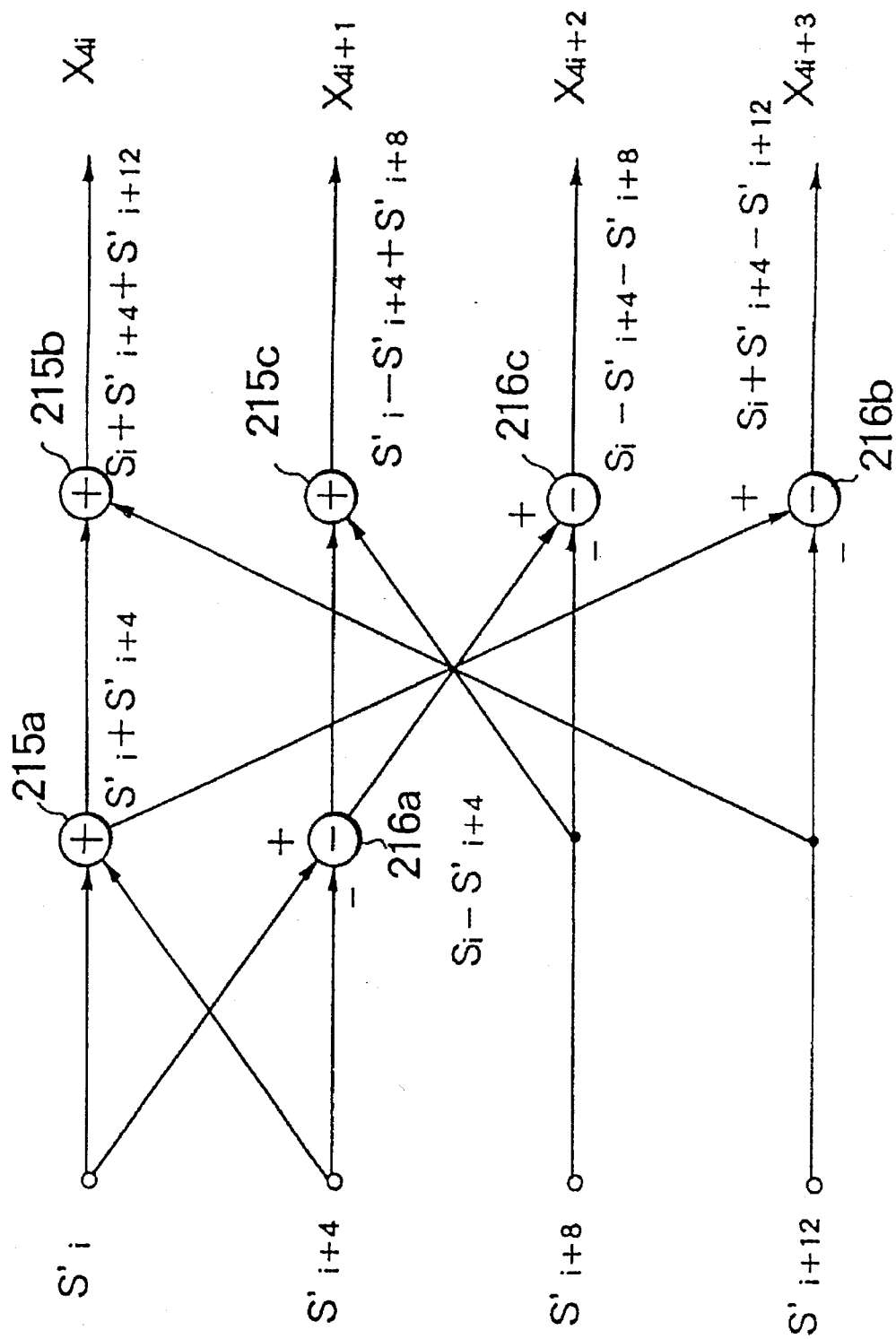
FIG. 10 is a view indicating the third signal processing flow of the addition-subtraction circuit shown in FIG. 7.

As shown in FIG. 10, four elements of the vector [X] are calculated by using the second addition-subtraction circuit 66 three times.

That is, (1) The first time, by using the adder 215a and the subtracter 216a, $$(s_i' + s_{i+4}')$$

and $$(s_i' - s_{i+4}')$$

are calculated;

(2) The second time, by using the adder 215b and the subtracter 216b, $$(s_i' + s_{i+4}' + s_{i+12}' = x_{4i})$$

and $$(s_i' + s_{i+4}' - s_{i+12}' = x_{4i+3})$$

are calculated; and (3) The third time, by using the adder 215c and the subtracter 216c, $$(s_i' - s_{i+4}' + s_{i+8}' = x_{4i+1})$$

and $$(s_i' - s_{i+4}' - s_{i+8}' = x_{4i+2})$$

are calculated.

As a result, all 16 elements ($x_0$ to $x_{15}$) of the vector [X] are obtained using the second addition-subtraction circuit 66 $(3\times 4)=12$ times.

As mentioned above, since there is a margin of 13 clock cycles in the addition-subtraction circuit 66 at step 3, all 16 elements of the vector [X] are calculated by the addition-subtraction circuit 66 without a disturbance of the pipeline.

In this way, in the two-dimensional 4×4 IDCT system of the embodiment of the present invention, only one multiplication is included in the data path. Accordingly, the lowering of precision due to the accumulation of the error, caused by omitting the figures below the decimal place, and due to the accumulation of the computation error by the approximation of irrational numbers can be prevented.

Also, it is not necessary to use eight multipliers as in the conventional two-dimensional 4×4 IDCT system. Two are satisfactory as the number of the multipliers, and thus the circuit structure is simpler.

Further, in the conventional two-dimensional 4×4 IDCT system, 128 multiplications have been carried out when finding the original data [X] ($x_0$ to $x_{15}$), but in the two-dimensional 4×4 IDCT circuit of the present invention, the vector [X] can be obtained by 20 multiplications, and the number of times of multiplication can be reduced by as much as 108 times.

As the preferred embodiments, the two-dimensional 4×4 DCT systems when the constant matrix [R·Q] as the inner product between the constant matrices [R] and [Q] is previously obtained and when the constant matrix [R·Q·R·Q] as the inner product between the constant matrices [R·Q] and [R·Q] is previously obtained were described. However, as the simplest manner, the computation defined by the equation 9, per se, can be carried out. In this case, the inner product computation among the constant matrices can be realized by simple addition-subtraction circuits.

Similarly, as the preferred embodiments, the two-dimensional 4×4 IDCT systems when the constant matrix [R·Q$^r$] as the inner product between the constant matrices [R] and [Q$^r$] is previously obtained and when the constant matrix [R·Q$^r$·R·Q$^r$] as the inner product between the constant matrices [R·Q$^r$] and [R·Q$^r$] is previously obtained were described. However, as the simplest manner, the computation defined by the equation 10, per se, can be carried out. In this case, the inner product computation among the constant matrices can also be realized by simple addition-subtraction circuits.

In the above-mentioned embodiments, the equations of the two-dimensional 4×4 DCT and two-dimensional 4×4 IDCT are subjected to matrix dissolution and the computation in accordance with the matrices obtained by the factorization in this calculation is realized by an electronic circuit formed as for example a semiconductor device. Alternatively, a program in accordance with the above-mentioned calculation method can be installed, and this program is executed by a computer software using a microcomputer. Further, the above-mentioned computation can be carried out by the DSP etc. in this way, any methods of realization of the above-mentioned two-dimensional 4×4 DCT system and two-dimensional 4×4 IDCT system may be used.

The applications of the above-mentioned two-dimensional 4×4 DCT system and two-dimensional 4×4 IDCT system of the present invention are not restricted to image signal processing. The invention of course can be applied to other various signal processings.

According to the two-dimensional 4×4 DCT system and two-dimensional 4×4 IDCT system of the present invention, reduction of precision due to the accumulation of error caused by omitting the figures lower than the decimal point and due to the accumulation of the computation error by the approximation of irrational numbers does not occur, and therefore a high precision computation can be achieved.

Also, in the two-dimensional 4×4 DCT system and two-dimensional 4×4 IDCT system of the present invention, it is not necessary to use 8 multipliers as in the conventional two-dimensional 4×4 DCT circuit. It is sufficient if merely two multipliers are used, and therefore the circuit structure becomes simpler.

Further, in the conventional two-dimensional 4×4 DCT system 128, multiplications have been carried out to obtain data (16 data) on the frequency domain, but in the two-dimensional 4×4 DCT system and two-dimensional 4×4 IDCT system of the present invention, the data on the frequency domain can be obtained by 20 multiplications.

Many widely different embodiments of the present invention may be constructed without departing from the spirit and scope of the present invention, and it should be understood that the present invention is not restricted to the specific embodiments described above.

What is claimed is:

1. A discrete cosine transformation method, for use in transforming an image signal from a real space to a frequency space, comprising the steps of:

providing an input signal having information represented as binary data in a matrix form to a discrete cosine transform system;

transforming said input signal with said transform system; and providing an output signal from said transform system representative of said transformed input signal;

wherein, said transforming step comprises the step of performing a two-dimensional 4-row×4 column discrete cosine transformation of binary data in a matrix form with said transform system, in accordance with the following formula:

$$Y = \frac{1}{4} W V R Q R Q X$$

where

X denotes matrix data to be subjected to a discrete cosine transformation and is defined as follows:

$X = X_j$ (j = 0~15), or
$= X_{ij}$ (i = 0~3, j = 0~3)
$x_0 (= x_{00})$
$x_1 (= x_{01})$
$x_2 (= x_{02})$
$x_3 (= x_{03})$
$x_4 (= x_{10})$
$x_5 (= x_{11})$
$x_6 (= x_{12})$
$x_7 (= x_{13})$
$= x_8 (= x_{20})$
$x_9 (= x_{21})$
$x_{10} (= x_{22})$
$x_{11} (= x_{23})$
$x_{12} (= x_{30})$
$x_{13} (= x_{31})$
$x_{14} (= x_{32})$
$x_{15} (= x_{33})$

Y denotes matrix data obtained by the discrete cosine transformation and is defined as follows:

$Y = Y_j$ (j = 0~15), or
$= Y_{ij}$ (i = 0~3, j = 0~3)
$y_0 (= y_{00})$
$y_1 (= y_{01})$
$y_2 (= y_{02})$
$y_3 (= y_{03})$
$y_4 (= y_{10})$
$y_5 (= y_{11})$
$y_6 (= y_{12})$
$y_7 (= y_{13})$
$= y_8 (= y_{20})$
$y_9 (= y_{21})$
$y_{10} (= y_{22})$
$y_{11} (= y_{23})$
$y_{12} (= y_{30})$
$y_{13} (= y_{31})$
$y_{14} (= y_{32})$
$y_{15} (= y_{33})$ and, W denotes fourth 16×16 matrix data including irrational numbers A, B, C, −A, −B, and −C, defined as follows:

$W = W_{ij}$ (i = 0~15, j = 0~15)

| 1 0 0 0 | 0 0 0 0 | 0 0 0 0 | 0 0 0 0 |
| 0 0 B−C | 0 0 0 0 | 0 0 0 0 | 0 0 0 0 |
| 0 1 0 0 | 0 0 0 0 | 0 0 0 0 | 0 0 0 0 |
| 0 0 −C −B | 0 0 0 0 | 0 0 0 0 | 0 0 0 0 |
| 0 0 0 0 | 0 0 0 0 | B−C 0 0 | 0 0 0 0 |
| 0 0 0 0 | 0 0 0 0 | 0 0 0 0 | 1 0−A 0 |
| 0 0 0 0 | 0 0 0 0 | 0 0 B−C | 0 0 0 0 |
| 0 0 0 0 | 0 0 0 0 | 0 0 0 0 | 0 1 0−A |
| 0 0 0 0 | 1 0 0 0 | 0 0 0 0 | 0 0 0 0 |
| 0 0 0 0 | 0 0 B−C | 0 0 0 0 | 0 0 0 0 |
| 0 0 0 0 | 0 1 0 0 | 0 0 0 0 | 0 0 0 0 |
| 0 0 0 0 | 0 0−C−B | 0 0 0 0 | 0 0 0 0 |
| 0 0 0 0 | 0 0 0 0 | −C−B 0 0 | 0 0 0 0 |
| 0 0 0 0 | 0 0 0 0 | 0 0 0 0 | 0−1 0−A |
| 0 0 0 0 | 0 0 0 0 | 0 0−C−B | 0 0 0 0 |
| 0 0 0 0 | 0 0 0 0 | 0 0 0 0 | 1 0 A 0 | where, $A = \cos(\pi/4)$
$B = \cos(\pi/8)$, and
$C = \cos(3\pi/8)$, and wherein said transforming step comprises:

(a) obtaining fifth constant matrix data RQ by computing the inner product between said first constant matrix data R and said second constant matrix Q, defined as follows:

$RQ = RQ_{ij}$ (i = 0~15, j = 0~15)

| 1 1 1 1 | 0 0 0 0 | 0 0 0 0 | 0 0 0 0 |
| 0 0 0 0 | 1 1 1 1 | 0 0 0 0 | 0 0 0 0 |
| 0 0 0 0 | 0 0 0 0 | 1 1 1 1 | 0 0 0 0 |
| 0 0 0 0 | 0 0 0 0 | 0 0 0 0 | 1 1 1 1 |
| 1−1−1 1 | 0 0 0 0 | 0 0 0 0 | 0 0 0 0 |
| 0 0 0 0 | 1−1−1 1 | 0 0 0 0 | 0 0 0 0 |
| 0 0 0 0 | 0 0 0 0 | 1−1−1 1 | 0 0 0 0 |
| 0 0 0 0 | 0 0 0 0 | 0 0 0 0 | 1−1−1 1 |
| 0 1−1 0 | 0 0 0 0 | 0 0 0 0 | 0 0 0 0 |
| 0 0 0 0 | 0 1−1 0 | 0 0 0 0 | 0 0 0 0 |
| 0 0 0 0 | 0 0 0 0 | 0 1−1 0 | 0 0 0 0 |
| 0 0 0 0 | 0 0 0 0 | 0 0 0 0 | 0 1−1 0 |
| 1 0 0−1 | 0 0 0 0 | 0 0 0 0 | 0 0 0 0 |
| 0 0 0 0 | 1 0 0−1 | 0 0 0 0 | 0 0 0 0 |
| 0 0 0 0 | 0 0 0 0 | 1 0 0−1 | 0 0 0 0 |
| 0 0 0 0 | 0 0 0 0 | 0 0 0 0 | 1 0 0−1 |

(b) computing with a first addition-subtraction circuit the inner product between said fifth constant matrix data RQ and said matrix data X to provide sixth matrix data S=RQ·X;

(c) computing with said first addition-subtraction circuit the inner product between said fifth constant matrix data RQ and said sixth matrix data S to provide seventh matrix data T=RQ·S;

(d) computing with a second addition-subtraction circuit the inner product between said third constant matrix data V and said seventh matrix data T to provide eighth matrix data U=V·T;

(e) executing multiplication with a multiplication-addition circuit between said irrational numbers in said fourth matrix data W and predetermined element data in said eight matrix data U and further performing addition and subtraction of said multiplied results and predetermined element data in said eighth matrix data U to provide ninth matrix data YY=W·U; and (f) shifting said ninth matrix data YY by two bits to provide said matrix data Y, defined as YY/4.

2. A discrete cosine transformation method according to claim 1, wherein computations defined by the following equations are carried out by said first addition-subtraction circuit, as said inner product computation between said fifth constant matrix data RQ and said matrix data X in step (b), to provide said sixth matrix data S, defined as follows:

$$S_i = X_{4i} + X_{4i+1} + X_{4i+2} + X_{4i+3}$$

$$S_{i+4} = X_{4i} - X_{4i+1} - X_{4i+2} + X_{4i+3}$$

$$S_{i+8} = X_{4i+1} - X_{4i+2}$$

$$S_{i+12} = X_{4i} - X_{4i+3}$$

wherein, i=0, 1, 2, or 3.

3. A discrete cosine transformation method according to claim 2, wherein computations defined by the following equations are carried out by said first addition-subtraction circuit, as said inner product computation between said fifth constant matrix data RQ and said sixth matrix data S in step (c), to provide said seventh matrix data T, defined as follows:

$$t_i = S_{4i} + S_{4i+1} + S_{4i+2} + S_{4i+3}$$

$$t_{i+4} = S_{4i} - S_{4i+1} - S_{4i+2} + S_{4i+3}$$

$$t_{i+8} = S_{4i+1} - S_{4i+2}$$

$$t_{i+12} = S_{4i} - S_{4i+3}$$

wherein, i=0, 1, 2, or 3.

4. A discrete cosine transformation method according to claim 3, wherein computations defined by the following equations are carried out by said second addition-subtraction circuit, as said inner product computation between said third constant matrix data V and said seventh matrix data T ins step (d), to provide said eighth matrix data U, defined as follows:

$$\begin{aligned}
u_0 &= t_0 \\
u_1 &= t_1 \\
u_2 &= t_2 + t_3 \\
u_3 &= t_2 - t_3 \\
u_4 &= t_4 \\
u_5 &= t_5 \\
u_6 &= t_6 + t_7 \\
u_7 &= t_6 - t_7 \\
u_8 &= t_8 + t_{12} \\
u_9 &= t_8 - t_{12} \\
u_{10} &= t_9 + t_{13} \\
u_{11} &= t_9 - t_{13} \\
u_{12} &= t_{10} + t_{15} \\
u_{13} &= t_{11} - t_{14} \\
u_{14} &= t_{10} - t_{11} - t_{14} - t_{15} \\
    &= (t_{10} - t_{15}) - (t_{11} + t_{14}) \\
u_{15} &= t_{10} + t_{11} + t_{14} - t_{15} \\
    &= (t_{10} - t_{15}) + (t_{11} + t_{14}).
\end{aligned}$$

5. A discrete cosine transformation method according to claim 4, wherein computations defined by the following equations are carried out by said multiplication-addition circuit, as said multiplication and addition and subtraction of the results of the multiplication between said fourth matrix data W and said eighth matrix data U in step (d), to provide said ninth matrix data YY, defined as follows:

$$y_0 = u_0$$

$$y_1 = B \cdot u_2 - C \cdot u_3$$

$$y_2 = u_1$$

$$y_3 = -C \cdot u_2 - B \cdot u_3$$

$$y_4 = B \cdot u_8 - C \cdot u_9$$

$$y_5 = u_{12} - A \cdot u_{14}$$

$$y_6 = B \cdot u_{10} - C \cdot u_{15}$$

$$y_7 = u_{13} - A \cdot u_{15}$$

$$y_8 = u_4$$

$$y_9 = B \cdot u_6 - C \cdot u_7$$

$$y_{10} = u_5$$

$$y_{11} = -C \cdot u_6 - B \cdot u_7$$

$$y_{12} = -C \cdot u_8 - B \cdot u$$

$$y_{13} = -u_{13} - A \cdot u_{15}$$

$$y_{14} = -C \cdot u_{10} - B \cdot u_{11}$$

$$y_{15} = u_{12} + A \cdot u_{14}.$$

6. A discrete cosine transformation method, for use in transforming an image signal from a real space to a frequency space, comprising the steps of:

providing an input signal having information represented as binary data in a matrix form to a discrete cosine transform system;

transforming said input signal with said transform system; and providing an output signal from said transform system representative of said transformed input signal;

wherein, said transforming step comprises the step of performing a two-dimensional 4-row×4 column discrete cosine transformation of binary data in a matrix form with said transform system, in accordance with the following formula:

$$Y = \tfrac{1}{4} W V R Q R Q X$$

where,

X denotes matrix data to be subjected to a discrete cosine transformation and is defined as follows:

$$\begin{aligned}
X &= X_j \ (j = 0\text{--}15), \text{ or} \\
  &= X_{ij} \ (i = 0\text{--}3, j = 0\text{--}3) \\
X_0 &(= X_{00}) \\
X_1 &(= X_{01}) \\
X_2 &(= X_{02}) \\
X_3 &(= X_{03}) \\
X_4 &(= X_{10}) \\
X_5 &(= X_{11}) \\
X_6 &(= X_{12}) \\
X_7 &(= X_{13}) \\
= X_8 &(= X_{20}) \\
X_9 &(= X_{21}) \\
X_{10} &(= X_{22}) \\
X_{11} &(= X_{23}) \\
X_{12} &(= X_{30}) \\
X_{13} &(= X_{31}) \\
X_{14} &(= X_{32}) \\
X_{15} &(= X_{33})
\end{aligned}$$

Y denotes matrix data obtained by the discrete cosine transformation and is defined as follows:

$Y = Y_j$ (j = 0~15), or
$= Y_{ij}$ (i = 0~3, j = 0~3)
$Y_0 (= Y_{00})$
$Y_1 (= Y_{01})$
$Y_2 (= Y_{02})$
$Y_3 (= Y_{03})$
$Y_4 (= Y_{10})$
$Y_5 (= Y_{11})$
$Y_6 (= Y_{12})$
$Y_7 (= Y_{13})$
$= Y_8 (= Y_{20})$
$Y_9 (= Y_{21})$
$Y_{10} (= Y_{22})$
$Y_{11} (= Y_{23})$
$Y_{12} (= Y_{30})$
$Y_{13} (= Y_{31})$
$Y_{14} (= Y_{32})$
$Y_{15} (= Y_{33})$ $R = R_{ij}$ (i = 0~15, j = 0~15)
```
1 0 0 0    0 0 0 0    0 0 0 0    0 0 0 0
0 0 0 0    1 0 0 0    0 0 0 0    0 0 0 0
0 0 0 0    0 0 0 0    1 0 0 0    0 0 0 0
0 0 0 0    0 0 0 0    0 0 0 0    1 0 0 0

0 1 0 0    0 0 0 0    0 0 0 0    0 0 0 0
0 0 0 0    0 1 0 0    0 0 0 0    0 0 0 0
0 0 0 0    0 0 0 0    0 1 0 0    0 0 0 0
0 0 0 0    0 0 0 0    0 0 0 0    0 1 0 0
=
0 0 1 0    0 0 0 0    0 0 0 0    0 0 0 0
0 0 0 0    0 0 1 0    0 0 0 0    0 0 0 0
0 0 0 0    0 0 0 0    0 0 1 0    0 0 0 0
0 0 0 0    0 0 0 0    0 0 0 0    0 0 1 0

0 0 0 1    0 0 0 0    0 0 0 0    0 0 0 0
0 0 0 0    0 0 0 1    0 0 0 0    0 0 0 0
0 0 0 0    0 0 0 0    0 0 0 1    0 0 0 0
0 0 0 0    0 0 0 0    0 0 0 0    0 0 0 1
```

$Q = Q_{ij}$ (i = 0~15, j = 0~15)
```
 1  1  1  1    0 0 0 0    0 0 0 0    0 0 0 0
 1 -1 -1  1    0 0 0 0    0 0 0 0    0 0 0 0
 0  1 -1  0    0 0 0 0    0 0 0 0    0 0 0 0
 1  0  0 -1    0 0 0 0    0 0 0 0    0 0 0 0

0 0 0 0     1  1  1  1    0 0 0 0    0 0 0 0
 0 0 0 0     1 -1 -1  1    0 0 0 0    0 0 0 0
 0 0 0 0     0  1 -1  0    0 0 0 0    0 0 0 0
 0 0 0 0     1  0  0 -1    0 0 0 0    0 0 0 0
=
 0 0 0 0    0 0 0 0     1  1  1  1    0 0 0 0
 0 0 0 0    0 0 0 0     1 -1 -1  1    0 0 0 0
 0 0 0 0    0 0 0 0     0  1 -1  0    0 0 0 0
 0 0 0 0    0 0 0 0     1  0  0 -1    0 0 0 0

0 0 0 0    0 0 0 0    0 0 0 0     1  1  1  1
 0 0 0 0    0 0 0 0    0 0 0 0     1 -1 -1  1
 0 0 0 0    0 0 0 0    0 0 0 0     0  1 -1  0
 0 0 0 0    0 0 0 0    0 0 0 0     1  0  0 -1
```

$V = V_{ij}$ (i = 0~15, j = 0~15)
```
1 0 0 0    0 0 0 0    0 0 0 0    0 0 0 0
0 1 0 0    0 0 0 0    0 0 0 0    0 0 0 0
0 0 1 1    0 0 0 0    0 0 0 0    0 0 0 0
0 0 1 -1   0 0 0 0    0 0 0 0    0 0 0 0

0 0 0 0    1 0 0 0    0 0 0 0    0 0 0 0
0 0 0 0    0 1 0 0    0 0 0 0    0 0 0 0
0 0 0 0    0 0 1 1    0 0 0 0    0 0 0 0
0 0 0 0    0 0 1 -1   0 0 0 0    0 0 0 0
=
0 0 0 0    0 0 0 0    1  0 0 0    1  0 0 0
0 0 0 0    0 0 0 0    1  0 0 0   -1  0 0 0
0 0 0 0    0 0 0 0    0  1 0 0    0  1 0 0
0 0 0 0    0 0 0 0    0  1 0 0    0 -1 0 0

0 0 0 0    0 0 0 0    0 0 1 0    0 0 0 1
0 0 0 0    0 0 0 0    0 0 0 1    0 0 -1 0
```
```
0 0 0 0    0 0 0 0    0 0 1-1    0 0-1-1
0 0 0 0    0 0 0 0    0 0 1 1    0 0 1-1
``` and,

W denotes fourth 16×16 matrix data including irrational numbers A, B, C, −A, −B, and −C, defined as follows:

$W = W_{ij}$ (i = 0~15, j = 0~15)
```
1 0 0 0    0 0 0 0    0 0 0 0    0 0 0 0
0 0 B-C    0 0 0 0    0 0 0 0    0 0 0 0
0 1 0 0    0 0 0 0    0 0 0 0    0 0 0 0
0 0-C-B    0 0 0 0    0 0 0 0    0 0 0 0

0 0 0 0    0 0 0 0    B-C 0 0    0 0 0 0
0 0 0 0    0 0 0 0    0 0 0 0    1 0-A 0
0 0 0 0    0 0 0 0    0 0 B-C    0 0 0 0
0 0 0 0    0 0 0 0    0 0 0 0    0 1 0-A
=
0 0 0 0    1 0 0 0    0 0 0 0    0 0 0 0
0 0 0 0    0 0 B-C    0 0 0 0    0 0 0 0
0 0 0 0    0 1 0 0    0 0 0 0    0 0 0 0
0 0 0 0    0 0-C-B    0 0 0 0    0 0 0 0

0 0 0 0    0 0 0 0   -C-B 0 0    0 0 0 0
0 0 0 0    0 0 0 0    0 0 0 0    0-1 0-A
0 0 0 0    0 0 0 0    0 0-C-B    0 0 0 0
0 0 0 0    0 0 0 0    0 0 0 0    1 0 A 0
``` where,
A=cos (π/4)
B=cos (π/8), and
C=cos (3 π/8), and wherein said transforming step comprises the steps of:

(aa) obtaining a fifth constant matrix data RQ, defined by the following equation, by computing the inner product between said first constant matrix R and said second constant matrix data Q, and further previously obtaining a 10th constant matrix data RQRQ defined by the following equation, by computing the inner product between said fifth matrix data RQ and the same:

$RQ = RQ_{ij}$ (i = 0~15, j = 0~15)
```
 1  1  1  1    0 0 0 0    0 0 0 0    0 0 0 0
 0 0 0 0       1 1 1 1    0 0 0 0    0 0 0 0
 0 0 0 0       0 0 0 0    1 1 1 1    0 0 0 0
 0 0 0 0       0 0 0 0    0 0 0 0    1 1 1 1

1-1-1-1    0 0 0 0    0 0 0 0    0 0 0 0
 0 0 0 0    1-1-1 1    0 0 0 0    0 0 0 0
 0 0 0 0    0 0 0 0    1-1-1 1    0 0 0 0
 0 0 0 0    0 0 0 0    0 0 0 0    1-1-1 1
=
 0 1-1 0    0 0 0 0    0 0 0 0    0 0 0 0
 0 0 0 0    0 1-1 0    0 0 0 0    0 0 0 0
 0 0 0 0    0 0 0 0    0 1-1 0    0 0 0 0
 0 0 0 0    0 0 0 0    0 0 0 0    0 1-1 0

1 0 0-1    0 0 0 0    0 0 0 0    0 0 0 0
 0 0 0 0    1 0 0-1    0 0 0 0    0 0 0 0
 0 0 0 0    0 0 0 0    1 0 0-1    0 0 0 0
 0 0 0 0    0 0 0 0    0 0 0 0    1 0 0-1
```

(bb) computing the inner product between said 10th constant matrix data RQRQ and said matrix data X to provide an 11th matrix data T=RQRQ·X;

(cc) computing the inner product between said third constant matrix data V and said eleventh matrix data T to provide a 12th matrix data U=V·T;

(dd) executing multiplication between said irrational numbers in said fourth matrix data W and predetermined element data in said 12th matrix data U and further computing the addition and subtraction of said multiplied results and predetermined element data in said 12th matrix data U to provide ninth matrix data YY=W·U; and (ee) shifting said ninth matrix data YY by two bits to provide said matrix data Y, defined as YY/4.

7. A discrete cosine transformation method according to claim 6, wherein computations defined by the following equations are carried out; as said inner product computation between said 10th constant matrix data RQRQ and said matrix data X in step (bb), to provide said 11th matrix data T, defined as follows:

$$t_i = s_{4i} + s_{4i+1} + s_{4i+2} + s_{4i+3}$$

$$t_{i+4} = s_{4i} - s_{4i+1} - s_{4i+2} + s_{4i+3}$$

$$t_{i+8} = s_{4i+1} - s_{4i+2}$$

$$t_{i+12} = s_{4i} - s_{4i+3}$$

wherein, i=0, 1, 2, or 3

$$s_i = X_{4i} + X_{4i+1} + X_{4i+2} + X_{4i+3}$$

$$s_{i+4} = X_{4i} - X_{4i+1} - X_{4i+2} + X_{4i+3}$$

$$s_{i+8} = X_{4i+1} - X_{4i+2}$$

$$s_{i+12} = X_{4i} - X_{4i+3}$$

wherein, i=0, 1, 2, or 3.

8. A discrete cosine transformation method according to claim 7, wherein computations defined by the following equations are carried out, as said inner product computation between said third constant matrix data V and said 11th matrix data T in step (cc), to provide said 12th matrix data U defined as follows:

$$
\begin{aligned}
u_0 &= t_0 \\
u_1 &= t_1 \\
u_2 &= t_2 + t_3 \\
u_3 &= t_2 - t_3 \\
u_4 &= t_4 \\
u_5 &= t_5 \\
u_6 &= t_6 + t_7 \\
u_7 &= t_6 - t_7 \\
u_8 &= t_8 + t_{12} \\
u_9 &= t_8 - t_{12} \\
u_{10} &= t_9 + t_{13} \\
u_{11} &= t_9 - t_{13} \\
u_{12} &= t_{10} + t_{15} \\
u_{13} &= t_{11} - t_{14} \\
u_{14} &= t_{10} - t_{11} - t_{14} - t_{15} \\
    &= (t_{10} - t_{15}) - (t_{11} + t_{14}) \\
u_{15} &= t_{10} + t_{11} + t_{14} - t_{15} \\
    &= (t_{10} - t_{15}) + (t_{11} + t_{14})
\end{aligned}
$$

9. A discrete cosine transformation method according to claim 8, wherein computations defined by the following equations are carried out, as said multiplication and addition and subtraction of the results of multiplication between said fourth matrix data W and said 12th matrix data U in step (dd), to provide said ninth matrix data YY, defined as follows:

$$y_0 = y^0$$

$$y_1 = B \cdot u_2 - C \cdot u_3$$

$$y_2 = u_1$$

$$y_3 = -C \cdot u_2 - B \cdot u_3$$

$$y_4 = B \cdot u_8 - C \cdot u_9$$

$$y_5 = u_{12} - A \cdot u_{14}$$

$$y_6 = B \cdot u_{10} - C \cdot u_{11}$$

$$y_7 = u_{13} - A \cdot u_{15}$$

$$y_8 = u_4$$

$$y_9 = B \cdot u_6 - C \cdot u_7$$

$$y_{10} = u_5$$

$$y_{11} = -C \cdot u_6 - B \cdot u_7$$

$$y_{12} = -C \cdot u_8 - B \cdot u_9$$

$$y_{13} = -u_{13} - A \cdot u_{15}$$

$$y_{14} = -C \cdot u_{10} - B \cdot u_{11}$$

$$y_{15} = u_{12} + A \cdot u_{14}.$$

10. A discrete cosine inverse transformation method, for use in transforming an image signal from a frequency space to a real space comprising computer-implemented steps of:

providing an input signal having information represented as binary data in a matrix form to an inverse cosine transform system;

transforming said input signal with said inverse cosine transform system; and providing an output signal from said inverse cosine transform system representative of said transformed input signal;

wherein, said transforming step comprises the step of performing a two-dimensional 4-r×4 column discrete cosine inverse transformation of binary data Y' in a matrix form, in accordance with the following formula:

$$X' = (¼) \, Q^t \, R \, Q^t \, R \, V^t \, W^t \, Y'$$

where, Y' denotes matrix data to be subjected to discrete cosine inverse transformation and is defined as follows:

$$
\begin{aligned}
Y' &= Y'_j \ (j = 0\text{--}15), \text{ or} \\
   &= Y'_{ij} \ (i = 0\text{--}3, j = 0\text{--}3) \\
Y_0 \ &(=Y_{00}) \\
Y_1 \ &(=Y_{01}) \\
Y_2 \ &(=Y_{02}) \\
Y_3 \ &(=Y_{03}) \\
Y_4 \ &(=Y_{10}) \\
Y_5 \ &(=Y_{11}) \\
Y_6 \ &(=Y_{12}) \\
Y_7 \ &(=Y_{13}) \\
   &= Y_8 \ (=Y_{20}) \\
Y_9 \ &(=Y_{21}) \\
Y_{10} \ &(=Y_{22}) \\
Y_{11} \ &(=Y_{23}) \\
Y_{12} \ &(=Y_{30}) \\
Y_{13} \ &(=Y_{31}) \\
Y_{14} \ &(=Y_{32}) \\
Y_{15} \ &(=Y_{33})
\end{aligned}
$$

$$
\begin{aligned}
X' &= X'_j \ (j = 0\text{--}15), \text{ or} \\
   &= X'_{ij} \ (i = 0\text{--}3, j = 0\text{--}3) \\
X_0 \ &(=X_{00}) \\
X_1 \ &(=X_{01}) \\
X_2 &(=X_{02}) \\
X_3 \ &(=X_{03}) \\
X_4 \ &(=X_{10})
\end{aligned}
$$

$X_5 (=X_{11})$
$X_6 (=X_{12})$
$X_7 (=X_{13})$
$= X_8 (=X_{20})$
$X_9 (=X_{21})$
$X_{10} (=X_{22})$
$X_{11} (=X_{23})$
$X_{12} (=X_{30})$
$X_{13} (=X_{31})$
$X_{14} (=X_{32})$
$X_{15} (=X_{33})$ $W^t$ denotes first 16×16 transposition matrix data including irrational numbers A, B, C, −A, −B, and −C, defined as follows:

$W^t = W^t_{ij}$ (i = 0~15, j = 0~15)

```
 1  0  0  0     0  0  0  0     0  0  0  0     0  0  0  0
 0  0  1  0     0  0  0  0     0  0  0  0     0  0  0  0
 0  B  0 -C     0  0  0  0     0  0  0  0     0  0  0  0
 0 -C  0 -B     0  0  0  0     0  0  0  0     0  0  0  0

0  0  0  0     0  0  0  0     1  0  0  0     0  0  0  0
 0  0  0  0     0  0  0  0     0  0  1  0     0  0  0  0
 0  0  0  0     0  0  0  0     0  B  0 -C     0  0  0  0
 0  0  0  0     0  0  0  0     0 -C  0 -B     0  0  0  0
=
 0  0  0  0     B  0  0  0     0  0  0  0    -C  0  0  0
 0  0  0  0    -C  0  0  0     0  0  0  0    -B  0  0  0
 0  0  0  0     0  0  B  0     0  0  0  0     0  0 -C  0
 0  0  0  0     0  0 -C -B     0  0  0  0     0  0  B  0

0  0  0  0     0  1  0  0     0  0  0  0     0  0  0  1
 0  0  0  0     0  0  0  1     0  0  0  0     0 -1  0  0
 0  0  0  0     0 -A  0  0     0  0  0  0     0  0  0  A
 0  0  0  0     0  0  0 -A     0  0  0  0     0 -A  0  0
```

$V^t$ denotes second 16×16 transposition constant matrix data, defined as follows:

$V^t = V^t_{ij}$ (i = 0~15, j = 15)

```
 1  1  1  1     0  0  0  0     0  0  0  0     0  0  0  0
 0  1  0  0     0  0  0  0     0  0  0  0     0  0  0  0
 0  0  1  1     0  0  0  0     0  0  0  0     0  0  0  0
 0  0  1 -1     0  0  0  0     0  0  0  0     0  0  0  0

0  0  0  0     1  0  0  0     0  0  0  0     0  0  0  0
 0  0  0  0     0  1  0  0     0  0  0  0     0  0  0  0
 0  0  0  0     0  0  1  1     0  0  0  0     0  0  0  0
 0  0  0  0     0  0  1 -1     0  0  0  0     0  0  0  0
=
 0  0  0  0     0  0  0  0     1  1  0  0     0  0  0  0
 0  0  0  0     0  0  0  0     0  0  1  1     0  0  0  0
 0  0  0  0     0  0  0  0     0  0  0  0     1  0  1  1
 0  0  0  0     0  0  0  0     0  0  0  0     0  1 -1  1

0  0  0  0     1 -1  0  0     0  0  0  0     0  0  0  0
 0  0  0  0     0  0  0 -1     0  0  0  0     0  0  0  0
 0  0  0  0     0  0  0  0     0  0  0  0     0 -1 -1  1
 0  0  0  0     0  0  0  0     0  0  0  0     1  0 -1 -1
```

R denotes third 16×16 constant matrix data, defined as follows:

$R = R_{ij}$ (i = 0~15, j = 0~15)

```
 1  1  1  1     0  0  0  0     0  0  0  0     0  0  0  0
 0  0  0  0     1  0  0  0     0  0  0  0     0  0  0  0
 0  0  0  0     0  0  0  0     1  0  0  0     0  0  0  0
 0  0  0  0     0  0  0  0     0  0  0  0     1  0  0  0

0  1  0  0     0  0  0  0     0  0  0  0     0  0  0  0
 0  0  0  0     0  1  0  0     0  0  0  0     0  0  0  0
 0  0  0  0     0  0  0  0     0  1  0  0     0  0  0  0
 0  0  0  0     0  0  0  0     0  0  0  0     0  1  0  0

0  0  1  0     0  0  0  0     0  0  0  0     0  0  0  0
 0  0  0  0     0  0  1  0     0  0  0  0     0  0  0  0
 0  0  0  0     0  0  0  0     0  0  1  0     0  0  0  0
 0  0  0  0     0  0  0  0     0  0  0  0     0  0  1  0

0  0  0  1     0  0  0  0     0  0  0  0     0  0  0  0
 0  0  0  0     0  0  0  1     0  0  0  0     0  0  0  0
 0  0  0  0     0  0  0  0     0  0  0  1     0  0  0  0
 0  0  0  0     0  0  0  0     0  0  0  0     0  0  0  1
``` and $Q^t$ denotes fourth 16×16 transposition constant matrix data, defined as follows $Q^t = Q^t_{ij}$ (i = 0~15, j = 0~15)

```
 1  1  0  1     0  0  0  0     0  0  0  0     0  0  0  0
 1 -1  1  0     0  0  0  0     0  0  0  0     0  0  0  0
 1 -1 -1  0     0  0  0  0     0  0  0  0     0  0  0  0
 1  1  0 -1     0  0  0  0     0  0  0  0     0  0  0  0

0  0  0  0     1  1  0  1     0  0  0  0     0  0  0  0
 0  0  0  0     1 -1  1  0     0  0  0  0     0  0  0  0
 0  0  0  0     1 -1 -1  0     0  0  0  0     0  0  0  0
 0  0  0  0     1  1  0 -1     0  0  0  0     0  0  0  0
=
 0  0  0  0     0  0  0  0     1  1  0  1     0  0  0  0
 0  0  0  0     0  0  0  0     1 -1  1  0     0  0  0  0
 0  0  0  0     0  0  0  0     1 -1 -1  0     0  0  0  0
 0  0  0  0     0  0  0  0     1  1  0 -1     0  0  0  0

0  0  0  0     0  0  0  0     0  0  0  0     1  1  0  1
 0  0  0  0     0  0  0  0     0  0  0  0     1 -1  1  0
 0  0  0  0     0  0  0  0     0  0  0  0     0 -1 -1  0
 0  0  0  0     0  0  0  0     0  0  0  0     1  1  0 -1
``` wherein, said transforming step comprises the step of performing a two-dimensional 4-r×4 column discrete cosine inverse transformation of binary data Y' in a matrix form, in accordance with the following formula:

$$X' = (1/4) \, Q^t \, R \, Q^t \, R \, V^t \, W^t \, Y'$$

where, Y' denotes matrix data to be subjected to discrete cosine inverse transformation and is defined as follows:

$Y' = Y'_j$ (j = 0~15), or
$= Y'_{ij}$ (i = 0~3, j = 0~3)
$y_0 (= y_{00})$
$y_1 (= y_{01})$
$y_2 (= y_{02})$
$y_3 (= y_{03})$
$y_4 (= y_{10})$
$y_5 (= y_{11})$
$y_6 (= y_{12})$
$y_7 (= y_{13})$
$= y_8 (= y_{20})$
$y_9 (= y_{21})$
$y_{10} (= y_{22})$
$y_{11} (= y_{23})$
$y_{12} (= y_{30})$
$y_{13} (= y_{31})$
$y_{14} (= y_{32})$
$y_{15} (= y_{33})$
$X' = X'_j$ (j = 0~15), or
$= X'_{ij}$ (i = 0~3, j = 0~3)
$x_0 (= x_{00})$
$x_1 (= x_{01})$
$x_2 (= x_{02})$ $$
\begin{aligned}
&\begin{array}{l} x_3 \, (=x_{03}) \\ x_4 \, (=x_{10}) \\ x_5 \, (=x_{11}) \\ x_6 \, (=x_{12}) \\ x_7 \, (=x_{13}) \\ = x_8 \, (=x_{20}) \\ x_9 \, (=x_{21}) \\ x_{10} \, (=x_{22}) \\ x_{11} \, (=x_{23}) \\ x_{12} \, (=x_{30}) \\ x_{13} \, (=x_{31}) \\ x_{14} \, (=x_{32}) \\ x_{15} \, (=x_{33}) \end{array}
\end{aligned}
$$

$W^t$ denotes first 16×16 transposition matrix data including irrational numbers A, B, C, −A, −B, and −C, defined as follows:

$W^t = W^t_{ij}$ (i = 0~15, j = 0~15)

```
1 0 0 0      0 0 0 0      0 0 0 0      0 0 0 0
0 0 1 0      0 0 0 0      0 0 0 0      0 0 0 0
0 B 0-C      0 0 0 0      0 0 0 0      0 0 0 0
0-C 0-0      0 0 0 0      0 0 0 0      0 0 0 0

0 0 0 0      0 0 0 0      1 0 0 0      0 0 0 0
0 0 0 0      0 0 0 0      0 0 1 0      0 0 0 0
0 0 0 0      0 0 0 0      0 B 0-C      0 0 0 0
0 0 0 0      0 0 0 0      0-C 0-B      0 0 0 0
=
0 0 0 0      B 0 0 0      0 0 0 0      -C 0 0 0
0 0 0 0      -C 0 1 0     0 0 0 0      -B 0 0 0
0 0 0 0      0 0 B 0      0 0 0 0      0 0-C 0
0 0 0 0      0 0-C-B      0 0 0 0      0 0 B 0

0 0 0 0      0 1 0 0      0 0 0 0      0 0 0 1
0 0 0 0      0 0 0 1      0 0 0 0      0-1 0 0
0 0 0 0      0-A 0 0      0 0 0 0      0 0 0 A
0 0 0 0      0 0 0-A      0 0 0 0      0-A 0 0
```

$V^t$ denotes second 16×16 transposition constant matrix data, defined as follows:

$V^t = V^t_{ij}$ (i = 0~15, j = 15)

```
1 0 0 0      0 0 0 0      0 0 0 0      0 0 0 0
0 1 0 0      0 0 0 0      0 0 0 0      0 0 0 0
0 0 1 1      0 0 0 0      0 0 0 0      0 0 0 0
0 0 1-1      0 0 0 0      0 0 0 0      0 0 0 0

0 0 0 0      1 0 0 0      0 0 0 0      0 0 0 0
0 0 0 0      0 1 0 0      0 0 0 0      0 0 0 0
0 0 0 0      0 0 1 1      0 0 0 0      0 0 0 0
0 0 0 0      0 0 1-1      0 0 0 0      0 0 0 0
=
0 0 0 0      0 0 0 0      1 1 0 0      0 0 0 0
0 0 0 0      0 0 0 0      0 0 1 1      0 0 0 0
0 0 0 0      0 0 0 0      0 0 0 0      1 0 1 1
0 0 0 0      0 0 0 0      0 0 0 0      0 1-1 1

0 0 0 0      1-1 0 0      0 0 0 0      0 0 0 0
0 0 0 0      0 0 0 0      0 0 0-1      0 0 0 0
0 0 0 0      0 0 0 0      0 0 0 0      0-1-1-1
0 0 0 0      0 0 0 0      0 0 0 0      1 0-1-1
```

R denotes third 16×16 constant matrix data, defined as follows:

$R = R_{ij}$ (i = 0~15, j = 0~15)

```
1 0 0 0      0 0 0 0      0 0 0 0      0 0 0 0
0 0 0 0      1 0 0 0      0 0 0 0      0 0 0 0
0 0 0 0      0 0 0 0      1 0 0 0      0 0 0 0
0 0 0 0      0 0 0 0      0 0 0 0      1 0 0 0

0 1 0 0      0 0 0 0      0 0 0 0      0 0 0 0
0 0 0 0      0 1 0 0      0 0 0 0      0 0 0 0
0 0 0 0      0 0 0 0      0 1 0 0      0 0 0 0
0 0 0 0      0 0 0 0      0 0 0 0      0 1 0 0
=
0 0 1 0      0 0 0 0      0 0 0 0      0 0 0 0
0 0 0 0      0 0 1 0      0 0 0 0      0 0 0 0
0 0 0 0      0 0 0 0      0 0 1 0      0 0 0 0
0 0 0 0      0 0 0 0      0 0 0 0      0 0 1 0

0 0 0 1      0 0 0 0      0 0 0 0      0 0 0 0
0 0 0 0      0 0 0 1      0 0 0 0      0 0 0 0
0 0 0 0      0 0 0 0      0 0 0 1      0 0 0 0
0 0 0 0      0 0 0 0      0 0 0 0      0 0 0 1
``` and $Q^t$ denotes fourth 16×16 transposition constant matrix data, defined as follows:

$Q^t = Q^t_{ij}$ (i = 0~15, j = 0~15)

```
1 1 0 1      0 0 0 0      0 0 0 0      0 0 0 0
1-1 1 0      0 0 0 0      0 0 0 0      0 0 0 0
1-1-1-0      0 0 0 0      0 0 0 0      0 0 0 0
1 1 0-1      0 0 0 0      0 0 0 0      0 0 0 0

0 0 0 0      1 1 0 1      0 0 0 0      0 0 0 0
0 0 0 0      1-1 1 0      0 0 0 0      0 0 0 0
0 0 0 0      1-1-1 0      0 0 0 0      0 0 0 0
0 0 0 0      1 1 0-1      0 0 0 0      0 0 0 0
=
0 0 0 0      0 0 0 0      1 111 0 1    0 0 0 0
0 0 0 0      0 0 0 0      1-1 1 0      0 0 0 0
0 0 0 0      0 0 0 0      1-1-1 0      0 0 0 0
0 0 0 0      0 0 0 0      1 1 0-1      0 0 0 0

0 0 0 0      0 0 0 0      0 0 0 0      1 1 0 1
0 0 0 0      0 0 0 0      0 0 0 0      1-1 1 0
0 0 0 0      0 0 0 0      0 0 0 0      1-1-1 0
0 0 0 0      0 0 0 0      0 0 0 0      1 1 0 1
``` wherein said transforming step comprises the steps of:

(a) previously obtaining a fifth constant matrix data $Q^tR$ by computing the inner product between said third constant matrix data R and said fourth transposition constant matrix $Q^t$, defined as follows:

$Q^tR = Q^tR_{ij}$ (i = 0~15, j = 0~15)

```
1 0 0 0      1 0 0 0      0 0 0 0      1 0 0 0
1 0 0 0      -10 0 0      1 0 0 0      0 0 0 0
1 0 0 0      -10 0 0      -10 0 0      0 0 0 0
1 0 0 0      1 0 0 0      0 0 0 0      -10 0 0

0 1 0 0      0 1 0 0      0 0 0 0      0 1 0 0
0 1 0 0      0-1 0 0      0 1 0 0      0 0 0 0
0 1 0 0      0-1 0 0      0-1 0 0      0 0 0 0
0 1 0 0      0 1 0 0      0 0 0 0      0-1 0 0
=
0 0 1 0      0 0 1 0      0 0 0 0      0 0 1 0
0 0 1 0      0 0-1 0      0 0 1 0      0 0 0 0
0 0 1 0      0 0-1 0      0 0-1 0      0 0 0 0
0 0 1 0      0 0 1 0      0 0 0 0      0 0-1 0

0 0 0 1      0 0 0 1      0 0 0 0      0 0 0 1
0 0 0 1      0 0 0-1      0 0 0 1      0 0 0 0
0 0 0 1      0 0 0-1      0 0 0-1      0 0 0 0
0 0 0 1      0 0 0 1      0 0 0 0      0 0 0-1
```

(b) performing multiplication with a multiplication-addition circuit between said irrational numbers in said first transposition matrix data $W^t$ and predetermined element data in said matrix data Y' to provide sixth matrix data $U'=W^t \cdot Y'$;

(c) computing with a first addition-subtraction circuit the inner product between said second transposition constant matrix data $V^t$ and said sixth matrix data U' to provide seventh matrix data $T'=V^t \cdot U'$;

(d) computing with said first addition-subtraction circuit the inner product between said fifth constant matrix data $Q^tR$ and said seventh matrix data T' to provide eighth matrix data $S'=Q_tR \cdot T'$;

(e) computing with a second addition-subtraction circuit the inner product between said fifth constant matrix data $Q^tR$ and said eighth matrix data S' to provide ninth matrix data $XX'=Q^tR \cdot S'$; and (f) shifting with said second addition-subtraction circuit said ninth matrix data XX' by two bits to provide said matrix data X', defined as XX'/4.

11. A discrete cosine inverse transformation method according to claim 10, wherein computations defined by the following equations are carried out by said multiplication-addition circuit, as said computation between said first constant matrix data $W^t$ and said matrix data Y' in step (b), to provide said sixth matrix data U', defined as follows:

$u'_0 = y_0$ $u'_1 = y_2$ $u'_2 = B \cdot y_1 - C \cdot y_3$ $u'_3 = -C \cdot y_1 - B \cdot y_3$ $u'_4 = y_8$ $u'_5 = y_{10}$ $u'_6 = B \cdot y_9 - C \cdot y_{11}$ $u'_7 = -C \cdot y_9 - B \cdot y_{11}$ $u'_8 = B \cdot y_4 - C \cdot y_{12}$ $u'_9 = -C \cdot y_4 - C \cdot y_{15}$ $u'_{10} = B \cdot y_6 - C \cdot y_{15}$ $u'_{11} = -C \cdot y_6 + B \cdot y_{15}$ $u'_{12} = y_5 + y_{15}$ $u'_{13} = y_5 - y_{13}$ $u'_{14} = -A \cdot y_5 + A \cdot y_{15}$ $u'_{15} = -A \cdot y_7 + A \cdot y_{13}$.

12. A discrete cosine inverse transformation method according to claim 11, wherein computations defined by the following equations are carried out by said first addition-subtraction circuit, as said inner product computation between said second transposition constant matrix data $V^t$ and said sixth matrix data U' in step (c), to provide said seventh matrix data T', defined as follows:

$t'_0 = u'_0$
$t'_1 = u'_1$
$t'_2 = u'_2 + u'_3$
$t'_3 = u'_2 - u'_3$
$t'_4 = u'_4$
$t'_5 = u'_5$
$t'_6 = u'_6 + u'_7$
$t'_7 = u'_6 - u'_7$
$t'_8 = u'_8 + u'_9$
$t'_9 = u'_{10} + u'_{11}$
$t'_{10} = u'_{12} + u'_{14} + u'_{15}$
$t'_{11} = u'_{13} - u'_{14} + u'_{15}$
$\quad = (u'_{15} - u'_{14}) + u'_{13}$
$t'_{12} = u'_8 - u'_9$
$t'_{13} = u'_{10} - u'_{11}$
$t'_{14} = -u'_{13} - u'_{14} + u'_{15}$
$\quad = (u'_{15} - u'_{14}) - u'_{13}$
$t'_{15} = u'_{12} - u'_{14} - u'_{15}$
$\quad = u'_{12} - (u'_{15} + u'_{14})$.

13. A discrete cosine inverse transformation method according to claim 12, wherein computations defined by the following equations are carried out by said second addition-subtraction circuit, as said inner product computation between said fifth constant matrix data $Q^tR$ and said seventh matrix data T' in step (d), to provide said eighth matrix data S', defined as follows:

$s_{4i}' = t_i' + t_{i+4}' + t_{i+12}'$
$\quad = (t_i' + t_{i+4}') + t_{i+12}'$ $s_{4i+1}' = t_i' - t_{i+4}' + t_{i+8}'$
$\quad = (t_i' - t_{i+4}') + t_{i+8}'$ $s_{4i+2}' = t_i' - t_{i+4}' - t_{i+8}'$
$\quad = (t_i' - t_{i+4}') - t_{i+8}'$ $s_{4i+3}' = t_i' + t_{i+4}' - t_{i+12}'$
$\quad = (t_i' + t_{i+4}') - t_{i+12}'$ wherein, i=0, 1, 2 and 3.

14. A discrete cosine inverse transformation method according to claim 13, wherein computations defined by the following equations are carried out by said second addition-subtraction circuit, as the inner product between said fifth transposition constant matrix data $Q^tR$ and said eighth matrix data S' in step (d), to provide said ninth matrix data XX', defined as follows:

$x_{4i}' = s_i' + s_{i+4}' + s_{i+12}'$
$\quad = (s_i' + s_{i+4}') + s_{i+12}'$ $x_{4i+1}' = s_i' - s_{i+4}' + s_{i+8}'$
$\quad = (s_i' - s_{i+4}') + s_{i+8}'$ $x_{4i+2}' = s_i' - s_{i+4}' - s_{i+8}'$
$\quad = (s_i' - s_{i+4}') - s_{i+8}'$ $x_{4i+3}' = s_i' + s_{i+4}' - s_{i+12}'$
$\quad = (s_i' + s_{i+4}') - s_{i+12}'$ wherein, i=0, 1, 2, or 3.

15. A discrete cosine inverse transformation method, for use in transforming an image signal from a frequency space to a real space comprising computer-implemented steps of:

providing an input signal having information represented as binary data in a matrix form to an inverse cosine transform system;

transforming said input signal with said inverse cosine transform system; and providing an output signal from said inverse cosine transform system representative of said transformed input signal;

wherein, said transforming step comprises the step of performing a two-dimensional 4-r×4 column discrete cosine inverse transformation of binary data Y' in a matrix form, in accordance with the following formula:

$X' = (1/4) Q^t R Q^t V^t W^t Y'$ where, Y' denotes matrix data to be subjected to discrete cosine inverse transformation and is defined as follows:

$Y' = Y'_j$ (j = 0~15), or
$= Y'_{ij}$ (i = 0~3, j = 0~3)
$y_0 (= y_{00})$
$y_1 (= y_{01})$
$y_2 (= y_{02})$
$y_3 (= y_{03})$
$y_4 (= y_{10})$
$y_5 (= y_{11})$
$y_6 (= y_{12})$
$y_7 (= y_{13})$
$= y_8 (= y_{20})$
$y_9 (= y_{21})$
$y_{10} (= y_{22})$
$y_{11} (= y_{23})$
$y_{12} (= y_{30})$
$y_{13} (= y_{31})$
$y_{14} (= y_{32})$
$y_{15} (= y_{33})$
$X' = X'_j$ (j = 0~15), or
$= X'_{ij}$ (i = 0~3, j = 0~3)
$x_0 (= x_{00})$
$x_1 (= x_{01})$
$x_2 (= x_{02})$
$x_3 (= x_{03})$
$x_4 (= x_{10})$
$x_5 (= x_{11})$
$x_6 (= x_{12})$
$x_7 (= x_{13})$
$= x_8 (= x_{20})$
$x_9 (= x_{21})$
$x_{10} (= x_{22})$
$x_{11} (= x_{23})$
$x_{12} (= x_{30})$
$x_{13} (= x_{31})$
$x_{14} (= x_{32})$
$x_{15} (= x_{33})$ $W^t$ denotes first 16×16 transposition matrix data including irrational numbers A, B, C, −A, −B, and −C, defined as follows:

$W^t = W^t_{ij}$ (i = 0~15, j = 0~15)

| 1 0 0 0 | 0 0 0 0 | 0 0 0 0 | 0 0 0 0 |
|---|---|---|---|
| 0 0 1 0 | 0 0 0 0 | 0 0 0 0 | 0 0 0 0 |
| 0 B 0 −C | 0 0 0 0 | 0 0 0 0 | 0 0 0 0 |
| 0 −C 0 −B | 0 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 1 0 | 0 0 0 0 |
| 0 0 0 0 | 0 0 0 0 | 0 B 0 −C | 0 0 0 0 |
| 0 0 0 0 | 0 0 0 0 | 0 −C 0 −B | 0 0 0 0 |
| 0 0 0 0 | B 0 0 0 | 0 0 0 0 | −C 0 0 0 |
| 0 0 0 0 | −C 0 0 0 | 0 0 0 0 | −B 0 0 0 |
| 0 0 0 0 | 0 0 B 0 | 0 0 0 0 | 0 0 −C 0 |
| 0 0 0 0 | 0 0 −C −B | 0 0 0 0 | 0 0 B 0 |
| 0 0 0 0 | 0 1 0 0 | 0 0 0 0 | 0 0 0 1 |
| 0 0 0 0 | 0 0 0 0 | 0 0 0 0 | 0 −1 0 0 |
| 0 0 0 0 | 0 −A 0 0 | 0 0 0 0 | 0 0 0 A |
| 0 0 0 0 | 0 0 0 −A | 0 0 0 0 | 0 −A 0 0 |

$V^t$ denotes second 16×16 transposition constant matrix data, defined as follows:

$V^t = V^t_{ij}$ (i = 0~15, j = 15)

| 1 0 0 0 | 0 0 0 0 | 0 0 0 0 | 0 0 0 0 |
|---|---|---|---|
| 0 1 0 0 | 0 0 0 0 | 0 0 0 0 | 0 0 0 0 |
| 0 0 1 1 | 0 0 0 0 | 0 0 0 0 | 0 0 0 0 |

-continued

| 0 0 1 −1 | 0 0 0 0 | 0 0 0 0 | 0 0 0 0 |
|---|---|---|---|
| 0 0 0 0 | 1 0 0 0 | 0 0 0 0 | 0 0 0 0 |
| 0 0 0 0 | 0 1 0 0 | 0 0 0 0 | 0 0 0 0 |
| 0 0 0 0 | 0 0 1 1 | 0 0 0 0 | 0 0 0 0 |
| 0 0 0 0 | 0 0 1 −1 | 0 0 0 0 | 0 0 0 0 |
| 0 0 0 0 | 0 0 0 0 | 1 1 0 0 | 0 0 0 0 |
| 0 0 0 0 | 0 0 0 0 | 0 0 1 1 | 0 0 0 0 |
| 0 0 0 0 | 0 0 0 0 | 0 0 0 0 | 1 0 1 1 |
| 0 0 0 0 | 0 0 0 0 | 0 0 0 0 | 0 1 −1 1 |
| 0 0 0 0 | 1 −1 0 0 | 0 0 0 0 | 0 0 0 0 |
| 0 0 0 0 | 0 0 0 0 | 0 0 0 −1 | 0 0 0 0 |
| 0 0 0 0 | 0 0 0 0 | 0 0 0 0 | 0 −1 −1 1 |
| 0 0 0 0 | 0 0 0 0 | 0 0 0 0 | 0 0 −1 −1 |

R denotes third 16×16 constant matrix data, defined as follows:

$R = R_{ij}$ (i = 0~15, j = 0~15)

| 1 0 0 0 | 0 0 0 0 | 0 0 0 0 | 0 0 0 0 |
|---|---|---|---|
| 0 0 0 0 | 1 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 0 0 | 1 0 0 0 |
| 0 1 0 0 | 0 0 0 0 | 0 0 0 0 | 0 0 0 0 |
| 0 0 0 0 | 0 1 0 0 | 0 0 0 0 | 0 0 0 0 |
| 0 0 0 0 | 0 0 0 0 | 0 1 0 0 | 0 0 0 0 |
| 0 0 0 0 | 0 0 0 0 | 0 0 0 0 | 0 0 0 1 |
| 0 0 1 0 | 0 0 0 0 | 0 0 0 0 | 0 0 0 0 |
| 0 0 0 0 | 0 0 1 0 | 0 0 0 0 | 0 0 0 0 |
| 0 0 0 0 | 0 0 0 0 | 0 0 1 0 | 0 0 0 0 |
| 0 0 0 0 | 0 0 0 0 | 0 0 0 0 | 0 0 1 0 |
| 0 0 0 1 | 0 0 0 0 | 0 0 0 0 | 0 0 0 0 |
| 0 0 0 0 | 0 0 0 1 | 0 0 0 0 | 0 0 0 0 |
| 0 0 0 0 | 0 0 0 0 | 0 0 0 1 | 0 0 0 0 |
| 0 0 0 0 | 0 0 0 0 | 0 0 0 0 | 0 0 0 1 | and $Q^t$ denotes fourth 16×16 transposition constant matrix data, defined as follows:

$Q^t = Q^t_{ij}$ (i = 0~15, j = 0~15)

| 1 0 1 1 | 0 0 0 0 | 0 0 0 0 | 0 0 0 0 |
|---|---|---|---|
| 1 −1 1 0 | 0 0 0 0 | 0 0 0 0 | 0 0 0 0 |
| 1 −1 −1 0 | 0 0 0 0 | 0 0 0 0 | 0 0 0 0 |
| 1 1 0 −1 | 0 0 0 0 | 0 0 0 0 | 0 0 0 0 |
| 0 0 0 0 | 1 1 0 0 | 0 0 0 0 | 0 0 0 0 |
| 0 0 0 0 | 1 −1 1 0 | 0 0 0 0 | 0 0 0 0 |
| 0 0 0 0 | 1 −1 −1 0 | 0 0 0 0 | 0 0 0 0 |
| 0 0 0 0 | 1 1 0 −1 | 0 0 0 0 | 0 0 0 0 |
| 0 0 0 0 | 0 0 0 0 | 1 1 0 1 | 0 0 0 0 |
| 0 0 0 0 | 0 0 0 0 | 1 −1 1 0 | 0 0 0 0 |
| 0 0 0 0 | 0 0 0 0 | 1 −1 −1 0 | 0 0 0 0 |
| 0 0 0 0 | 0 0 0 0 | 1 1 0 −1 | 0 0 0 0 |
| 0 0 0 0 | 0 0 0 0 | 0 0 0 0 | 1 1 0 1 |
| 0 0 0 0 | 0 0 0 0 | 0 0 0 0 | 1 −1 1 0 |
| 0 0 0 0 | 0 0 0 0 | 0 0 0 0 | 1 −1 −1 0 |
| 0 0 0 0 | 0 0 0 0 | 0 0 0 0 | 1 1 0 −1 | wherein said transforming step comprises the steps of:
(aa) obtaining fifth constant matrix data $Q^tR$, defined by the following equation, by computing the inner product between said third constant matrix R and said fourth transposition constant matrix data $Q^t$, and further obtaining 10th constant matrix data $Q^tRQ^tR$ defined by the following equation, by computing the inner product between said fifth matrix data $Q^tR$ and the same:

$$Q^tR = Q^tR_{ij} \ (i=0\text{--}15, j=0\text{--}15)$$

| 1 0 0 0 | 1 0 0 0 | 0 0 0 0 | 1 0 0 0 |
|---|---|---|---|
| 1 0 0 0 | −1 0 0 0 | 1 0 0 0 | 0 0 0 0 |
| 1 0 0 0 | −1 0 0 0 | −1 0 0 0 | 0 0 0 0 |
| 1 0 0 0 | 1 0 0 0 | 0 0 0 0 | −1 0 0 0 |
| 0 1 0 0 | 0 1 0 0 | 0 0 0 0 | 0 1 0 0 |
| 0 1 0 0 | 0 −1 0 0 | 0 1 0 0 | 0 0 0 0 |
| 0 1 0 0 | 0 −1 0 0 | 0 −1 0 0 | 0 0 0 0 |
| 0 1 0 0 | 0 1 0 0 | 0 0 0 0 | 0 −1 0 0 |
| 0 0 1 0 | 0 0 1 0 | 0 0 0 0 | 0 0 1 0 |
| 0 0 1 0 | 0 0 −1 0 | 0 0 1 0 | 0 0 0 0 |
| 0 0 1 0 | 0 0 −1 0 | 0 0 −1 0 | 0 0 0 0 |
| 0 0 1 0 | 0 0 1 0 | 0 0 0 0 | 0 0 −1 0 |
| 0 0 0 1 | 0 0 0 1 | 0 0 0 0 | 0 0 0 1 |
| 0 0 0 1 | 0 0 0 −1 | 0 0 0 1 | 0 0 0 0 |
| 0 0 0 1 | 0 0 0 −1 | 0 0 0 −1 | 0 0 0 0 |
| 0 0 0 1 | 0 0 0 1 | 0 0 0 0 | 0 0 0 −1 |

$$Q^tRQ^tR = Q^tRQ^tR_{ij} \ (i=0\text{--}15, j=0\text{--}15)$$

| 1 1 1 1 | 0 0 0 0 | 0 0 0 0 | 0 0 0 0 |
|---|---|---|---|
| 0 0 0 0 | 1 1 1 1 | 0 0 0 0 | 0 0 0 0 |
| 0 0 0 0 | 0 0 0 0 | 1 1 1 1 | 0 0 0 0 |
| 0 0 0 0 | 0 0 0 0 | 0 0 0 0 | 1 1 1 1 |
| 1 −1 −1 −1 | 0 0 0 0 | 0 0 0 0 | 0 0 0 0 |
| 0 0 0 0 | 1 −1 −1 −1 | 0 0 0 0 | 0 0 0 0 |
| 0 0 0 0 | 0 0 0 0 | 1 −1 −1 −1 | 0 0 0 0 |
| 0 0 0 0 | 0 0 0 0 | 0 0 0 0 | 1 −1 −1 −1 |
| 0 1 −1 0 | 0 0 0 0 | 0 0 0 0 | 0 0 0 0 |
| 0 0 0 0 | 0 1 −1 0 | 0 0 0 0 | 0 0 0 0 |
| 0 0 0 0 | 0 0 0 0 | 0 1 −1 0 | 0 0 0 0 |
| 0 0 0 0 | 0 0 0 0 | 0 0 0 0 | 0 1 −1 0 |
| 1 0 0 −1 | 0 0 0 0 | 0 0 0 0 | 0 0 0 0 |
| 0 0 0 0 | 1 0 0 −1 | 0 0 0 0 | 0 0 0 0 |
| 0 0 0 0 | 0 0 0 0 | 1 0 0 −1 | 0 0 0 0 |
| 0 0 0 0 | 0 0 0 0 | 0 0 0 0 | 1 0 0 −1 |

(bb) executing multiplication between said irrational numbers in said first transposition matrix data $W^t$ and predetermined element data in said matrix data Y' and further performing addition and subtraction of said multiplied results and predetermined element data in said matrix data Y to provide a sixth matrix data $U'=W^t \cdot Y'$; and (cc) computing the inner product between said second transposition constant matrix data $V^t$ and said sixth matrix data U' to provide said seventh matrix data T';

(dd) computing the inner product between said 10th constant matrix data $Q^tRQ^tR$ and said seventh matrix data T' to provide said ninth matrix data XX'; and (ee) shifting said ninth matrix data XX' by two bits to provide said matrix data X', defined as XX'/4.

16. A discrete cosine inverse transformation method according to claim 15, wherein computations defined by the following equations are carried out, as said inner product computation between said first transposition matrix data $W^t$ and said matrix data X in step (bb), to provide said sixth matrix data U', defined as follows:

$u'_0 = y_0$ $u'_1 = y_2$ $u'_2 = B \cdot y_1 - C \cdot y_3$ $u'_3 = -C \cdot y_1 - B \cdot y_3$ $u'_4 = y_8$ $u'_5 = y_{10}$ $u'_6 = B \cdot y_9 - C \cdot y_{11}$ $u'_7 = -C \cdot y_9 - B \cdot y_{11}$ $u'_8 = B \cdot y_4 - C \cdot y_{12}$ $u'_9 = -C \cdot y_4 - B \cdot y_{12}$ $u'_{10} = B \cdot y_6 - C \cdot y_{15}$ $u'_{11} = -C \cdot y_6 + B \cdot y_{15}$ $u'_{12} = y_5 + y_{15}$ $u'_{13} = y_5 - y_{13}$ $u'_{14} = -A \cdot y_5 + A \cdot y_{15}$ $u'_{15} = -A \cdot y_7 + A \cdot y_{13}$.

17. A discrete cosine inverse transformation method according to claim 16, wherein computations defined by the following equations are carried out, as said inner product computation between said second transposition constant matrix data $V^t$ and said sixth matrix data U' in step (cc), to provide said seventh matrix data T', defined as follows:

$t'_0 = u'_0$
$t'_1 = u'_1$
$t'_2 = u'_2 + u'_3$
$t'_3 = u'_2 - u'_3$
$t'_4 = u'_4$
$t'_5 = u'_5$
$t'_6 = u'_6 + u'_7$
$t'_7 = u'_6 - u'_7$
$t'_8 = u'_8 + u'_9$
$t'_9 = u'_{10} + u'_{11}$
$t'_{10} = u'_{12} + u'_{14} + u'_{15}$
$\qquad = u'_{12} + (u'_{15} + u'_{14})$
$t'_{11} = u'_{13} - u'_{14} + u'_{15}$
$\qquad = (u'_{15} - u'_{14}) + u'_{13}$
$t'_{12} = u'_8 - u'_9$
$t'_{13} = u'_{10} - u'_{11}$
$t'_{14} = -u'_{13} - u'_{14} + u'_{15}$
$\qquad = (u'_{15} - u'_{14}) - u'_{13}$
$t'_{15} = u'_{12} - u'_{14} - u'_{15}$
$\qquad = u'_{12} - (u'_{15} + u'_{14})$.

18. A discrete cosine inverse transformation method according to claim 17, wherein computations defined by the following equations are carried out, as the inner product between said fifth matrix data $Q^tR$ and said seventh matrix data T' in step (dd), to provide said eighth matrix data S', defined as follows:

$s_{4i}' = t'_i + t'_{i+4} + t'_{i+12}$
$\qquad = (t'_i + t'_{i+4}) + t'_{i+12}$ $s_{4i+1}' = t'_i - t'_{i+4} + t'_{i+8}$
$\qquad = (t'_i - t'_{i+4}) + t'_{i+8}$ $s_{4i+2}' = t'_i - t'_{i+4} + t'_{i+8}$
$\qquad = (t'_i - t'_{i+4}) + t'_{i+8}$ $s_{4i+3}' = t'_i + t'_{i+4} - t'_{i+12}$
$\qquad = (t'_i - t'_{i+4}) - t'_{i+12}$ wherein, $i = 0, 1, 2,$ or $3$ wherein, i=0, 1, 2, or 3 and to thereby provide the following matrix data X' defined as follows:

$$x_{4i}' = s_i' + s_{i+4}' + s_{i+12}'$$
$$= (s_i' + s_{i+4}') + s_{i+12}'$$
$$x_{4i+1}' = s_i' - s_{i+4}' + s_{i+8}'$$
$$= (s_i' - s_{i+4}') + s_{i+8}'$$
$$x_{4i+2}' = s_i' - s_{i+4}' + s_{i+8}'$$
$$= (s_i' - s_{i+4}') + s_{i+8}'$$
$$x_{4i+3}' = s_i' + s_{i+4}' - s_{i+12}'$$
$$= (s_i' - s_{i+4}') - s_{i+12}'$$
wherein, $i = 0, 1, 2,$ or $3$.

wherein, $i=0, 1, 2,$ or $3$.

19. A discrete cosine transformation system comprising:

input means for providing an input signal having information represented as binary data in a matrix form;

transforming means for transforming said input signal; and output means for providing an output signal representative of said transformed input signal;

wherein, said transforming means performs a two-dimensional 4-row×4 column discrete cosine transformation of binary data in a matrix form in accordance with the following formula:

$$Y = (\tfrac{1}{4}) \, W V R Q R Q X$$

where, X denotes matrix data to be subjected to the discrete cosine transformation and is defined as follows:

$$
\begin{aligned}
X &= X_j \ (j = 0\text{--}15), \text{ or} \\
&= X_{ij} \ (i = 0\text{--}3, j = 0\text{--}3) \\
&\quad x_0 \ (= x_{00}) \\
&\quad x_1 \ (= x_{01}) \\
&\quad x_2 \ (= x_{02}) \\
&\quad x_3 \ (= x_{03}) \\
&\quad x_4 \ (= x_{10}) \\
&\quad x_5 \ (= x_{11}) \\
&\quad x_6 \ (= x_{12}) \\
&\quad x_7 \ (= x_{13}) \\
&= x_8 \ (= x_{20}) \\
&\quad x_9 \ (= x_{21}) \\
&\quad x_{10} \ (= x_{22}) \\
&\quad x_{11} \ (= x_{23}) \\
&\quad x_{12} \ (= x_{30}) \\
&\quad x_{13} \ (= x_{31}) \\
&\quad x_{14} \ (= x_{32}) \\
&\quad x_{15} \ (= x_{33})
\end{aligned}
$$

Y denotes matrix data obtained by the discrete cosine transformation and is defined as follows:

$$
\begin{aligned}
Y &= Y_j \ (j = 0\text{--}15), \text{ or} \\
&= Y_{ij} \ (i = 0\text{--}3, j = 0\text{--}3) \\
&\quad y_0 \ (= y_{00}) \\
&\quad y_1 \ (= y_{01}) \\
&\quad y_2 \ (= y_{02}) \\
&\quad y_3 \ (= y_{03}) \\
&\quad y_4 \ (= y_{10}) \\
&\quad y_5 \ (= y_{11}) \\
&\quad y_6 \ (= y_{12}) \\
&\quad y_7 \ (= y_{13}) \\
&= y_8 \ (= y_{20}) \\
&\quad y_9 \ (= y_{21}) \\
&\quad y_{10} \ (= y_{22}) \\
&\quad y_{11} \ (= y_{23}) \\
&\quad y_{12} \ (= y_{30}) \\
&\quad y_{13} \ (= y_{31}) \\
&\quad y_{14} \ (= y_{32}) \\
&\quad y_{15} \ (= y_{33})
\end{aligned}
$$

R denotes first 16×16 constant matrix data, defined as follows:

$$
R = R_{ij} \ (i = 0\text{--}15, j = 0\text{--}15)
$$

```
      1 0 0 0   0 0 0 0   0 0 0 0   0 0 0 0
      0 0 0 0   1 0 0 0   0 0 0 0   0 0 0 0
      0 0 0 0   0 0 0 0   1 0 0 0   0 0 0 0
      0 0 0 0   0 0 0 0   0 0 0 0   1 0 0 0

0 1 0 0   0 0 0 0   0 0 0 0   0 0 0 0
      0 0 0 0   0 1 0 0   0 0 0 0   0 0 0 0
      0 0 0 0   0 0 0 0   0 1 0 0   0 0 0 0
      0 0 0 0   0 0 0 0   0 0 0 0   0 1 0 0
  =
      0 0 1 0   0 0 0 0   0 0 0 0   0 0 0 0
      0 0 0 0   0 0 1 0   0 0 0 0   0 0 0 0
      0 0 0 0   0 0 0 0   0 0 1 0   0 0 0 0
      0 0 0 0   0 0 0 0   0 0 0 0   0 0 1 0

0 0 0 1   0 0 0 0   0 0 0 0   0 0 0 0
      0 0 0 0   0 0 0 1   0 0 0 0   0 0 0 0
      0 0 0 0   0 0 0 0   0 0 0 1   0 0 0 0
      0 0 0 0   0 0 0 0   0 0 0 0   0 0 0 1
```

Q denotes second 16×16 constant matrix data, defined as follows:

$$
Q = Q_{ij} \ (i = 0\text{--}15, j = 0\text{--}15)
$$

```
      1  1  1  1   0 0 0 0   0 0 0 0   0 0 0 0
      1 -1 -1  1   0 0 0 0   0 0 0 0   0 0 0 0
      0  1 -1  0   0 0 0 0   0 0 0 0   0 0 0 0
      1  0  0 -1   0 0 0 0   0 0 0 0   0 0 0 0

0 0 0 0    1  1  1  1   0 0 0 0   0 0 0 0
      0 0 0 0    1 -1 -1  1   0 0 0 0   0 0 0 0
      0 0 0 0    0  1 -1  0   0 0 0 0   0 0 0 0
      0 0 0 0    1  0  0 -1   0 0 0 0   0 0 0 0
  =
      0 0 0 0   0 0 0 0    1  1  1  1   0 0 0 0
      0 0 0 0   0 0 0 0    1 -1 -1  1   0 0 0 0
      0 0 0 0   0 0 0 0    0  1 -1  0   0 0 0 0
      0 0 0 0   0 0 0 0    1  0  0 -1   0 0 0 0

0 0 0 0   0 0 0 0   0 0 0 0    1  1  1  1
      0 0 0 0   0 0 0 0   0 0 0 0    1 -1 -1  1
      0 0 0 0   0 0 0 0   0 0 0 0    0  1 -1  0
      0 0 0 0   0 0 0 0   0 0 0 0    1  0  0 -1
```

V denotes third 16×16 constant matrix data, defined as follows:

$$
V = V_{ij} \ (i = 0\text{--}14, j = 0\text{--}15)
$$

```
      1  0  0   0 0 0 0   0 0 0 0   0 0 0 0
      0  1  0  0   0 0 0 0   0 0 0 0   0 0 0 0
      0  0  1  1   0 0 0 0   0 0 0 0   0 0 0 0
      0  0  1 -1   0 0 0 0   0 0 0 0   0 0 0 0

0 0 0 0    1 0 0 0   0 0 0 0   0 0 0 0
      0 0 0 0    0 1 0 0   0 0 0 0   0 0 0 0
      0 0 0 0    0 0 1 1   0 0 0 0   0 0 0 0
      0 0 0 0    0 0 1 -1   0 0 0 0   0 0 0 0
  =
      0 0 0 0   0 0 0 0    1 0 0 0    1 0 0 0
      0 0 0 0   0 0 0 0    1 0 0 0   -1 0 0 0
      0 0 0 0   0 0 0 0    0 1 0 0    0 1 0 0
      0 0 0 0   0 0 0 0    0 1 0 0    0 -1 0 0

0 0 0 0   0 0 0 0    0 0 1 0    0 0 0 1
```

-continued

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 1 | 0 | 0–1 | 0 | |
| 0 | 0 | 0 | 0 | 0 | 0 | 0 | 0 | 0 | 0 | 1–1 | | 0 | 0–1 | –1 | |
| 0 | 0 | 0 | 0 | 0 | 0 | 0 | 0 | 0 | 0 | 1 | 1 | 0 | 0 | 1–1 | | and,

W denotes fourth 16×16 matrix data including irrational numbers A, B, C, –A, –B, and –C and is defined as follows:

$W = W_{ij}$ (i = 0~15, j = 0~15)

| | | | | | | | | | | | | | | | |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 0 | 0 | B–C | | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 |
| 0 | 0 | –C–B | | 0 | 0 | 0 | 0 | 0 | 0 | 0 | 0 | 0 | 0 | 0 | 0 |
| 0 | 0 | 0 | 0 | 0 | 0 | 0 | 0 | B–C | 0 | 0 | | 0 | 0 | 0 | 0 |
| 0 | 0 | 0 | 0 | 0 | 0 | 0 | 0 | 0 | 0 | 0 | 0 | 1 | 0–A | 0 | |
| 0 | 0 | 0 | 0 | 0 | 0 | 0 | 0 | 0 | 0 | B–C | | 0 | 0 | 0 | 0 |
| 0 | 0 | 0 | 0 | 0 | 0 | 0 | 0 | 0 | 0 | 0 | 0 | 0 | 1 | 0–A | |
| = | | | | | | | | | | | | | | | |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | B–C | | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | –C–B | | 0 | 0 | 0 | 0 | 0 | 0 | 0 | 0 |
| 0 | 0 | 0 | 0 | 0 | 0 | 0 | 0 | –C–B | 0 | 0 | | 0 | 0 | 0 | 0 |
| 0 | 0 | 0 | 0 | 0 | 0 | 0 | 0 | 0 | 0 | 0 | 0 | 0–1 | 0–A | | |
| 0 | 0 | 0 | 0 | 0 | 0 | 0 | 0 | 0 | 0 | –C–B | | 0 | 0 | 0 | 0 |
| 0 | 0 | 0 | 0 | 0 | 0 | 0 | 0 | 0 | 0 | 0 | 0 | 1 | 0 | A | 0 | where,
A=cos (π/4)
B=cos (π/8), and
C=cos (3 π/8);

said transforming means further comprising:

a first computing means for computing the inner product between the following fifth constant matrix data RQ and said matrix data X from said input means to provide sixth matrix data S=RQ·X:

$RQ = RQ_{ij}$ (i = 0~15, j = 15)

| | | | | | | | | | | | | | | | |
|---|---|---|---|---|---|---|---|---|---|---|---|---|---|---|---|
| 1 | 1 | 1 | 1 | 0 | 0 | 0 | 0 | 0 | 0 | 0 | 0 | 0 | 0 | 0 | 0 |
| 0 | 0 | 0 | 0 | 1 | 1 | 1 | 1 | 0 | 0 | 0 | 0 | 0 | 0 | 0 | 0 |
| 0 | 0 | 0 | 0 | 0 | 0 | 0 | 0 | 1 | 1 | 1 | 1 | 0 | 0 | 0 | 0 |
| 0 | 0 | 0 | 0 | 0 | 0 | 0 | 0 | 0 | 0 | 0 | 0 | 1 | 1 | 1 | 1 |
| 1–1 | –1 | 1 | | 0 | 0 | 0 | 0 | 0 | 0 | 0 | 0 | 0 | 0 | 0 | 0 |
| 0 | 0 | 0 | 0 | 1–1 | –1 | 1 | | 0 | 0 | 0 | 0 | 0 | 0 | 0 | 0 |
| 0 | 0 | 0 | 0 | 0 | 0 | 0 | 0 | 1–1 | –1 | 1 | | 0 | 0 | 0 | 0 |
| 0 | 0 | 0 | 0 | 0 | 0 | 0 | 0 | 0 | 0 | 0 | 0 | 1–1 | –1 | 1 | |
| = | | | | | | | | | | | | | | | |
| 0 | 1–1 | 0 | | 0 | 0 | 0 | 0 | 0 | 0 | 0 | 0 | 0 | 0 | 0 | 0 |
| 0 | 0 | 0 | 0 | 0 | 1–1 | 0 | | 0 | 0 | 0 | 0 | 0 | 0 | 0 | 0 |
| 0 | 0 | 0 | 0 | 0 | 0 | 0 | 0 | 0 | 1–1 | 0 | | 0 | 0 | 0 | 0 |
| 0 | 0 | 0 | 0 | 0 | 0 | 0 | 0 | 0 | 0 | 0 | 0 | 0 | 1–1 | 0 | |
| 1 | 0 | 0–1 | | 0 | 0 | 0 | 0 | 0 | 0 | 0 | 0 | 0 | 0 | 0 | 0 |
| 0 | 0 | 0 | 0 | 1 | 0 | 0–1 | | 0 | 0 | 0 | 0 | 0 | 0 | 0 | 0 |
| 0 | 0 | 0 | 0 | 0 | 0 | 0 | 0 | 1 | 0 | 0–1 | | 0 | 0 | 0 | 0 |
| 0 | 0 | 0 | 0 | 0 | 0 | 0 | 0 | 0 | 0 | 0 | 0 | 1 | 0 | 0–1 | | a second computing means for computing the inner product between said fifth constant matrix data RQ and said sixth matrix data S provided by said first computing means to provide seventh matrix data T=RQ·S;

a third computing means for computing the inner product between said third constant matrix data V and said seventh matrix data T provided by said second computing means to provide eighth matrix data U=V·T;

a fourth computing means for executing the multiplication between said irrational numbers in said fourth matrix data W and predetermined element data in said eighth matrix data U provided by said third computing means and further performing addition and subtraction of said multiplied results and predetermined element data in said eighth matrix data U to provide ninth matrix data YY provided by said fourth computing means by two bits to provide said matrix data Y, defined as YY/4.

20. A discrete cosine transformation system according to claim 19, wherein said first computing means executes computations defined by the following equations to provide said sixth matrix data S, defined as follows:

$S_i = x_{4i} + x_{4i+1} + x_{4i+2} + x_{4i+3}$ $S_{i+4} = x_{4i} - x_{4i+1} - x_{4i+2} + x_{4i+3}$ $S_{i+8} = x_{4i+1} - x_{4i+2}$ $S_{i+12} = x_{4i} - x_{4i+3}$ wherein, i=0, 1, 2, or 3.

21. A discrete cosine transformation system according to claim 20, wherein said first computing means comprises:

a first addition circuit (11a) computing $x_{4i} + x_{4i+3}$ (i=0~3), a first subtraction circuit (12a) computing $s_{i+12} = x_{4i} - x_{4i+3}$ (i=0~3), a second addition circuit (11b) computing $x_{4i+1} + x_{4i+2}$ (i=0~3), a second subtraction circuit (12b) computing $s_{i+8} = x_{4i+1} - x_{4i+2}$ (i=0~3), a third addition circuit (11c) connected to said first and second addition circuits for adding the result of said first addition circuit and the result of said second addition circuit to provide $s_{i+4} = x_{4i} + x_{4i+1} + x_{4i+2} + x_{4i+3}$, and a third subtraction circuit (12c) connected to said first and second addition circuits for subtracting the result of said second addition circuit from the result of said first addition circuit to provide $s = x_{4i} - x_{4i+1} - x_{4i+2} + x_{4i+3}$.

22. A discrete cosine transformation system according to claim 20, wherein said second computing means executes computations defined by the following equations to provide said seventh matrix data T, defined as follows:

$t_i = s_{4i} + s_{4i+1} + s_{4i+2} + s_{4i+3}$ $t_{i+4} = s_{4i} - s_{4i+1} - s_{4i+2} + s_{4i+3}$ $t_{i+8} = s_{4i+1} - s_{4i+2}$ $t_{i+12} = s_{4i} - s_{4i+3}$ wherein, i=0, 1, 2, and 3.

23. A discrete cosine transformation system according to claim 22, wherein said first computing means comprises:

a first addition circuit (13a) computing $s_{4i} + s_{4i+3}$ (i=0~3), a first subtraction circuit (14a) computing $ts_{i+12} = s_{4i} - s_{4i+3}$ (i=0~3), a second addition circuit (13b) computing $s_{4i+1} + s_{4i+2}$ (i=0~3), a second subtraction circuit (14b) computing $t_{i+8} = s_{4i+1} - s_{4i+2}$ (i=0~3), a third addition circuit (13c) connected to said first and second addition circuits for adding the result of said first addition circuit and the result of said second addition circuit to provide $t_i = s_{4i} + s_{4i+1} + s_{4i+2} + s_{4i+3}$, and a third subtraction circuit (14c) connected to said first and second addition circuits for subtracting the result of said second addition circuit from the result of said first addition circuit to provide $t = s_{4i} - s_{4i+1} - s_{4i+2} + s_{4i+3}$.

24. A discrete cosine transformation system according to claim 22, wherein said third computing means executes computations defined by the following equations to provide said eighth matrix data U, defined as follows:

$$u_0 = t_0$$
$$u_1 = t_1$$
$$u_2 = t_2 + t_3$$
$$u_3 = t_2 - t_3$$
$$u_4 = t_4$$
$$u_5 = t_5$$
$$u_6 = t_6 + t_7$$
$$u_7 = t_6 - t_7$$
$$u_8 = t_8 + t_{12}$$
$$u_9 = t_8 - t_{12}$$
$$u_{10} = t_9 + t_{13}$$
$$u_{11} = t_9 - t_{13}$$
$$u_{12} = t_{10} + t_{15}$$
$$u_{13} = t_{11} - t_{14}$$
$$u_{14} = t_{10} - t_{11} - t_{14} - t_{15}$$
$$= (t_{10} - t_{15}) - (t_{11} + t_{14})$$
$$u_{15} = t_{10} + t_{11} + t_{14} - t_{15}$$
$$= (t_{10} - t_{15}) + (t_{11} + t_{14}).$$

25. A discrete cosine transformation system according to claim 24, wherein said third computing means comprises:

a first addition circuit (15a) computing $u_{12} = t_{10} + t_{15}$, a first subtraction circuit (16a) computing $u_{12} = t_{10} + t_{15}$, a second addition circuit (15b) computing $t_{11} + t_{14}$, a second subtraction circuit (16b) computing $u_{13} = t_{11} - t_{14}$, a third addition circuit (15c) connected to said second addition circuit and said first subtraction circuit for adding the result of said second addition circuit and the result of said first subtraction circuit to provide $u_{15} = (t_{10} - t_{15}) + (t_{11} + t_{14})$, and a third subtraction circuit (16c) connected to said first subtraction circuit and said second addition circuit for subtracting the result of said first subtraction circuit from the result of said second addition circuit to provide $u_{14} = (t_{10} - t_{15}) - (t_{11} + t_{14})$.

26. A discrete cosine transformation system according to claim 24, wherein said fourth computing means executes computations defined by the following equations to provide said ninth matrix data YY, defined as follows:

$$y_0 = u_0$$

$$y_1 = B \cdot u_2 - C \cdot u_3$$

$$y_2 = u_1$$

$$y_3 = -C \cdot u_2 - B \cdot u_3$$

$$y_4 = B \cdot u_8 - C \cdot u_9$$

$$y_5 = u_{12} - A \cdot u_{14}$$

$$y_6 = B \cdot u_{10} - C \cdot u_{15}$$

$$y_7 = u_{13} - A \cdot u_{15}$$

$$y_8 = u_4$$

$$y_9 = B \cdot u_6 - C \cdot u_7$$

$$y_{10} = u_5$$

$$y_{11} = -C \cdot u_6 - B \cdot u_7$$

$$y_{12} = -C \cdot u_8 - B \cdot u$$

$$y_{13} = -u_{13} - A \cdot u_{15}$$

$$y_{14} = -C \cdot u_{10} - B \cdot u_{11}$$

$$y_{15} = u_{12} + A \cdot u_{14}.$$

27. A discrete cosine transformation system according to claim 26, wherein said fourth computing means comprises:

a first multiplication, addition, and subtraction circuit (20), including a first holding circuit (50) for holding and outputting coefficients B and C, connected to a first multiplication circuit (30) for multiplying said coefficients B and C with said predetermined element data of said eighth matrix data (U), and a first accumulation circuit (40) connected to said multiplication circuit (30) for accumulating the results of said first multiplication circuit, performing the following computations:

$$y_1 = B \cdot u_2 - C \cdot u_3$$

$$y_3 = -C \cdot u_2 - B \cdot u_3$$

$$y_4 = B \cdot u_8 - C \cdot u_9$$

$$y_6 = B \cdot u_{10} - C \cdot u_{11}$$

$$y_9 = B \cdot u_6 - C \cdot u_7$$

$$y_{11} = -C \cdot u_6 - B \cdot u_7$$

$$y_{12} = -C \cdot u_8 - B \cdot u_9$$

$$y_{14} = -C \cdot u_{10} - B \cdot u_{11}$$

and a second multiplication, addition, and subtraction circuit (21), including a second holding circuit (51) for holding and outputting a coefficient A, connected to a second multiplication circuit (31) for multiplying said coefficient A with said predetermined element data of said eighth matrix data (U), and a second accumulation circuit (41) connected to said second multiplication circuit (31) for accumulating the results of said second multiplication circuit, performing the following computations:

$$y_5 = u_{12} - A \cdot u_{14}$$

$$y_7 = u_{13} - A \cdot u_{15}$$

$$y_{13} = -u_{13} - A \cdot u_{15}$$

$$y_{15} = u_{12} + A \cdot u_{14}.$$

28. A discrete cosine transformation system comprising:

input means for providing an input signal having information represented as binary data in a matrix form;

transforming means for transforming said input signal; and output means for providing an output signal representative of said transformed input signal;

wherein, said transforming means performs a two-dimensional 4-row×4 column discrete cosine transformation of binary data in a matrix form in accordance with the following formula:

$$Y = (¼) \, W \, V \, R \, Q \, R \, Q \, X$$

where, X denotes matrix data to be subjected to the discrete cosine transformation and is defined as follows:

$X = X_j$ (j = 0~15), or
$= X_{ij}$ (i = 0~3, j = 0~3)

$x_0 \; (= x_{00})$
$x_1 \; (= x_{01})$
$x_2 \; (= x_{02})$
$x_3 \; (= x_{03})$
$x_4 \; (= x_{10})$
$x_5 \; (= x_{11})$
$x_6 \; (= x_{12})$
$x_7 \; (= x_{13})$
$= x_8 \; (= x_{20})$
$x_9 \; (= x_{21})$
$x_{10} \; (= x_{22})$
$x_{11} \; (= x_{23})$
$x_{12} \; (= x_{30})$
$x_{13} \; (= x_{31})$
$x_{14} \; (= x_{32})$
$x_{15} \; (= x_{33})$

Y denotes matrix data obtained by the discrete cosine transformation and is defined as follows:

$Y = Y_j$ (j = 0~15), or
$= Y_{ij}$ (i = 0~3, j = 0~3)

$y_0 \; (= y_{00})$
$y_1 \; (= y_{01})$
$y_2 \; (= y_{02})$
$y_3 \; (= y_{03})$
$y_4 \; (= y_{10})$
$y_5 \; (= y_{11})$
$y_6 \; (= y_{12})$
$y_7 \; (= y_{13})$
$= y_8 \; (= y_{20})$
$y_9 \; (= y_{21})$
$y_{10} \; (= y_{22})$
$y_{11} \; (= y_{23})$
$y_{12} \; (= y_{30})$
$y_{13} \; (= y_{31})$
$y_{14} \; (= y_{32})$
$y_{15} \; (= y_{33})$

R denotes first 16×16 constant matrix data, defined as follows:

$R = R_{ij}$ (i = 0~15, j = 0~15)

```
1 0 0 0    0 0 0 0    0 0 0 0    0 0 0 0
0 0 0 0    1 0 0 0    0 0 0 0    0 0 0 0
0 0 0 0    0 0 0 0    1 0 0 0    0 0 0 0
0 0 0 0    0 0 0 0    0 0 0 0    1 0 0 0

0 1 0 0    0 0 0 0    0 0 0 0    0 0 0 0
0 0 0 0    0 1 0 0    0 0 0 0    0 0 0 0
0 0 0 0    0 0 0 0    0 1 0 0    0 0 0 0
0 0 0 0    0 0 0 0    0 0 0 0    0 1 0 0
=
0 0 1 0    0 0 0 0    0 0 0 0    0 0 0 0
0 0 0 0    0 0 1 0    0 0 0 0    0 0 0 0
0 0 0 0    0 0 0 0    0 0 1 0    0 0 0 0
0 0 0 0    0 0 0 0    0 0 0 0    0 0 1 0

0 0 0 1    0 0 0 0    0 0 0 0    0 0 0 0
0 0 0 0    0 0 0 1    0 0 0 0    0 0 0 0
0 0 0 0    0 0 0 0    0 0 0 1    0 0 0 0
0 0 0 0    0 0 0 0    0 0 0 0    0 0 0 1
```

Q denotes second 16×16 constant matrix data, defined as follows:

$Q = Q_{ij}$ (i = 0~15, j = 0~15)

```
1 1 1 1    0 0 0 0    0 0 0 0    0 0 0 0
1-1-1 1    0 0 0 0    0 0 0 0    0 0 0 0
0 1-1 0    0 0 0 0    0 0 0 0    0 0 0 0
1 0 0-1    0 0 0 0    0 0 0 0    0 0 0 0

0 0 0 0    1 1 1 1    0 0 0 0    0 0 0 0
0 0 0 0    1-1-1 1    0 0 0 0    0 0 0 0
0 0 0 0    0 1-1 0    0 0 0 0    0 0 0 0
0 0 0 0    1 0 0-1    0 0 0 0    0 0 0 0
=
0 0 0 0    0 0 0 0    1 1 1 1    0 0 0 0
0 0 0 0    0 0 0 0    1-1-1-1    0 0 0 0
0 0 0 0    0 0 0 0    0 1-1 0    0 0 0 0
0 0 0 0    0 0 0 0    1 0 0-1    0 0 0 0

0 0 0 0    0 0 0 0    0 0 0 0    1 1 1 1
0 0 0 0    0 0 0 0    0 0 0 0    1-1-1 1
0 0 0 0    0 0 0 0    0 0 0 0    0 1-1 0
0 0 0 0    0 0 0 0    0 0 0 0    1 0 0-1
```

V denotes third 16×16 constant matrix data, defined as follows:

$V = V_{ij}$ (i = 0~15, j = 0~15)

```
1 0 0 0    0 0 0 0    0 0 0 0    0 0 0 0
0 1 0 0    0 0 0 0    0 0 0 0    0 0 0 0
0 0 1 1    0 0 0 0    0 0 0 0    0 0 0 0
0 0 1-1    0 0 0 0    0 0 0 0    0 0 0 0

0 0 0 0    1 0 0 0    0 0 0 0    0 0 0 0
0 0 0 0    0 1 0 0    0 0 0 0    0 0 0 0
0 0 0 0    0 0 1 1    0 0 0 0    0 0 0 0
0 0 0 0    0 0 1-1    0 0 0 0    0 0 0 0
=
0 0 0 0    0 0 0 0    1 0 0 0    1 0 0 0
0 0 0 0    0 0 0 0    1 0 0 0   -1 0 0 0
0 0 0 0    0 0 0 0    0 1 0 0    0 1 0 0
0 0 0 0    0 0 0 0    0 1 0 0    0-1 0 0

0 0 0 0    0 0 0 0    0 0 1 0    0 0 0 1
0 0 0 0    0 0 0 0    0 0 0 1    0 0-1 0
0 0 0 0    0 0 0 0    0 0 1-1    0 0-1-1
0 0 0 0    0 0 0 0    0 0 1 1    0 0 1-1
``` and,

W denotes fourth 16×16 matrix data including irrational numbers A, B, C, −A, −B, and −C and is defined as follows:

$W = W_{ij}$ (i = 0~15, j = 0~15)

```
1 0 0 0      0 0 0 0    0 0 0 0    0 0 0 0
0 0 B-C      0 0 0 0    0 0 0 0    0 0 0 0
0 1 0 0      0 0 0 0    0 0 0 0    0 0 0 0
0 0-C-B      0 0 0 0    0 0 0 0    0 0 0 0

0 0 0 0      0 0 0 0    B-C 0 0    0 0 0 0
0 0 0 0      0 0 0 0    0 0 0 0    1 0-A 0
0 0 0 0      0 0 0 0    0 0 B-C    0 0 0 0
0 0 0 0      0 0 0 0    0 0 0 0    0 1 0-A
=
0 0 0 0      1 0 0 0    0 0 0 0    0 0 0 0
0 0 0 0      0 0 B-C    0 0 0 0    0 0 0 0
0 0 0 0      0 1 0 0    0 0 0 0    0 0 0 0
0 0 0 0      0 0-C-B    0 0 0 0    0 0 0 0

0 0 0 0      0 0 0 0   -C-B 0 0    0 0 0 0
0 0 0 0      0 0 0 0    0 0 0 0    0-1 0-A
0 0 0 0      0 0 0 0    0 0-C-B    0 0 0 0
0 0 0 0      0 0 0 0    0 0 0 0    1 0 A 0
``` where,
A=cos (π/4)
B=cos (π/8), and
c=cos (3 π/8);

said transforming means further comprising:

a sixth computing means for computing the inner product between 10th constant matrix data RQRQ and said matrix data X from said input means to provide 11th matrix data T=RQRQ·X:

| RQ = $RQ_{ij}$ (i = 0~15, j = 0~15) | | | |
|---|---|---|---|
| 1 1 1 1 | 0 0 0 0 | 0 0 0 0 | 0 0 0 0 |
| 0 0 0 0 | 1 1 1 1 | 0 0 0 0 | 0 0 0 0 |
| 0 0 0 0 | 0 0 0 0 | 1 1 1 1 | 0 0 0 0 |
| 0 0 0 0 | 0 0 0 0 | 0 0 0 0 | 1 1 1 1 |
| 1 –1 –1 1 | 0 0 0 0 | 0 0 0 0 | 0 0 0 0 |
| 0 0 0 0 | 1 –1 –1 1 | 0 0 0 0 | 0 0 0 0 |
| 0 0 0 0 | 0 0 0 0 | 1 –1 –1 1 | 0 0 0 0 |
| 0 0 0 0 | 0 0 0 0 | 0 0 0 0 | 1 –1 –1 1 |
| 0 1 –1 0 | 0 0 0 0 | 0 0 0 0 | 0 0 0 0 |
| 0 0 0 0 | 0 1 –1 0 | 0 0 0 0 | 0 0 0 0 |
| 0 0 0 0 | 0 0 0 0 | 0 1 –1 0 | 0 0 0 0 |
| 0 0 0 0 | 0 0 0 0 | 0 0 0 0 | 0 1 –1 0 |
| 1 0 0 –1 | 0 0 0 0 | 0 0 0 0 | 0 0 0 0 |
| 0 0 0 0 | 1 0 0 –1 | 0 0 0 0 | 0 0 0 0 |
| 0 0 0 0 | 0 0 0 0 | 1 0 0 –1 | 0 0 0 0 |
| 0 0 0 0 | 0 0 0 0 | 0 0 0 0 | 1 0 0 –1 |

| RQRQ = $RQRQ_{ij}$ (i = 0~15, j = 0~15) | | | |
|---|---|---|---|
| 1 1 1 1 | 0 0 0 0 | 0 0 0 0 | 0 0 0 0 |
| 0 0 0 0 | 1 1 1 1 | 0 0 0 0 | 0 0 0 0 |
| 0 0 0 0 | 0 0 0 0 | 1 1 1 1 | 0 0 0 0 |
| 0 0 0 0 | 0 0 0 0 | 0 0 0 0 | 1 1 1 1 |
| 1 –1 –1 1 | 0 0 0 0 | 0 0 0 0 | 0 0 0 0 |
| 0 0 0 0 | 1 –1 –1 1 | 0 0 0 0 | 0 0 0 0 |
| 0 0 0 0 | 0 0 0 0 | 1 –1 –1 1 | 0 0 0 0 |
| 0 0 0 0 | 0 0 0 0 | 0 0 0 0 | 1 –1 –1 1 |
| 0 1 –1 0 | 0 0 0 0 | 0 0 0 0 | 0 0 0 0 |
| 0 0 0 0 | 0 1 –1 0 | 0 0 0 0 | 0 0 0 0 |
| 0 0 0 0 | 0 0 0 0 | 0 1 –1 0 | 0 0 0 0 |
| 0 0 0 0 | 0 0 0 0 | 0 0 0 0 | 0 1 –1 0 |
| 1 0 0 –1 | 0 0 0 0 | 0 0 0 0 | 0 0 0 0 |
| 0 0 0 0 | 1 0 0 –1 | 0 0 0 0 | 0 0 0 0 |
| 0 0 0 0 | 0 0 0 0 | 1 0 0 –1 | 0 0 0 0 |
| 0 0 0 0 | 0 0 0 0 | 0 0 0 0 | 1 0 0 –1 | a seventh computing means for computing the inner product between said third constant matrix data V and said 11th matrix data T provided by said sixth computing means to provide 12th matrix data U=V·T;

an eighth computing means for executing the multiplication between said irrational numbers in said fourth matrix data W and predetermined element data in said 12th matrix data U provided by said seventh computing means and further performing addition and subtraction of said multiplied results and predetermined element data in said 12th matrix data U to provide ninth matrix data YY=W·U; and a ninth computing means for shifting said ninth matrix data YY provided by said eighth computing means by two bits to provide said matrix data Y, defined as YY/4.

29. A discrete cosine transformation system according to claim 28, wherein said sixth computing means executes computations defined by the following equations to provide said 11th matrix data, defined as follows:

$t_i = s_{4i} + s_{4i+1} + s_{4i+2} + s_{4i+3}$ $t_{i+4} = s_{4i} - s_{4i+1} - s_{4i+2} + s_{4i+3}$ $t_{i+8} = s_{4i+1} - s_{4i+2}$ $t_{i+12} = s_{4i} - s_{4i+3}$ wherein, i=0, 1, 2, or 3 where, $s_i = X_{4i} + X_{4i+1} + X_{4i+2} + X_{4i+3}$ $s_{i+4} = X_{4i} - X_{4i+1} - X_{4i+2} + X_{4i+3}$ $s_{i+8} = X_{4i+1} - X_{4i+2}$ $s_{i+12} = X_{4i} - X_{4i+3}$ wherein, i=0, 1, 2, or 3.

30. A discrete cosine transformation system according to claim 29, wherein said sixth computing means comprises:

a first addition circuit (13a) computing $s_{4i} + s_{4i+3}$ (i=0~3), a first subtraction circuit (14a) computing $ts_{i+12} = s_{4i} - s_{4i+3}$ (i=0~3), a second addition circuit (13b) computing $s_{4i+1} + s_{4i+2}$ (i=0~3), a second subtraction circuit (14b) computing $t_{i+8} = s_{4i+1} - s_{4i+2}$ (i=0~3), a third addition circuit (13c) connected to said first and second addition circuits for adding the result of said first addition circuit and the result of said second addition circuit to provide $t = s_{4i} + s_{4i+1} + s_{4i+2} + s_{4i+3}$, and a third subtraction circuit (14c) connected to said first and second addition circuits for subtracting the result of said second addition circuit from the result of said first addition circuit to provide $t_{i+4} = s_{4i} - s_{4i+1} - s_{4i+2} + s_{4i+3}$.

31. A discrete cosine transformation system according to claim 29, wherein said seventh computing means executes computations defined by the following equations to provide said 12th matrix data U, defined as follows:

$u_0 = t_0$
$u_1 = t_1$
$u_2 = t_2 + t_3$
$u_3 = t_2 - t_3$
$u_4 = t_4$
$u_5 = t_5$
$u_6 = t_6 + t_7$
$u_7 = t_6 - t_7$
$u_8 = t_8 + t_{12}$
$u_9 = t_8 - t_{12}$
$u_{10} = t_9 + t_{13}$
$u_{11} = t_9 - t_{13}$
$u_{12} = t_{10} + t_{15}$
$u_{13} = t_{11} - t_{14}$
$u_{14} = t_{10} - t_{11} - t_{14} - t_{15}$
$\phantom{u_{14}} = (t_{10} - t_{15}) - (t_{11} + t_{14})$
$u_{15} = t_{10} + t_{11} + t_{14} - t_{15}$
$\phantom{u_{15}} = (t_{10} + t_{15}) + (t_{11} + t_{14})$.

32. A discrete cosine transformation system according to claim 31, wherein said seventh computing means comprises:

a first addition circuit (15a) computing $u_{12} = t_{10} + t_{15}$, a first subtraction circuit (16a) computing $u_{12} = t_{10} + t_{15}$, a second addition circuit (15b) computing $t_{11} + t_{14}$, a second subtraction circuit (16b) computing $u_{13} = t_{11} - t_{14}$, a third addition circuit (15c) connected to said second addition circuit and said first subtraction circuit for adding the result of said second addition circuit and the result of said first subtraction circuit to provide $u_{15} = (t_{10} - t_{15}) + (t_{11} + t_{14})$, and a third subtraction circuit (16c) connected to said first subtraction circuit and said second addition circuit for subtracting the result of said first subtraction circuit from the result of said second addition circuit to provide $u_{14}=(t_{10}-t_{15})-(t_{11}+t_{14})$.

33. A discrete cosine transformation system according to claim 31, wherein said eighth computing means executes computations defined by the following equations to provide said ninth matrix data YY, defined as follows:

$$y_0=u_0$$

$$y_1=B \cdot u_2-C \cdot u_3$$

$$y_2=u_1$$

$$y_3=-C \cdot u_2 \cdot B \cdot u_3$$

$$y_4=B \cdot u_8-C \cdot u_9$$

$$y_5=u_{12}-A \cdot u_{14}$$

$$y_6=B \cdot u_{10}-C \cdot u_{11}$$

$$y_7=u_{13}-A \cdot u_{15}$$

$$y_8=u_4$$

$$y_9=B \cdot u_6-C \cdot u_7$$

$$y_{10}=u_5$$

$$y_{11}=-C \cdot u_6-B \cdot u_7$$

$$y_{12}=-C \cdot u_8-B \cdot u$$

$$y_{13}=-u_{13}-A \cdot u_{15}$$

$$y_{14}=-C \cdot u_{10}-B \cdot u_{11}$$

$$y_{15}=u_{12}+A \cdot u_{14}.$$

34. A discrete cosine transformation system according to claim 33, wherein said eighth computing means comprises:

a first multiplication, addition, and subtraction circuit (20), including a first holding circuit (50) for holding and outputting coefficients B and C, connected to a first multiplication circuit (30) for multiplying said coefficients B and C with said predetermined element data of said eighth matrix data (U), and a first accumulation circuit (40) connected to said multiplication circuit (30) for accumulating the results of said first multiplication circuit, performing the following computations:

$$y_1=B \cdot u_2-C \cdot u_3$$

$$y_3=-C \cdot u_2-B \cdot u_3$$

$$y_4=B \cdot u_8-C \cdot u_9$$

$$y_6=B \cdot u_{10}-C \cdot u_{11}$$

$$y_9=B \cdot u_6-C \cdot u_7$$

$$y_{11}=-C \cdot u_6-B \cdot u_7$$

$$y_{12}=-C \cdot u_8-B \cdot u_9$$

$$y_{14}=-C \cdot u_{10}-B \cdot u_{11}$$

and a second multiplication, addition, and subtraction circuit (21), including a second holding circuit (51) for holding and outputting a coefficient A, connected to a second multiplication circuit (31) for multiplying said coefficient A with said predetermined element data of said eighth matrix data (U), and a second accumulation circuit (41) connected to said second multiplication circuit (31) for accumulating the results of said second multiplication circuit, performing the following computations:

$$y_5=u_{12}-A \cdot u_{14}$$

$$y_7=u_{13}-A \cdot u_{15}$$

$$y_{13}=-u_{13}-A \cdot u_{15}$$

$$y_{15}=u_{12}+A \cdot u_{14}.$$

35. A discrete cosine transformation system comprising:

input means for providing an input signal having information represented as binary data in a matrix form;

transforming means for transforming said input signal; and output means for providing an output signal representative of said transformed input signal;

wherein, said transforming means performs a two-dimensional 4-row×4-column discrete cosine transformation in accordance with the following formula:

$$Y=(¼) \: W \: V \: R \: Q \: R \: Q \: X$$

where, X denotes 16 elements of matrix data to be subjected to discrete cosine transformation and is defined as follows:

$$\begin{aligned} X &= X_j \, (j=0\text{--}15), \text{ or} \\ &= X_{ij} \, (i=0\text{--}3, j=0\text{--}3) \\ &= x_0 \, (=x_{00}) \\ & \quad x_1 \, (=x_{01}) \\ & \quad x_2 \, (=x_{02}) \\ & \quad x_3 \, (=x_{03}) \\ & \quad x_4 \, (=x_{10}) \\ & \quad x_5 \, (=x_{11}) \\ & \quad x_6 \, (=x_{12}) \\ & \quad x_7 \, (=x_{13}) \\ & \quad x_8 \, (=x_{20}) \\ & \quad x_9 \, (=x_{21}) \\ & \quad x_{10} \, (=x_{22}) \\ & \quad x_{11} \, (=x_{23}) \\ & \quad x_{12} \, (=x_{30}) \\ & \quad x_{13} \, (=x_{31}) \\ & \quad x_{14} \, (=x_{32}) \\ & \quad x_{15} \, (=x_{33}) \end{aligned}$$

Y denotes matrix data obtained by the discrete cosine transformation and is defined as follows:

$Y = Y_j \ (j = 0\text{~}15)$, or $\phantom{Y} = Y_{ij} \ (i = 0\text{~}3, j = 0\text{~}3)$ $\phantom{Y} = y_0 \ (= y_{00})$ $\phantom{Y = } y_1 \ (= y_{01})$ $\phantom{Y = } y_2 \ (= y_{02})$ $\phantom{Y = } y_3 \ (= y_{03})$ $\phantom{Y = } y_4 \ (= y_{10})$ $\phantom{Y = } y_5 \ (= y_{11})$ $\phantom{Y = } y_6 \ (= y_{12})$ $\phantom{Y = } y_7 \ (= y_{13})$ $\phantom{Y = } y_8 \ (= y_{20})$ $\phantom{Y = } y_9 \ (= y_{21})$ $\phantom{Y = } y_{10} \ (= y_{22})$ $\phantom{Y = } y_{11} \ (= y_{23})$ $\phantom{Y = } y_{12} \ (= y_{30})$ $\phantom{Y = } y_{13} \ (= y_{31})$ $\phantom{Y = } y_{14} \ (= y_{32})$ $\phantom{Y = } y_{15} \ (= y_{33})$ R denotes first 16×16 constant matrix data, defined as follows:

```
R = R_ij (i = 1~15, j = 1~15)
    1 0 0 0    0 0 0 0    0 0 0 0    0 0 0 0
    0 0 0 0    1 0 0 0    0 0 0 0    0 0 0 0
    0 0 0 0    0 0 0 0    1 0 0 0    0 0 0 0
    0 0 0 0    0 0 0 0    0 0 0 0    1 0 0 0

0 1 0 0    0 0 0 0    0 0 0 0    0 0 0 0
    0 0 0 0    0 1 0 0    0 0 0 0    0 0 0 0
    0 0 0 0    0 0 0 0    0 1 0 0    0 0 0 0
    0 0 0 0    0 0 0 0    0 0 0 0    0 1 0 0
  =
    0 0 1 0    0 0 0 0    0 0 0 0    0 0 0 0
    0 0 0 0    0 0 1 0    0 0 0 0    0 0 0 0
    0 0 0 0    0 0 0 0    0 0 1 0    0 0 0 0
    0 0 0 0    0 0 0 0    0 0 0 0    0 0 1 0

0 0 0 1    0 0 0 0    0 0 0 0    0 0 0 0
    0 0 0 0    0 0 0 1    0 0 0 0    0 0 0 0
    0 0 0 0    0 0 0 0    0 0 0 1    0 0 0 0
    0 0 0 0    0 0 0 0    0 0 0 0    0 0 0 1
```

Q denotes second 16×16 constant matrix data, defined as follows:

```
Q = Q_ij (i = 0~15, j = 1~15)
    1 1 1 1    0 0 0 0    0 0 0 0    0 0 0 0
    1-1-1 1    0 0 0 0    0 0 0 0    0 0 0 0
    0 1-1 0    0 0 0 0    0 0 0 0    0 0 0 0
    1 0 0-1    0 0 0 0    0 0 0 0    0 0 0 0

0 0 0 0    1 1 1 1    0 0 0 0    0 0 0 0
    0 0 0 0    0-1-1 1    0 0 0 0    0 0 0 0
    0 0 0 0    0 1-1 0    0 0 0 0    0 0 0 0
    0 0 0 0    1 0 0-1    0 0 0 0    0 0 0 0
  =
    0 0 0 0    0 0 0 0    1 1 1 1    0 0 0 0
    0 0 0 0    0 0 0 0    1-1-1 1    0 0 0 0
    0 0 0 0    0 0 0 0    0 1-1 0    0 0 0 0
    0 0 0 0    0 0 0 0    1 0 0-1    0 0 0 0

0 0 0 0    0 0 0 0    0 0 0 0    1 1 1 1
    0 0 0 0    0 0 0 0    0 0 0 0    1-1-1 1
    0 0 0 0    0 0 0 0    0 0 0 0    0 1-1 0
    0 0 0 0    0 0 0 0    0 0 0 0    1 0 0-1
```

V denotes third 16×16 constant matrix data, defined as follows:

```
V = V_ij (i = 0~15, j = 0~15)
    1 0 0 0    0 0 0 0    0 0 0 0    0 0 0 0
    0 1 0 0    0 0 0 0    0 0 0 0    0 0 0 0
    0 0-1 1    0 0 0 0    0 0 0 0    0 0 0 0
    0 0 1-1    0 0 0 0    0 0 0 0    0 0 0 0

0 0 0 0    1 0 0 0    0 0 0 0    0 0 0 0
    0 0 0 0    0 1 0 0    0 0 0 0    0 0 0 0
    0 0 0 0    0 0 1 1    0 0 0 0    0 0 0 0
    0 0 0 0    0 0 1-1    0 0 0 0    0 0 0 0
  =
    0 0 0 0    0 0 0 0    1 0 0 0    1 0 0 0
    0 0 0 0    0 0 0 0    1 0 0 0   -10 0 0
    0 0 0 0    0 0 0 0    0 1 0 0    0 1 0 0
    0 0 0 0    0 0 0 0    0 1 0 0    0-1 0 0

0 0 0 0    0 0 0 0    0 0 1 0    0 0 0 1
    0 0 0 0    0 0 0 0    0 0 0 1    0 0-1 0
    0 0 0 0    0 0 0 0    0 0 1-1    0 0-1 1
    0 0 0 0    0 0 0 0    0 0 1 1    0 0 1 1
```

W denotes fourth 16×16 matrix data including irrational numbers A, B, C, −A, −B, and −C and defined as follows:

```
W = W_ij (i = 0~15, j = 0~15)
    1 0 0 0    0 0 0 0    0 0 0 0    0 0 0 0
    0 0 B-C    0 0 0 0    0 0 0 0    0 0 0 0
    0 1 0 0    0 0 0 0    0 0 0 0    0 0 0 0
    0 0-C-B    0 0 0 0    0 0 0 0    0 0 0 0

0 0 0 0    0 0 0 0    B-C 0 0    0 0 0 0
    0 0 0 0    0 0 0 0    0 0 0 0    1 0-A 0
    0 0 0 0    0 0 0 0    0 0 B-C    0 0 0 0
    0 0 0 0    0 0 0-0    0 0 0 0    0 1 0-A
  =
    0 0 0 0    1 0 0 0    0 0 0 0    0 0 0 0
    0 0 0 0    0 0 B-C    0 0 0 0    0 0 0 0
    0 0 0 0    0 1 0 0    0 0 0 0    0 0 0 0
    0 0 0 0    0 0-C-B    0 0 0 0    0 0 0 0

0 0 0 0    0 0 0 0   -C-B 0 0    0 0 0 0
    0 0 0 0    0 0 0 0    0 0 0 0    0-1 0-A
    0 0 0 0    0 0 0 0    0 0-C-B    0 0 0 0
    0 0 0 0    0 0 0 0    0 0 0 0    1 0 A 0
``` where,
A=cos (π/4)
B=cos (π/8), and
C=cos (3 π/8), wherein said transforming means comprises:
an input register (1) for receiving said input signal;
a first addition-subtraction circuit (2);
a first intermediate value holding circuit (3);
a second addition-subtraction circuit (4);
a second intermediate value holding circuit (5); and
a multiplication, addition, and subtraction circuit (6),
said circuits being connected to one another as a pipeline structure, said first addition-subtraction circuit being formed as a first stage circuit of said pipeline structure, said second addition-subtraction circuit being formed as a second stage circuit, and said multiplication, addition, and subtraction circuit being formed as a third stage circuit, wherein said input register serially receives said 16 elements of data during 16 unit times, said first addition-subtraction circuit computing the following equations during 1 to 12 unit times, and $$s_i = x_{4i} + x_{4i+1} + x_{4i+2} + x_{4i+3}$$

$$s_{i+4} = x_{4i} - x_{4i+1} - x_{4i+2} + x_{4i+3}$$

$$s_{i+8} = x_{4i+1} - x_{4i+2}$$

$$s_{i+12} = x_{4i} - x_{4i+3}$$

wherein, i=0, 1, 2, or 3 further computing the following equations during 13 to 16 unit times, $$t_i = t_0 = s_{4i} + s_{4i+1} + s_{4i+2} + s_{4i+3}$$

$$t_{i+4} = t_4 = s_{4i} - s_{4i+1} - s_{4i+2} + s_{4i+3}$$

$$t_{i+8} = t_8 = s_{4i+1} - s_{4i+2}$$

$$t_{i+12} = t_{12} = s_{4i} - s_{4i+3}$$

wherein, i=0 said first intermediate value holding circuit holding the results of said first addition-subtraction circuit:
$s_{00}$–$s_{15}$, and, $t_0$, $t_4$, $t_8$, and $t_{12}$, said second addition-subtraction circuit computing the following equations during 1 to 12 unit times, and $$t_i = s_{4i} + s_{4i+1} + s_{4i+2} + s_{4i+3}$$

$$t_{i+4} = s_{4i} - s_{4i+1} - s_{4i+2} + s_{4i+3}$$

$$t_{i+8} = s_{4i+1} - s_{4i+2}$$

$$t_{i+12} = s_{4i} - s_{4i+3}$$

wherein, i=1, 2, and 3 further computing the following equations during 13 to 16 unit times, $$u_2 = t_2 + t_3, \text{ and } u_3 = t_2 - t_3$$

$$u_6 = t_6 + t_7, \text{ and } u_7 = t_6 - t_7$$

$$u_8 = t_8 + t_{12}, \text{ and } u_9 = t_8 - t_{12}$$

$$u_{10} = t_9 + t_{13}, \text{ and } u_{11} = t_9 - t_{13}$$

$$u_{12} = t_{10} + t_{15}, \text{ and } u_{13} = t_{11} - t_{14}$$

$$u_{14} = (t_{10} - t_{15}) - (t_{11} + t_{14}), \text{ and } u_{15} = (t_{10} - t_{15}) + (t_{11} + t_{14})$$

said second intermediate value holding circuit holding the data held in said first intermediate value holding circuit: $u_0 = t_0$, $u_1 = t_1$, $u_4 = t_4$, and $u_5 = t_5$, and the results of said second addition-subtraction circuit: $u_2$, $u_3$ and $u_6$ to $u_{15}$, and said multiplication, addition, and subtraction circuit computing the equations during 1 to 12 unit times, $$y_1 = B \cdot u_2 - C \cdot u_3$$

$$y_3 = -C \cdot u_2 - B \cdot u_3$$

$$y_4 = B \cdot u_8 - C \cdot u_9$$

$$y_5 = u_{12} - A \cdot u_{14}$$

$$y_6 = B \cdot u_{10} - C \cdot u_{11}$$

$$y_7 = u_{13} - A \cdot u_{15}$$

$$y_9 = B \cdot u_6 - C \cdot u_7$$

$$y_{11} = -C \cdot u_6 - B \cdot u_7$$

$$y_{13} = -u_{13} - A \cdot u_{15}$$

$$y_{14} = -C \cdot u_{10} - B \cdot u_{11}$$

$$y_{15} = u_{12} + A \cdot u_{14}$$

to thereby provide $y_0 = u_0$, $y_1$, $y_2 = u_1$, $y_3$ to $y_7$, $y_8 = u_4$, $y_9$; $y_{10} = u_5$, and $y_{11}$ to $y_{15}$.

36. The discrete cosine transformation system of claim 35, wherein said input signal comprises an image signal having information in a real domain;

said transforming means transforms said image signal from a real domain to a frequency domain; and said output signal comprises information in said frequency domain as representative of said transformed image signal in said real domain.

37. A discrete cosine inverse transformation system, comprising:

input means for providing an input signal having information represented as binary data in a matrix form;

transforming means for transforming said input signal; and output means for providing an output signal representative of said transformed input signal;

wherein, said transforming means performs a two-dimensional 4-row×4-column discrete cosine inverse transformation of binary data Y' in a matrix form in accordance with the following formula:

$$X' = (\tfrac{1}{4})\, Q^t\, R\, Q^t\, R\, V^t\, W^t\, Y'$$

where, Y' denotes matrix data to be subjected to a discrete cosine inverse transformation and is defined as follows:

$$
\begin{aligned}
Y &= Y_j \ (j = 0\text{–}15), \text{ or} \\
  &= Y'_{ij} \ (i = 0\text{–}3, j = 0\text{–}3) \\
y'_0 &\ (= y'_{00}) \\
y'_1 &\ (= y'_{01}) \\
y'_2 &\ (= y'_{02}) \\
y'_3 &\ (= y'_{03}) \\
y'_4 &\ (= y'_{10}) \\
y'_5 &\ (= y'_{11}) \\
y'_6 &\ (= y'_{12}) \\
y'_7 &\ (= y'_{13}) \\
= y'_8 &\ (= y'_{20}) \\
y'_9 &\ (= y'_{21}) \\
y'_{10} &\ (= y'_{22}) \\
y'_{11} &\ (= y'_{23}) \\
y'_{12} &\ (= y'_{30}) \\
y'_{13} &\ (= y'_{31}) \\
y'_{14} &\ (= y'_{32}) \\
y'_{15} &\ (= y'_{33})
\end{aligned}
$$

X' denotes matrix data obtained by the discrete cosine inverse transformation and is defined as follows:

$$
\begin{aligned}
X' &= X'_j \ (j = 0\text{–}15), \text{ or} \\
   &= X'_{ij} \ (i = 0\text{–}3, j = 0\text{–}3) \\
x'_0 &\ (= x'_{00}) \\
x'_1 &\ (= x'_{01}) \\
x'_2 &\ (= x'_{02}) \\
x'_3 &\ (= x'_{03}) \\
x'_4 &\ (= x'_{10})
\end{aligned}
$$

$$x'_5 (= x'_{11})$$
$$x'_6 (= x'_{12})$$
$$x'_7 (= x'_{13})$$
$$= x'_8 (= x'_{20})$$
$$x'_9 (= x'_{21})$$
$$x'_{10} (= x'_{22})$$
$$x'_{11} (= x'_{23})$$
$$x'_{12} (= x'_{30})$$
$$x'_{13} (= x'_{31})$$
$$x'_{14} (= x'_{32})$$
$$x'_{15} (= x'_{33})$$

$W^t$ denotes a first 16×16 transposition matrix data including irrational numbers A, B, C, –A, –B, and –C defined as follows:

$W^t = W^t_{ij}$ (i = 0~15, j = 0~15)

| 1 0 0 0 | 0 0 0 0 | 0 0 0 0 | 0 0 0 0 |
|---|---|---|---|
| 0 0 1 0 | 0 0 0 0 | 0 0 0 0 | 0 0 0 0 |
| 0 B 0–C | 0 0 0 0 | 0 0 0 0 | 0 0 0 0 |
| 0–C 0–B | 0 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 1 0 | 0 0 0 0 |
| 0 0 0 0 | 0 0 0 0 | 0 B 0–C | 0 0 0 0 |
| 0 0 0 0 | 0 0 0 0 | 0–C 0–B | 0 0 0 0 |
| 0 0 0 0 | B 0 0 0 | 0 0 0 0 | –C 0 0 0 |
| 0 0 0 0 | –C 0 0 0 | 0 0 0 0 | –B 0 0 0 |
| 0 0 0 0 | 0 0 B 0 | 0 0 0 0 | 0 0–C 0 |
| 0 0 0 0 | 0 0–C–B | 0 0 0 0 | 0 0 B 0 |
| 0 0 0 0 | 0 1 0 0 | 0 0 0 0 | 0 0 0 1 |
| 0 0 0 0 | 0 0 0 1 | 0 0 0 0 | 0–1 0 0 |
| 0 0 0 0 | 0–A 0 0 | 0 0 0 0 | 0 0 0 A |
| 0 0 0 0 | 0 0 0–A | 0 0 0 0 | 0–A 0 0 |

$V^t$ denotes a second 16×16 transposition constant matrix data, defined as follows:

$V^t = V^t_{ij}$ (i = 0~15, j = 15)

| 1 0 0 0 | 0 0 0 0 | 0 0 0 0 | 0 0 0 0 |
|---|---|---|---|
| 0 1 0 0 | 0 0 0 0 | 0 0 0 0 | 0 0 0 0 |
| 0 0 1 1 | 0 0 0 0 | 0 0 0 0 | 0 0 0 0 |
| 0 0 1–1 | 0 0 0 0 | 0 0 0 0 | 0 0 0 0 |
| 0 0 0 0 | 1 0 0 0 | 0 0 0 0 | 0 0 0 0 |
| 0 0 0 0 | 0 1 0 0 | 0 0 0 0 | 0 0 0 0 |
| 0 0 0 0 | 0 0 1 1 | 0 0 0 0 | 0 0 0 0 |
| 0 0 0 0 | 0 0 1–1 | 0 0 0 0 | 0 0 0 0 |
| 0 0 0 0 | 0 0 0 0 | 1 1 0 0 | 0 0 0 0 |
| 0 0 0 0 | 0 0 0 0 | 0 0 1 1 | 0 0 0 0 |
| 0 0 0 0 | 0 0 0 0 | 0 0 0 0 | 1 0 1 1 |
| 0 0 0 0 | 0 0 0 0 | 0 0 0 0 | 0 1–1 1 |
| 0 0 0 0 | 1–1 0 0 | 0 0 0 0 | 0 0 0 0 |
| 0 0 0 0 | 0 0 0 0 | 0 0 0–1 | 0 0 0 0 |
| 0 0 0 0 | 0 0 0 0 | 0 0 0 0 | 0–1–1 1 |
| 0 0 0 0 | 0 0 0 0 | 0 0 0 0 | 1 0–1–1 |

R denotes a third 16×16 constant matrix data, defined as follows:

$R = R_{ij}$ (i = 0~15, j = 0~15)

| 1 0 0 0 | 0 0 0 0 | 0 0 0 0 | 0 0 0 0 |
|---|---|---|---|
| 0 0 0 0 | 1 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 0 0 | 1 0 0 0 |
| 0 1 0 0 | 0 0 0 0 | 0 0 0 0 | 0 0 0 0 |

| 0 0 0 0 | 0 1 0 0 | 0 0 0 0 | 0 0 0 0 |
| 0 0 0 0 | 0 0 0 0 | 0 1 0 0 | 0 0 0 0 |
| 0 0 0 0 | 0 0 0 0 | 0 0 0 0 | 0 1 0 0 |
| 0 0 1 0 | 0 0 0 0 | 0 0 0 0 | 0 0 0 0 |
| 0 0 0 0 | 0 0 1 0 | 0 0 0 0 | 0 0 0 0 |
| 0 0 0 0 | 0 0 0 0 | 0 0 1 0 | 0 0 0 0 |
| 0 0 0 0 | 0 0 0 0 | 0 0 0 0 | 0 0 1 0 |
| 0 0 0 1 | 0 0 0 0 | 0 0 0 0 | 0 0 0 0 |
| 0 0 0 0 | 0 0 0 1 | 0 0 0 0 | 0 0 0 0 |
| 0 0 0 0 | 0 0 0 0 | 0 0 0 1 | 0 0 0 0 |
| 0 0 0 0 | 0 0 0 0 | 0 0 0 0 | 0 0 0 1 | and, $Q^t$ denotes a fourth 16×16 transposition constant matrix data, defined as follows:

$Q^t = Q^t_{ij}$ (i = 0~15, j = 0~15)

| 1 1 0 1 | 0 0 0 0 | 0 0 0 0 | 0 0 0 0 |
|---|---|---|---|
| 1–1 1 0 | 0 0 0 0 | 0 0 0 0 | 0 0 0 0 |
| 1–1–1 0 | 0 0 0 0 | 0 0 0 0 | 0 0 0 0 |
| 1 1 0–1 | 0 0 0 0 | 0 0 0 0 | 0 0 0 0 |
| 0 0 0 0 | 1 1 0 1 | 0 0 0 | 0 0 0 0 |
| 0 0 0 0 | 1–1 1 0 | 0 0 0 0 | 0 0 0 0 |
| 0 0 0 0 | 1–1–1 0 | 0 0 0 0 | 0 0 0 0 |
| 0 0 0 0 | 1 1 0–1 | 0 0 0 0 | 0 0 0 0 |
| 0 0 0 0 | 0 0 0 0 | 1 1 0 1 | 0 0 0 0 |
| 0 0 0 0 | 0 0 0 0 | 1–1 1 0 | 0 0 0 0 |
| 0 0 0 0 | 0 0 0 0 | 1–1–1 0 | 0 0 0 0 |
| 0 0 0 0 | 0 0 0 0 | 1 1 0–1 | 0 0 0 0 |
| 0 0 0 0 | 0 0 0 0 | 0 0 0 0 | 1 1 0 1 |
| 0 0 0 0 | 0 0 0 0 | 0 0 0 0 | 1–1 1 0 |
| 0 0 0 0 | 0 0 0 0 | 0 0 0 0 | 0–1–1 0 |
| 0 0 0 0 | 0 0 0 0 | 0 0 0 0 | 1 1 0–1 | said transforming means further comprising:

a 10th computing means for performing the multiplication between said irrational numbers in said first transposition matrix data $W^t$ and predetermined element data in said matrix data Y' provided by said input means and further performing addition and subtraction between said multiplied results and predetermined element data in said matrix data Y' to provide sixth matrix data U'=$W^t$·Y'' an 11th computing means for computing the inner product between said second transposition constant matrix data $V^t$ and said sixth matrix data U' provided by said 10th computing means to provide seventh matrix data T'=$V^t$·U';

a 12th computing means for computing the inner product between the following fifth constant matrix data $Q^tR$ and said seventh matrix data T' provided by said 11th computing means to provide eighth matrix data S'=$Q^tR$·T';

$Q^tR = Q^tR_{ij}$ (i = 0~15, j = 0~15)

| 1 0 0 0 | 1 0 0 0 | 0 0 0 0 | 1 0 0 0 |
|---|---|---|---|
| 1 0 0 0 | –10 0 0 | 1 0 0 0 | 0 0 0 0 |
| 1 0 0 0 | –10 0 0 | –10 0 0 | 0 0 0 0 |
| 1 0 0 0 | 1 0 0 0 | 0 0 0 0 | –10 0 0 |
| 0 1 0 0 | 0 1 0 0 | 0 0 0 0 | 0 1 0 0 |
| 0 1 0 0 | 0–1 0 0 | 0 1 0 0 | 0 0 0 0 |
| 0 1 0 0 | 0–1 0 0 | 0–1 0 0 | 0 0 0 0 |
| 0 1 0 0 | 0 1 0 0 | 0 0 0 0 | 0–1 0 |

-continued

```
= 0 0 1 0    0 0 1 0    0 0 0 0    0 0 1 0
  0 0 1 0    0 0-1 0    0 0 1 0    0 0 0 0
  0 0 1 0    0 0-1 0    0 0-1 0    0 0 0 0
  0 0 1 0    0 0 1 0    0 0 0 0    0 0-1 0

0 0 0 1    0 0 0 1    0 0 0 0    0 0 0 1
  0 0 0 1    0 0 0-1    0 0 0 1    0 0 0 0
  0 0 0 1    0 0 0-1    0 0 0-1    0 0 0 0
  0 0 0 1    0 0 0 1    0 0 0 0    0 0 0-1
``` a 13th computing means for computing the inner product between said fifth constant matrix data $Q^tR$ and said eighth matrix data S' provided by said 12th computing means to provide ninth matrix data XX'= $Q^tR \cdot S'$; and a 14th computing means for shifting said ninth matrix data XX' provided by said 13th computing means by two bits to provide said matrix data X', defined as XX'/4.

38. A discrete cosine inverse transformation system according to claim 37, wherein said 10th computing means executes computations defined by the following equations to provide said sixth matrix data U', defined as follows:

$u'_0 = y'_0$ $u'_1 = y'_2$ $u'_2 = B \cdot y'_1 - C \cdot y'_3$ $u'_3 = -C \cdot y'_1 - B \cdot y'_3$ $u'_4 = y'_8$ $u'_5 = y'_{10}$ $u'_6 = B \cdot y'_9 - C \cdot y'_{11}$ $u'_7 = -C \cdot y'_9 - B \cdot y'_{11}$ $u'_8 = B \cdot y'_4 - C \cdot y'_{12}$ $u'_9 = -C \cdot y'_4 - B \cdot y'_{12}$ $u'_{10} = B \cdot y'_6 - C \cdot y'_{15}$ $u'_{11} = -C \cdot y'_6 + B \cdot y'_{15}$ $u'_{12} = y'_5 + y'_{15}$ $u'_{13} = y'_5 - y'_{13}$ $u'_{14} = -A \cdot y'_5 + A \cdot y'_{15}$ $u'_{15} = -A \cdot y'_7 + A \cdot y'_{13}$.

39. A discrete cosine inverse transformation system according to claim 38, wherein said 10th computing means comprises:

a first multiplication, addition, and subtraction circuit (20), including a first holding circuit (50) for holding and outputting coefficients B and C, connected to a first multiplication circuit (30) for multiplying said coefficients B and C with said predetermined element data of said matrix data (Y'), and a first accumulation circuit (40) connected to said multiplication circuit (30) for accumulating the results of said first multiplication circuit, performing the following computations:

$u'_2 = B \cdot y'_1 - C \cdot y'_3$ $u'_3 = -C \cdot y'_1 - B \cdot y'_3$ $u'_6 = B \cdot y'_9 - C \cdot y'_{11}$ $u'_7 = -C \cdot y'_9 - B \cdot y'_{11}$ $u'_8 = B \cdot y'_4 - C \cdot y'_{12}$ $u'_9 = -C \cdot y'_4 - B \cdot y'_{12}$ $u'_{10} = B \cdot y'_6 - C \cdot y'_{15}$ $u'_{11} = -C \cdot y'_6 + B \cdot y'_{15}$ and a second multiplication, addition, and subtraction circuit (21), including a second holding circuit (51) for holding and outputting a coefficient A, connected to a second multiplication circuit (31) for multiplying said coefficient A with said predetermined element data of said matrix data (Y'), and a second accumulation circuit (41) connected to said second multiplication circuit (31) for accumulating the results of said second multiplication circuit, performing the following computations:

$u'_{14} = -A \cdot y'_5 + A \cdot y'_{15}$ $u'_{15} = -A \cdot y'_7 + A \cdot y'_{13}$.

40. A discrete cosine inverse transformation system according to claim 38, wherein said 11th computing means executes computations defined by the following equations to provide said seventh matrix data T', defined as follows:

$$
\begin{aligned}
t'_0 &= u'_0 \\
t'_1 &= u'_1 \\
t'_2 &= u'_2 + u'_3 \\
t'_3 &= u'_2 - u'_3 \\
t'_4 &= u'_4 \\
t'_5 &= u'_5 \\
t'_6 &= u'_6 + u'_7 \\
t'_7 &= u'_6 - u'_7 \\
t'_8 &= u'_8 + u'_9 \\
t'_9 &= u'_{10} + u'_{11} \\
t'_{10} &= u'_{12} + u'_{14} + u'_{15} \\
     &= u'_{12} + (u'_{15} + u'_{14}) \\
t'_{11} &= u'_{13} - u'_{14} + u'_{15} \\
       &= (u'_{15} - u'_{14}) + u'_{13} \\
t'_{12} &= u'_8 - u'_9 \\
t'_{13} &= u'_{10} - u'_{11} \\
t'_{14} &= u'_{13} - u'_{14} + u'_{15} \\
       &= (u'_{15} - u'_{14}) - u'_{13} \\
t'_{15} &= u'_{12} - u'_{14} - u'_{15} \\
       &= u'_{12} - (u'_{15} + u'_{14}).
\end{aligned}
$$

41. A discrete cosine inverse transformation system according to claim 40, wherein said 11th computing means comprises:

a first addition circuit (211a) computing $u'_{15} + u'_{14}$, a first subtraction circuit (212a) computing $u'_{15} - u'_{14}$, a second addition circuit (211b) connected to said first addition circuit for adding the result of said first addition circuit and $u'_{12}$, to provide $t'_{10}$, a second subtraction circuit (212b) connected to said first addition circuit for subtracting the result of said first addition circuit from $u'_{12}$, to provide $t'_{15}$, a third addition circuit (211c) connected to said first subtraction circuit for adding the result of said first subtraction circuit and $u'_{13}$, to provide $t'_{11}$, and a third subtraction circuit (212c) connected to said second subtraction circuit for subtracting $u'_{13}$ from the result of said second subtraction circuit, to provide $t'_{14}$.

42. A discrete cosine inverse transformation system according to claim 40, wherein said 12th computing means executes computations defined by the following equations to provide said eighth matrix data S', defined as follows:

$$s_{4i}' = t_i' + t_{i+4}' + t_{i+12}'$$
$$= (t_i' + t_{i+4}') + t_{i+12}'$$
$$s_{4i+1}' = t_i' - t_{i+4}' + t_{i+8}'$$
$$= (t_i' - t_{i+4}') + t_{i+8}'$$
$$s_{4i+2}' = t_i' - t_{i+4}' - t_{i+8}'$$
$$= (t_i' - t_{i+4}') - t_{i+8}'$$
$$s_{4i+3}' = t_i' + t_{i+4}' - t_{i+12}'$$
$$= (t_i' + t_{i+4}') - t_{i+12}'$$

wherein, i=0, 1, 2, or 3.

43. A discrete cosine inverse transformation system according to claim 42, wherein said 12th computing means comprises:
   - a first addition circuit (213a) computing $t_i' + t_{i+4}'$,
   - a first subtraction circuit (214a) computing $t_i' - t_{i+4}'$,
   - a second addition circuit (213b) connected to said first addition circuit for adding $t_{i+12}'$ and the result of said first addition circuit, to provide $s_{4i}'$,
   - a second subtraction circuit (214b) connected to said first addition circuit for subtracting $t_{i+12}'$ from the result of said first addition circuit, to provide $s_{4i+3}'$,
   - a third addition circuit (213c) connected to said first subtraction circuit for adding the result of said first subtraction circuit and $t_{i+8}'$, to provide $s_{4i+1}'$, and
   - a third subtraction circuit (214c) connected to said first subtraction circuit for subtracting $t_{i+8}'$ from the result of said first subtraction circuit, to provide $s_{4i+2}'$.

44. A discrete cosine inverse transformation system according to claim 42, wherein said 13th computing means executes computations defined by the following equations to provide said ninth matrix data XX', defined as follows:

$$x_{4i}' = s_i' + s_{i+4}' + s_{i+12}'$$
$$= (s_i' + s_{i+4}') + s_{i+12}'$$
$$x_{4i+1}' = s_i' - s_{i+4}' + s_{i+8}'$$
$$= (s_i' - s_{i+4}') + s_{i+8}'$$
$$x_{4i+2}' = s_i' - s_{i+4}' - s_{i+8}'$$
$$= (s_i' - s_{i+4}') - s_{i+8}'$$
$$x_{4i+3}' = s_i' + s_{i+4}' - s_{i+12}'$$
$$= (s_i' + s_{i+4}') - s_{i+12}'$$

wherein, i=0, 1, 2, or 3.

45. A discrete cosine inverse transformation system according to claim 44, wherein said 13th computing means comprises:
   - a first addition circuit (215a) computing $s_i' + s_{i+4}'$,
   - a first subtraction circuit (216a) computing $s_i' - s_{i+4}'$,
   - a second addition circuit (215b) connected to said first addition circuit for adding $s_{i+12}'$ and the result of said first addition circuit, to provide $x_{4i}'$,
   - a second subtraction circuit (216b) connected to said first addition circuit for subtracting $s_{i+12}'$ from the result of said first addition circuit, to provide $x_{4i+3}'$,
   - a third addition circuit (215c) connected to said first subtraction circuit for adding the result of said first subtraction circuit and $s_{i+8}'$ to provide $x_{4i+1}'$,
   - a third subtraction circuit (216c) connected to said first subtraction circuit for subtracting $s_{i+8}'$ from the result of said first subtraction circuit, to provide $x_{4i+2}'$.

46. A discrete cosine inverse transformation system, comprising:
   - input means for providing an input signal having information represented as binary data in a matrix form;
   - transforming means for transforming said input signal; and
   - output means for providing an output signal representative of said transformed input signal;
   - wherein, said transforming means performs a two-dimensional 4-row×4-column discrete cosine inverse transformation of binary data Y' in a matrix form in accordance with the following formula:

$$X' = (1/4) \, Q^t \, R \, Q^t \, R \, V^t \, W^t \, Y'$$

where, Y' denotes matrix data to be subjected to a discrete cosine inverse transformation and is defined as follows:

$$Y' = Y_j' \ (j = 0\text{--}15), \text{ or}$$
$$= Y_{ij}' \ (i = 0\text{--}3, j = 0\text{--}3)$$
$$y_0' \ (= y_{00}')$$
$$y_1' \ (= y_{01}')$$
$$y_2' \ (= y_{02}')$$
$$y_3' \ (= y_{03}')$$
$$y_4' \ (= y_{10}')$$
$$y_5' \ (= y_{11}')$$
$$y_6' \ (= y_{12}')$$
$$y_7' \ (= y_{13}')$$
$$= y_8' \ (= y_{20}')$$
$$y_9' \ (= y_{21}')$$
$$y_{10}' \ (= y_{22}')$$
$$y_{11}' \ (= y_{23}')$$
$$y_{12}' \ (= y_{30}')$$
$$y_{13}' \ (= y_{31}')$$
$$y_{14}' \ (= y_{32}')$$
$$y_{15}' \ (= y_{33}')$$

X' denotes matrix data obtained by the discrete cosine inverse transformation and is defined as follows:

$$X' = X_j' \ (j = 0\text{--}15), \text{ or}$$
$$= X_{ij}' \ (i = 0\text{--}3, j = 0\text{--}3)$$
$$x_0' \ (= x_{00}')$$
$$x_1' \ (= x_{01}')$$
$$x_2' \ (= x_{02}')$$
$$x_3' \ (= x_{03}')$$
$$x_4' \ (= x_{10}')$$
$$x_5' \ (= x_{11}')$$
$$x_6' \ (= x_{12}')$$
$$x_7' \ (= x_{13}')$$
$$= x_8' \ (= x_{20}')$$
$$x_9' \ (= x_{21}')$$
$$x_{10}' \ (= x_{22}')$$
$$x_{11}' \ (= x_{23}')$$
$$x_{12}' \ (= x_{30}')$$
$$x_{13}' \ (= x_{31}')$$
$$x_{14}' \ (= x_{32}')$$
$$x_{15}' \ (= x_{33}')$$

$W^t$ denotes a first 16×16 transposition matrix data including irrational numbers A, B, C, −A, −B, and −C defined as follows:

$W^t = W^6_{ij}$ (i = 0–15, j = 0–15)

| 1 0 0 0 | 0 0 0 0 | 0 0 0 0 | 0 0 0 0 |
|---|---|---|---|
| 0 0 1 0 | 0 0 0 0 | 0 0 0 0 | 0 0 0 0 |
| 0 B 0–C | 0 0 0 0 | 0 0 0 0 | 0 0 0 0 |
| 0–C 0–B | 0 0 0 0 | 0 0 0 0 | 0 0 0 0 |
| 0 0 0 0 | 0 0 0 0 | 1 0 0 0 | 0 0 0 0 |

-continued $$
=
\begin{matrix}
0\ 0\ 0\ 0 & 0\ 0\ 0\ 0 & 0\ 0\ 1\ 0 & 0\ 0\ 0\ 0 \\
0\ 0\ 0\ 0 & 0\ 0\ 0\ 0 & 0\ B\ 0\text{-}C & 0\ 0\ 0\ 0 \\
0\ 0\ 0\ 0 & 0\ 0\ 0\ 0 & 0\text{-}C\ 0\text{-}B & 0\ 0\ 0\ 0 \\
0\ 0\ 0\ 0 & B\ 0\ 0\ 0 & 0\ 0\ 0\ 0 & \text{-}C\ 0\ 0\ 0 \\
0\ 0\ 0\ 0 & \text{-}C\ 0\ 0\ 0 & 0\ 0\ 0\ 0 & \text{-}B\ 0\ 0\ 0 \\
0\ 0\ 0\ 0 & 0\ 0\ B\ 0 & 0\ 0\ 0\ 0 & 0\ 0\text{-}C\ 0 \\
0\ 0\ 0\ 0 & 0\ 0\text{-}C\text{-}B & 0\ 0\ 0\ 0 & 0\ 0\ B\ 0 \\
0\ 0\ 0\ 0 & 0\ 1\ 0\ 0 & 0\ 0\ 0\ 0 & 0\ 0\ 0\ 1 \\
0\ 0\ 0\ 0 & 0\ 0\ 0\ 1 & 0\ 0\ 0\ 0 & 0\text{-}1\ 0\ 0 \\
0\ 0\ 0\ 0 & 0\text{-}A\ 0\ 0 & 0\ 0\ 0\ 0 & 0\ 0\ 0\ A \\
0\ 0\ 0\ 0 & 0\ 0\ 0\text{-}A & 0\ 0\ 0\ 0 & 0\text{-}A\ 0\ 0
\end{matrix}
$$

V$^t$ denotes a second 16×16 transposition constant matrix data, defined as follows:

$$V^t = V^6{}_{ij} \ (i = 0\sim15, j = 15)$$

```
1 0 0 0    0 0 0 0    0 0 0 0    0 0 0 0
0 1 0 0    0 0 0 0    0 0 0 0    0 0 0 0
0 0 1 1    0 0 0 0    0 0 0 0    0 0 0 0
0 0 1-1    0 0 0 0    0 0 0 0    0 0 0 0

0 0 0 0    1 0 0 0    0 0 0 0    0 0 0 0
0 0 0 0    0 1 0 0    0 0 0 0    0 0 0 0
0 0 0 0    0 0 1 1    0 0 0 0    0 0 0 0
0 0 0 0    0 0 1-1    0 0 0 0    0 0 0 0

=

0 0 0 0    0 0 0 0    1 1 0 0    0 0 0 0
0 0 0 0    0 0 0 0    0 0 1 1    0 0 0 0
0 0 0 0    0 0 0 0    0 0 0 0    1 0 1 1
0 0 0 0    0 0 0 0    0 0 0 0    0 1-1 1

0 0 0 0    1-1 0 0    0 0 0 0    0 0 0 0
0 0 0 0    0 0 0 0    0 0 0-1    0 0 0 0
0 0 0 0    0 0 0 0    0 0 0 0    0-1-1 1
0 0 0 0    0 0 0 0    0 0 0 0    1 0-1-1
```

R denotes a third 16×16 constant matrix data, defined as follows:

$$R = R_{ij} \ (i = 0\sim15, j = 0\sim15)$$

```
1 0 0 0    0 0 0 0    0 0 0 0    0 0 0 0
0 0 0 0    1 0 0 0    0 0 0 0    0 0 0 0
0 0 0 0    0 0 0 0    1 0 0 0    0 0 0 0
0 0 0 0    0 0 0 0    0 0 0 0    1 0 0 0

0 1 0 0    0 0 0 0    0 0 0 0    0 0 0 0
0 0 0 0    0 1 0 0    0 0 0 0    0 0 0 0
0 0 0 0    0 0 0 0    0 1 0 0    0 0 0 0
0 0 0 0    0 0 0 0    0 0 0 0    0 1 0 0

=

0 0 1 0    0 0 0 0    0 0 0 0    0 0 0 0
0 0 0 0    0 0 1 0    0 0 0 0    0 0 0 0
0 0 0 0    0 0 0 0    0 0 1 0    0 0 0 0
0 0 0 0    0 0 0 0    0 0 0 0    0 0 1 0

0 0 0 1    0 0 0 0    0 0 0 0    0 0 0 0
0 0 0 0    0 0 0 1    0 0 0 0    0 0 0 0
0 0 0 0    0 0 0 0    0 0 0 1    0 0 0 0
0 0 0 0    0 0 0 0    0 0 0 0    0 0 0 1
``` and,

Q$^t$ denotes a fourth 16×16 transposition constant matrix data, defined as follows:

$$Q^t = Q^t{}_{ij} \ (i = 0\sim15, j = 0\sim15)$$

```
1 1 0 1    0 0 0 0    0 0 0 0    0 0 0 0
1-1 1 0    0 0 0 0    0 0 0 0    0 0 0 0
1-1-1 0    0 0 0 0    0 0 0 0    0 0 0 0
1 1 0-1    0 0 0 0    0 0 0 0    0 0 0 0
```

-continued

```
0 0 0 0    1 1 0 1    0 0 0 0    0 0 0 0
0 0 0 0    1-1 1 0    0 0 0 0    0 0 0 0
0 0 0 0    1-1-1 0    0 0 0 0    0 0 0 0
0 0 0 0    1 1 0-1    0 0 0 0    0 0 0 0

=

0 0 0 0    0 0 0 0    1 1 0 1    0 0 0 0
0 0 0 0    0 0 0 0    1-1 1 0    0 0 0 0
0 0 0 0    0 0 0 0    1-1-1 0    0 0 0 0
0 0 0 0    0 0 0 0    1 1 0-1    0 0 0 0

0 0 0 0    0 0 0 0    0 0 0 0    1 1 0 1
0 0 0 0    0 0 0 0    0 0 0 0    1-1 1 0
0 0 0 0    0 0 0 0    0 0 0 0    0-1-1 0
0 0 0 0    0 0 0 0    0 0 0 0    1 1 0-1
``` said discrete cosine inverse transformation system further comprising:

a 15th computing means for executing the multiplication between said irrational numbers in said first transposition matrix data W$^t$ and predetermined element data in said matrix data Y' provided by said input means and further performing addition and subtraction of said multiplied results and predetermined element data in said matrix data Y' to provide sixth matrix data U';

a 16th computing means for computing the inner product between said second transposition constant matrix data V$^t$ and said sixth matrix data U' provided by said 15th computing means to provide said seventh matrix data T';

a 17th computing means for computing the inner product between said 10th constant matrix data Q$_t$RQ$_t$R and said seventh matrix data T' provided by said 16th computing means to provide said ninth matrix data XX':

$$Q^tR = Q^tR_{ij} \ (i = 0\sim15, j = 0\sim15)$$

```
1 0 0 0    1 0 0 0    0 0 0 0    1 0 0 0
1 0 0 0   -1 0 0 0    1 0 0 0    0 0 0 0
1 0 0 0   -1 0 0 0   -1 0 0 0    0 0 0 0
1 0 0 0    1 0 0 0    0 0 0 0   -1 0 0 0

0 1 0 0    0 1 0 0    0 0 0 0    0 1 0 0
0 1 0 0    0-1 0 0    0 1 0 0    0 0 0 0
0 1 0 0    0-1 0 0    0-1 0 0    0 0 0 0
0 1 0 0    0 1 0 0    0 0 0 0    0-1 0 0

=

0 0 1 0    0 0 1 0    0 0 0 0    0 0 1 0
0 0 1 0    0 0-1 0    0 0 1 0    0 0 0 0
0 0 1 0    0 0-1 0    0 0-1 0    0 0 0 0
0 0 1 0    0 0 1 0    0 0 0 0    0 0-1 0

0 0 0 1    0 0 0 1    0 0 0 0    0 0 0 1
0 0 0 1    0 0 0-1    0 0 0 1    0 0 0 0
0 0 0 1    0 0 0-1    0 0 0-1    0 0 0 0
0 0 0 1    0 0 0 1    0 0 0 0    0 0 0-1
``` and an 18th computing means for shifting said ninth matrix data XX' provided by said 17th computing means by two bits to provide said matrix data X', defined as XX'/4.

47. A discrete cosine inverse transformation system according to claim 46, wherein said 15th computing means executes computations defined by the following equations to provide said sixth matrix data U', defined as follows:

$$u'_0 = y'_0$$

$$u'_1 = y'_2$$

$$u'_2 = B \cdot y'_1 - C \cdot y'_3$$

$$u'_3 = -C \cdot y'_1 - B \cdot y'_3$$

$u'_4 = y'_8$ $u'_5 = y'_{10}$ $u'_6 = B \cdot y'_9 - C \cdot y'_{11}$ $u'_7 = -C \cdot y'_9 - B \cdot y'_{11}$ $u'_8 = B \cdot y'_4 - C \cdot y'_{12}$ $u'_9 = -C \cdot y'_4 - C \cdot y'_{15}$ $u'_{10} = B \cdot y'_6 - C \cdot y'_{15}$ $u'_{11} = -C \cdot y'_6 + B \cdot y'_{15}$ $u'_{12} = y'_5 + y'_{15}$ $u'_{13} = y'_5 - y'_{13}$ $u'_{14} = -A \cdot y'_5 + A \cdot y'_{15}$ $u'_{15} = -A \cdot y'_7 + A \cdot y'_{13}.$ 48. A discrete cosine inverse transformation system according to claim 47, wherein said 15th computing means comprises:

a first multiplication, addition, and subtraction circuit (20), including a first holding circuit (50) for holding and outputting coefficients B and C, connected to a first multiplication circuit (30) for multiplying said coefficients B and C with said predetermined element data of said matrix data (Y'), and a first accumulation circuit (40) connected to said multiplication circuit (30) for accumulating the results of said first multiplication circuit, performing the following computations:

$u'_6 = B \cdot y'_9 - C \cdot y'_{11}$ $u'_7 = -C \cdot y'_9 - B \cdot y'_{11}$ $u'_8 = B \cdot y'_4 - C \cdot y'_{12}$ $u'_9 = -C \cdot y'_4 - B \cdot y'_{12}$ $u'_{10} = B \cdot y'_6 - C \cdot y'_{15}$ $u'_{11} = -C \cdot y'_6 + B \cdot y'_{15}$ and a second multiplication, addition, and subtraction circuit (21), including a second holding circuit (51) for holding and outputting a coefficient A, connected to a second multiplication circuit (31) for multiplying said coefficient A with said predetermined element data of said matrix data (Y'), and a second accumulation circuit (41) connected to said second multiplication circuit (31) for accumulating the results of said second multiplication circuit, performing the following computations:

$u'_{14} = -A \cdot y'_5 + A \cdot y'_{15}$ $u'_{15} = -A \cdot y'_1 + A \cdot y'_{13}.$ 49. A discrete cosine inverse transformation system according to claim 47, wherein said 16th computing means executes computations defined by the following equations to provide said seventh matrix data T', defined as follows:

$t'_0 = u'_0$
$t'_1 = u'_1$
$t'_2 = u'_2 + u'_3$

-continued $t'_3 = u'_2 - u'_3$
$t'_4 = u'_4$
$t'_5 = u'_5$
$t'_6 = u'_6 + u'_7$
$t'_7 = u'_6 - u'_7$
$t'_8 = u'_8 + u'_9$
$t'_9 = u'_{10} + u'_{11}$ $t'_{10} = u'_{12} + u'_{14} + u'_{15}$
$\quad = u'_{12} + (u'_{15} + u'_{14})$ $t'_{11} = u'_{13} - u'_{14} + u'_{15}$
$\quad = (u'_{15} - u'_{14}) + u'_{13}$ $t'_{12} = u'_8 - u'_9$
$t'_{13} = u'_{10} - u'_{11}$ $t'_{14} = -u'_{13} - u'_{14} + u'_{15}$
$\quad = (u'_{15} - u'_{14}) - u'_{13}$ $t'_{15} = u'_{12} - u'_{14} - u'_{15}$
$\quad = u'_{12} - (u'_{15} + u'_{14}).$ 50. A discrete cosine inverse transformation system according to claim 49, wherein said 16th computing means comprises:

a first addition circuit (211a) computing $u'_{15} + u'_{14}$, a first subtraction circuit (212a) computing $u'_{15} - u'_{14}$, a second addition circuit (211b) connected to said first addition circuit for adding the result of said first addition circuit and $u'_{12}$, to provide $t'_{10}$, a second subtraction circuit (212b) connected to said first addition circuit for subtracting the result of said first addition circuit from $u'_{12}$, to provide $t'_{15}$, a third addition circuit (211c) connected to said first subtraction circuit for adding the result of said first subtraction circuit and $u'_{13}$, to provide $t'_{11}$, and a third subtraction circuit (212c) connected to said second subtraction circuit for subtracting $u'_{13}$ from the result of said second subtraction circuit, to provide $t'_{14}$.

51. A discrete cosine inverse transformation system according to claim 49, wherein said 17th computing means executes computations defined by the following equations to provide said eighth matrix data S', defined as follows:

$s'_{4i} = t'_i + t'_{i+4} + t'_{i+12}$
$\quad = (t'_i + t'_{i+4}) + t'_{i+12}$ $s'_{4i+1} = t'_i - t'_{i+4} + t'_{i+8}$
$\quad = (t'_i - t'_{i+4}) + t'_{i+8}$ $s'_{4i+2} = t'_i - t'_{i+4} - t'_{i+8}$
$\quad = (t'_i - t'_{i+4}) - t'_{i+8}$ $s'_{4i+3} = t'_i + t'_{i+4} - t'_{i+12}$
$\quad = (t'_i + t'_{i+4}) - t'_{i+12}$ wherein, i=0, 1, 2, or 3

$x'_{4i} = s'_i + s'_{i+4} + s'_{i+12}$
$\quad = (s'_i + s'_{i+4}) + s'_{i+12}$ $x'_{4i+1} = s'_i - s'_{i+4} + s'_{i+8}$
$\quad = (s'_i - s'_{i+4}) + s'_{i+8}$ $x'_{4i+2} = s'_i - s'_{i+4} - s'_{i+8}$
$\quad = (s'_i - s'_{i+4}) - s'_{i+8}$ -continued $$x_{4i+3}' = s_i' + s_{i+4}' - s_{i+12}'$$
$$= (s_i' + s_{i+4}') - s_{i+12}'$$

wherein, i=0, 1, 2, or 3.

52. A discrete cosine inverse transformation system according to claim 51, wherein said 17th computing means comprises:

a first addition circuit (215a) computing $s_i' + s_{i+4}'$, a first subtraction circuit (216a) computing $s_i' - s_{i+4}'$, a second addition circuit (215b) connected to said first addition circuit for adding $s_{i+12}'$ and the result of said first addition circuit, to provide $x_{4i}'$, a second subtraction circuit (216b) connected to said first addition circuit for subtracting $s_{i+12}'$ from the result of said first addition circuit, to provide $x_{4i+3}'$, a third addition circuit (215c) connected to said first subtraction circuit for adding the result of said first subtraction circuit and $s_{i+8}'$ to provide $x_{4i+1}'$, a third subtraction circuit (216c) connected to said first subtraction circuit for subtracting $s_{i+8}'$ from the result of said first subtraction circuit, to provide $x_{4i+2}'$.

53. A discrete cosine inverse transformation system comprising:

input means for providing an input signal having information represented as binary data in a matrix form;

transforming means for transforming said input signal; and output means for providing an output signal representative of said transformed input signal;

wherein, said transforming means performs a two-dimensional 4-row×4-column discrete cosine inverse transformation in accordance with the following formula:

$$X' = (¼) \, Q^t \, R \, Q^t \, R \, V^t \, W^t \, Y'$$

where, Y' denotes 16 elements matrix data to be subjected to a discrete cosine inverse transformation and is defined as follows:

$$Y' = Y_j' \, (j = 0 \sim 15), \text{ or}$$
$$= Y_{ij}' \, (i = 0 \sim 3, j = 0 \sim 3)$$

$y_0' (= y_{00}')$
$y_1' (= y_{01}')$
$y_2' (= y_{02}')$
$y_3' (= y_{03}')$
$y_4' (= y_{10}')$
$y_5' (= y_{11}')$
$y_6' (= y_{12}')$
$y_7' (= y_{13}')$
$y_8' (= y_{20}')$
$y_9' (= y_{21}')$
$y_{10}' (= y_{22}')$
$y_{11}' (= y_{23}')$
$y_{12}' (= y_{30}')$
$y_{13}' (= y_{31}')$
$y_{14}' (= y_{32}')$
$y_{15}' (= y_{33}')$

X' denotes matrix data obtained by the discrete cosine inverse transformation and is defined as follows:

$$X' = X_j' \, (j = 0 \sim 15), \text{ or}$$
$$= X_{ij}' \, (i = 0 \sim 3, j = 0 \sim 3)$$

$x_0' (= x_{00}')$
$x_1' (= x_{01}')$
$x_2' (= x_{02}')$
$x_3' (= x_{03}')$
$x_4' (= x_{10}')$
$x_5' (= x_{11}')$
$x_6' (= x_{12}')$
$x_7' (= x_{13}')$
$x_8' (= x_{20}')$
$x_9' (= x_{21}')$
$x_{10}' (= x_{22}')$
$x_{11}' (= x_{23}')$
$x_{12}' (= x_{30}')$
$x_{13}' (= x_{31}')$
$x_{14}' (= x_{32}')$
$x_{15}' (= x_{33}')$ $W^t$ denotes a first 16×16 transposition matrix data including irrational numbers A, B, C, −A, −B, and −C defined as follows:

$W^t = W^t_{ij} \, (i = 0 \sim 15, j = 0 \sim 15)$

| 1 0 0 0 | 0 0 0 0 | 0 0 0 0 | 0 0 0 0 |
|---|---|---|---|
| 0 0 1 0 | 0 0 0 0 | 0 0 0 0 | 0 0 0 0 |
| 0 B 0−C | 0 0 0 0 | 0 0 0 0 | 0 0 0 0 |
| 0−C 0−B | 0 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 1 0 | 0 0 0 0 |
| 0 0 0 0 | 0 0 0 0 | 0 B 0−C | 0 0 0 0 |
| 0 0 0 0 | 0 0 0−0 | 0−C 0−B | 0 0 0 0 |
| 0 0 0 0 | B 0 0 0 | 0 0 0 0 | −0 0 0 0 |
| 0 0 0 0 | −C 0 0 0 | 0 0 0 0 | −0 0 0 0 |
| 0 0 0 0 | 0 0 B 0 | 0 0 0 0 | 0 0−C 0 |
| 0 0 0 0 | 0 0−C−B | 0 0 0 0 | 0 0 B 0 |
| 0 0 0 0 | 0 0 0 0 | 0 0 0 0 | 0 0 0 1 |
| 0 0 0 0 | 0 0 0 0 | 0 0 0 0 | 0−1 0 0 |
| 0 0 0 0 | 0−A 0 0 | 0 0 0−0 | 0 0 0 A |
| 0 0 0 0 | 0 0 0−A | 0 0 0 0 | 0−A 0 0 |

$V^t$ denotes a second 16×16 transposition constant matrix data, defined as follows:

$V^t = V^t_{ij} \, (i = 0 \sim 15, j = 0 \sim 15)$

| 1 0 0 0 | 0 0 0 0 | 0 0 0 0 | 0 0 0 0 |
|---|---|---|---|
| 0 1 0 0 | 0 0 0 0 | 0 0 0 0 | 0 0 0 0 |
| 0 0 1 1 | 0 0 0 0 | 0 0 0 0 | 0 0 0 0 |
| 0 0 1−1 | 0 0 0 0 | 0 0 0 0 | 0 0 0 0 |
| 0 0 0 0 | 1 0 0 0 | 0 0 0 0 | 0 0 0 0 |
| 0 0 0 0 | 0 1 0 0 | 0 0 0 0 | 0 0 0 0 |
| 0 0 0 0 | 0 0 1 1 | 0 0 0 0 | 0 0 0 0 |
| 0 0 0 0 | 0 0 1−1 | 0 0 0 0 | 0 0 0 0 |
| 0 0 0 0 | 0 0 0 0 | 1 1 0 0 | 0 0 0 0 |
| 0 0 0 0 | 0 0 0 0 | 0 0 1 1 | 0 0 0 0 |
| 0 0 0 0 | 0 0 0 0 | 0 0 0 0 | 1 0 1 1 |
| 0 0 0 0 | 0 0 0 0 | 0 0 0 0 | 0 1−1 1 |
| 0 0 0 0 | 1−1 0 0 | 0 0 0 0 | 0 0 0 0 |
| 0 0 0 0 | 0 0 0 0 | 0 0 0−0 | 0 0 0 0 |

-continued

| | | | |
|---|---|---|---|
| 0 0 0 0 | 0 0 0 0 | 0 0 0 0 | 0 –1 –1 –1 |
| 0 0 0 0 | 0 0 0 0 | 0 0 0 0 | 1 0 –1 –1 |

R denotes a third 16×16 constant matrix data, defined as follows:

$R = R_{ij}$ (i = 0~15, j = 0~15)

| | | | |
|---|---|---|---|
| 1 0 0 0 | 0 0 0 0 | 0 0 0 0 | 0 0 0 0 |
| 0 0 0 0 | 1 0 0 0 | 0 0 0 0 | 0 0 0 0 |
| 0 0 0 0 | 0 0 0 0 | 1 0 0 0 | 0 0 0 0 |
| 0 0 0 0 | 0 0 0 0 | 0 0 0 0 | 1 0 0 0 |
| 0 1 0 0 | 0 0 0 0 | 0 0 0 0 | 0 0 0 0 |
| 0 0 0 0 | 0 1 0 0 | 0 0 0 0 | 0 0 0 0 |
| 0 0 0 0 | 0 0 0 0 | 0 1 0 0 | 0 0 0 0 |
| 0 0 0 0 | 0 0 0 0 | 0 0 0 0 | 0 1 0 0 |

=

| | | | |
|---|---|---|---|
| 0 0 1 0 | 0 0 0 0 | 0 0 0 0 | 0 0 0 0 |
| 0 0 0 0 | 0 0 1 0 | 0 0 0 0 | 0 0 0 0 |
| 0 0 0 0 | 0 0 0 0 | 0 0 1 0 | 0 0 0 0 |
| 0 0 0 0 | 0 0 0 0 | 0 0 0 0 | 0 0 0 1 |
| 0 0 0 1 | 0 0 0 0 | 0 0 0 0 | 0 0 0 0 |
| 0 0 0 0 | 0 0 0 1 | 0 0 0 0 | 0 0 0 0 |
| 0 0 0 0 | 0 0 0 0 | 0 0 0 1 | 0 0 0 0 |
| 0 0 0 0 | 0 0 0 0 | 0 0 0 0 | 0 0 0 1 | and, $Q^t$ denotes a fourth 16×16 transposition constant matrix data, defined as follows:

$Q^t = Q^t_{ij}$ (i = 0~15, j = 0~15)

| | | | |
|---|---|---|---|
| 1 1 0 1 | 0 0 0 0 | 0 0 0 0 | 0 0 0 0 |
| 1 –1 1 0 | 0 0 0 0 | 0 0 0 0 | 0 0 0 0 |
| 1 –1 –1 0 | 0 0 0 0 | 0 0 0 0 | 0 0 0 0 |
| 1 1 0 –1 | 0 0 0 0 | 0 0 0 0 | 0 0 0 0 |
| 0 0 0 0 | 1 0 0 0 | 0 0 0 0 | 0 0 0 0 |
| 0 0 0 0 | 1 –1 1 0 | 0 0 0 0 | 0 0 0 0 |
| 0 0 0 0 | 1 –1 –1 0 | 0 0 0 0 | 0 0 0 0 |
| 0 0 0 0 | 1 1 0 –1 | 0 0 0 0 | 0 0 0 0 |

=

| | | | |
|---|---|---|---|
| 0 0 0 0 | 0 0 0 0 | 1 0 0 0 | 0 0 0 0 |
| 0 0 0 0 | 0 0 0 0 | 1 –1 1 0 | 0 0 0 0 |
| 0 0 0 0 | 0 0 0 0 | 1 –1 –1 0 | 0 0 0 0 |
| 0 0 0 0 | 0 0 0 0 | 1 1 0 –1 | 0 0 0 0 |
| 0 0 0 0 | 0 0 0 0 | 0 0 0 0 | 1 0 0 0 |
| 0 0 0 0 | 0 0 0 0 | 0 0 0 0 | 1 –1 1 0 |
| 0 0 0 0 | 0 0 0 0 | 0 0 0 0 | 1 –1 –1 0 |
| 0 0 0 0 | 0 0 0 0 | 0 0 0 0 | 1 1 0 –1 | said transforming means comprises:
an input register (61) for receiving said input signal;
a multiplication, addition and subtraction circuit (62);
a first intermediate value holding circuit (63);
a first addition and subtraction circuit (64);
a second intermediate value holding circuit (65); and
a second addition and subtraction circuit (66),
said circuits connected to one another as a pipeline structure, said multiplication, addition, and subtraction circuit being formed as a first stage circuit of said pipeline structure, said first addition and subtraction circuit being formed as a second stage circuit, and said second addition and subtraction circuit being formed as a third stage circuit,
said input register serially receiving said 16 elements data Y during 16 unit times,
said multiplication, addition, and subtraction circuit computing the following equations during 16 unit times, and $u'_2 = B \cdot y_1 - C \cdot y_3$ $u'_3 = -C \cdot y_1 - B \cdot y_3$ $u'_6 = B \cdot y_9 - C \cdot y_{11}$ $u'_7 = -C \cdot y_9 - B \cdot y_{11}$ $u'_8 = B \cdot y_4 - C \cdot y_{12}$ $u'_9 = -C \cdot y_4 - B \cdot y_{12}$ $u'_{10} = B \cdot y_6 - C \cdot y_{15}$ $u'_{11} = -C \cdot y_6 + B \cdot y_{15}$ at the same time, computing the following equations during 8 unit times, $u'_{12} = y_5 + y_{15}$ $u'_{13} = y_5 - y_{13}$ $u'_{14} = -A \cdot y_5 + A \cdot y_{15}$ $u'_{15} = -A \cdot y_7 + A \cdot y_{13}$ said first intermediate value holding circuit holding the results of said multiplication, addition, and subtraction circuit: $u'_2, u'_3, u'_6$ to $u'_{15}$, and $u'_0 = y_0, u'_1 = y_2, u'_4 = y_8$, and $u'_5 = y_{10}$, said first addition-subtraction circuit computing the following equations during 1 to 7 unit times, and $t'_2 = u'_2 + u'_3$, and $t'_3 = u'_2 - u'_3$ $t'_6 = u'_6 + u'_7$, and $t'_7 = u'_6 - u'_7$ $t'_8 = u'_8 + u'_9$, and $t'_9 = u'_8 - u'_9$ $(u'_{15} + u'_{14})$ and $(u'_{15} - u'_{14})$ $t'_{10} = u'_{12} + (u'_{15} + u'_{14})$, and $t'_{15} = u'_{12} - (u'_{15} - u'_{14})$ $t'_{11} = (u'_{15} - u'_{14}) + u'_{13}$, and $t'_{14} = (u'_{15} - u'_{14}) - u'_{13}$ computing the following equations during 8 to 16 unit times, $s'_{4i} = (t'_i + t'_{i+4}) + t'_{i+12}$ $s'_{4i+1} = (t'_i - t'_{i+4}) + t'_{i+8}$ $s'_{4i+2} = (t'_i - t'_{i+4}) - t'_{i+8}$ $s'_{4i+3} = (t'_i + t'_{i+4}) - t'_{i+12}$ wherein, i=0, 1 or 2 said second intermediate value holding circuit holding the results of said second addition and subtraction circuit: $s'_0$ to $s'_{11}$, and the data held in said first intermediate value holding circuit: $t'_3, t'_7, t'_{11}$ and $t'_{15}$ and said second addition and subtraction circuit computing the following equations during 1 to 3 unit times, and $s'_{4i} = (t'_i + t'_{i+4}) + t'_{i+12}$ $s'_{4i+1} = (t'_i - t'_{i+4}) + t'_{i+8}$ $s'_{4i+2} = (t'_i - t'_{i+4}) - t'_{i+8}$ $s'_{4i+3} = (t'_i + t'_{i+4}) - t'_{i+12}$ wherein, i=3 computing the following equations during 4 to 16 unit times, $$x'_{4i}=(s'_i+s'_{i+4})+s'_{i+12}$$

$$x'_{4i+1}=(s'_i-s'_{i+4})+s'_{i+8}$$

$$x'_{4i+2}=(s'_i-s'_{i+4})-s'_{i+8}$$

$$x'_{4i+3}=(s'_i+s'_{i+4})-s'_{i+12}$$

wherein, i=0, 1, 2 or 3 to thereby provide the data X' as $\frac{1}{4}\{x'_{4i}, x'_{4i+1}, x'_{4i+2}, x'_{4i+3}\}$, wherein, i=1, 2 or 3.

54. The discrete cosine inverse transformation system of claim 53, wherein said input signal comprises an image signal having information in a frequency domain;

said transforming means transforms said image signal from a frequency domain to a real domain; and said output signal comprises information in said real domain as representative of said transformed image signal in said frequency domain.

* * * * *